(12) United States Patent
Campbell

(10) Patent No.: US 12,175,577 B1
(45) Date of Patent: Dec. 24, 2024

(54) ROADWAY SCENE RE-CREATION USING VIDEO ANALYTICS AND METADATA

(71) Applicant: Waylens, Inc., Waltham, MA (US)

(72) Inventor: Jeffery R. Campbell, Warkworth (CA)

(73) Assignee: WAYLENS, INC., Waltham, MA (US)

(*) Notice: Subject to any disclaimer, the term of this patent is extended or adjusted under 35 U.S.C. 154(b) by 305 days.

(21) Appl. No.: 17/850,069

(22) Filed: Jun. 27, 2022

Related U.S. Application Data

(63) Continuation-in-part of application No. 17/213,291, filed on Mar. 26, 2021, now Pat. No. 11,417,098, which is a continuation-in-part of application No. 16/208,861, filed on Dec. 4, 2018, now Pat. No. 10,984,275, which is a continuation-in-part of application No. 16/106,777, filed on Aug. 21, 2018, now abandoned, and a continuation-in-part of application No. 15/618,286, filed on Jun. 9, 2017, now Pat. No. 11,151,192, and a continuation-in-part of application No. 15/591,459, filed on May 10, 2017, now Pat. No. 11,856,331.

(60) Provisional application No. 62/548,548, filed on Aug. 22, 2017.

(51) Int. Cl.
*G06T 13/20* (2011.01)
*G06T 7/70* (2017.01)

(52) U.S. Cl.
CPC ............... *G06T 13/20* (2013.01); *G06T 7/70* (2017.01); *G06T 2207/10016* (2013.01); *G06T 2207/30261* (2013.01)

(58) Field of Classification Search
None
See application file for complete search history.

(56) References Cited

U.S. PATENT DOCUMENTS

| | | | |
|---|---|---|---|
| 9,779,309 B1* | 10/2017 | Fink | G06F 16/7867 |
| 11,308,741 B1* | 4/2022 | Cardona | G08G 1/0137 |
| 2017/0187994 A1* | 6/2017 | Tatourian | H04L 67/1097 |

* cited by examiner

*Primary Examiner* — Ricky Chin
(74) *Attorney, Agent, or Firm* — Maiorana Patent Law, PA

(57) ABSTRACT

A system comprising a capture device and a database. The capture device may be configured to capture video, perform video analysis on the captured video to identify characteristics about objects in the captured video and determine an absolute location of the objects, store metadata separate from the captured video in response to the video analysis and communicate with a wireless communication device. The database may be configured to communicate with the wireless communication device, store the metadata received from the wireless communication device, re-create a scene in response to the characteristics and absolute location of the objects in the metadata and generate an animation based on the scene using the metadata received over time. The metadata may be communicated without the captured video. The animation may provide a visualization similar to the captured video using only the metadata.

20 Claims, 14 Drawing Sheets

ROADWAY SCENE RE-CREATION USING VIDEO ANALYTICS AND METADATA

This application relates to U.S. Ser. No. 17/213,291, filed Mar. 26, 2021, which relates to U.S. Ser. No. 16/208,861, filed Dec. 4, 2018, which relates to U.S. Ser. No. 16/106,777, filed Aug. 21, 2018, which relates to U.S. Provisional Application No. 62/548,548, filed Aug. 22, 2017. This application also relates to U.S. Ser. No. 15/591,459, filed May 10, 2017. This application also relates to U.S. Ser. No. 15/618,286, filed Jun. 9, 2017. Each of the mentioned applications are hereby incorporated by reference in their entirety.

FIELD OF THE INVENTION

The invention relates to video capture generally and, more particularly, to a method and/or apparatus for implementing roadway scene re-creation using video analytics and metadata.

BACKGROUND

Installing a dashboard camera on a vehicle is becoming increasingly common. The dashboard cameras capture detailed scenes of roadway events using high definition or even ultra-high-definition video. The encoded high or ultra definition video data are typically stored together with time synchronization to an onboard storage medium such as an SD card, CF card, internal memory, etc. In the event of an incident, the stored data can be exported and the video can be reviewed for post-incident analysis. Collisions involving vehicles are expensive, especially when death or injury occurs, with substantial financial repercussions to the individuals, companies and associated insurance providers involved.

Storage of video data generally occupies a large amount of storage capacity. For a dashboard camera video, continually capturing video results is a large storage burden (i.e., storing every frame of video captured even if processed with high efficiency encoding techniques such as H.265). Removable storage media, such as consumer-level SD cards might have a storage capacity range from 32 GB-1 TB. Even a 1 TB storage capacity will reach capacity when continually recording. Most dashboard cameras implement a circular buffer that effectively erases the oldest data with new incoming data periodically in order to ensure storage capacity for the latest recordings. If an event is flagged (either automatically, or through driver action, such as pushing an "event" button), the system can allocate a predetermined amount of capacity for the data before and after the event to preserve a video recording outside of the circular buffer.

In some scenarios, significant events may not be flagged (or understood by the system to be significant) until long after the video recording has been discarded. For example, a delivery company may be contacted by an irate customer with a complaint that the delivery truck had backed over a flower garden the previous day when the owner was not home. If the driver had no recollection of such an event and the system was not aware of any damage to the vehicle or property, then the event might not have been flagged for preservation. The truck may have had several cameras that recorded various points-of-view that could exonerate the company and driver, but the video and sensor data is no longer available.

In a vehicle fleet scenario, (i.e., a taxi service, a delivery service, a utility service, etc.) there is a preference to avoid accidents or other incidents altogether through an activity called driver coaching. Risky or accident-prone driver behavior can be flagged by the system and either preserved locally at the on-board storage or sent via RF transmission for analysis by a remotely located driving coach. The driving coach can review the incident and provide feedback to the driver on how to eliminate the risky behavior. Uploading large amounts of video data, and performing a manual, visual review of the driver behavior to flag undesired activity is time-consuming. The coach is unable to immediately notify the driver with corrective action, particularly in a high-risk scenario. For example, distracted driving is well known to severely heighten the risk of an accident. If the driver is found to be smoking, eating or texting during driving the fleet operation center would want to be notified immediately to contact the driver without delay to stop the activity before the driver can continue.

Sending video data in real-time during the event is burdensome at best, as even state of the art encoded video represents an enormous amount of data. The time and cost to transmit the video data over limited bandwidth networks available on the roadways is prohibitive. Wireless networks, especially outside of a home or corporate domain are notoriously bandwidth constrained and data bandwidth is expensive. Uploading minutes of HD or Ultra-HD video data is expensive and time consuming.

In the event of an automobile accident, providing accurate details as quickly as possible to the relevant stakeholders is important (i.e., correct description of the accident, insurance information, value of damages, etc.). Stakeholders may include local emergency services, police, insurance companies, among others. Even if the video data of the accident is available, manually flagging and communicating the video data is cumbersome.

It would be desirable to implement roadway scene re-creation using video analytics and metadata.

SUMMARY

The invention concerns a system comprising a capture device and a database. The capture device may be configured to capture video, perform video analysis on the captured video to identify characteristics about objects in the captured video and determine an absolute location of the objects, store metadata separate from the captured video in response to the video analysis and communicate with a wireless communication device. The database may be configured to communicate with the wireless communication device, store the metadata received from the wireless communication device, re-create a scene in response to the characteristics and absolute location of the objects in the metadata and generate an animation based on the scene using the metadata received over time. The metadata may be communicated without the captured video. The animation may provide a visualization similar to the captured video using only the metadata.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
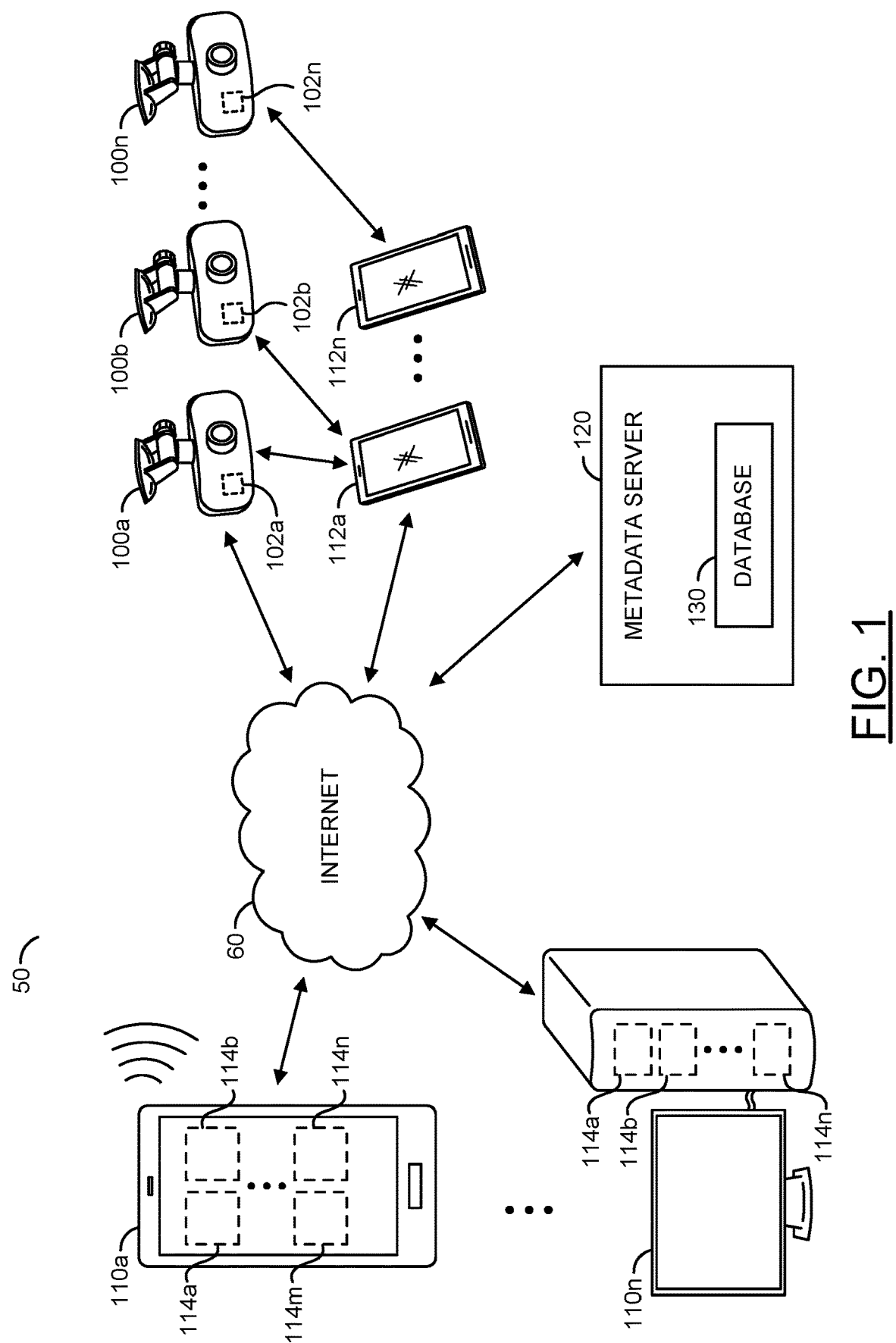
FIG. 1 is a diagram illustrating an example system in accordance with an embodiment of the present invention.

Embodiments of the present invention include providing roadway scene re-creation using video analytics and metadata that may (i) implement vehicle-mounted cameras configured to perform local video analytics, (ii) generate metadata corresponding to captured video, (iii) store metadata about multiple vehicles, (iv) provide a searchable database of video metadata, (v) use a current location to determine an absolute location of objects in video, (vi) transfer metadata from a vehicle-mounted camera to a database via a user communication device without communicating video data, (vii) generate an animation representing information in video data, (viii) re-create a scene from captured video after the source video file is no longer available, (ix) provide alternate views in a re-created scene other than the point of view of the vehicle-mounted camera, (x) preserve space on a storage medium for metadata and/or (xi) be implemented as one or more integrated circuits.

Embodiments of the present invention may be configured to generate metadata in response to analyzing and detecting objects in captured video. The captured video may be generated using one or more camera systems mounted to a vehicle. In an example, a dashboard camera may be implemented as a forward facing camera that may capture a scene as high-quality video from a perspective similar to the perspective of a driver. In some embodiments, multiple cameras may be installed. In one example, the cameras may be configured with cabin viewpoints, which allow the occupants of the vehicle and the behavior of the occupants to be captured simultaneously with the forward viewpoint. In another example, the cameras may be installed at the sides of the vehicle, inside a cargo bay of a vehicle and at the back of a vehicle capturing the rearward view. Audio recording devices may also be employed to capture important auditory details inside or outside the cabin of the vehicle.

Embodiments of the present invention may be configured to capture data from an array of sensors (e.g., a sensor cluster) implemented in the camera system. Data from the sensor cluster may be recorded along with video data (e.g., HD video and/or Ultra HD video). In an example, the camera system may comprise sensors such as GPS/GNSS for real time location data, a magnetometer for direction, an accelerometer and gyroscope for positional data, rotational data, and acceleration data of the vehicle, etc. In some embodiments, the camera systems may be connected to the vehicle communication bus (e.g., a CAN bus) and capture state information from the vehicle (e.g., steering wheel position and movement, gas and brake pedal activation, service codes related to the vehicle engine state, tire inflation details, seatbelt engagement status, door ajar sensor warnings, etc.). The data from the sensor cluster, the vehicle communication bus input, and the encoded high-definition audio and video may be stored.

Embodiments of the present invention may be configured to perform real time video object detection and recognition. The object detection and/or recognition may be configured to determine relative and/or absolute positions of the objects detected. Characteristics of the objects may be determined (e.g., make/model/year of a vehicle, identifying features, a status of street lights, etc.). The identified objects, the positions of the objects and/or the characteristics of the objects may be stored as metadata separate from the video data. The metadata may be configured to provide a description of the information in the video data. The resulting data packets of the metadata may be used to replace the encoded video with codes that may adequately describe the object along with relative positions of the object with respect to the subject (e.g., ego) vehicle. The video data may be converted into objects, descriptions, and/or distances in the metadata. The metadata may be uploaded to a server and/or a remote computing device. The amount of data transferred by only transferring metadata may be less than the amount of data for transferring the video data. The remote computing device may analyze the metadata in order to generate an animation of the video data described by the metadata.

The camera systems may implement an edge device. The camera systems may be configured to perform real time video analytics at the edge (e.g., locally on the camera system instead of uploading to a cloud computing service for the video analytics). On-board computer processing may be configured to enable trained computer vision models to identify objects from video frames as part of the video processing pipeline. The objects may be identified before the video is encoded and/or stored. The information about the objects (e.g., the absolute locations accurately calculated with respect to the camera lens, the orientations, the characteristics, the statuses, etc.) may provide sufficient information about the objects such that the video data may not be necessary in order to re-create the events that occurred in the captured video in great detail at a later time. For example, the encoded pixel data may occupy a large amount of storage space and may include unnecessary details (e.g., details irrelevant to determining where vehicles are located, determining a cause of a crash, determining property damage, etc.) captured over a large number of video frames. The metadata may provide the important information about the objects captured in the metadata. In an example, the captured metadata may provide all important information concerning the objects from the scene using a much smaller storage space than storing video data of the scene.

Using the metadata generated, many details in the field of view of the camera systems may be identified and known without the need for the source video feed to be archived onboard the camera system and/or uploaded to a storage service. The video data may not need to be uploaded and/or recorded in real-time. The video data may not need to be transferred to a storage medium (e.g., when the vehicle arrives at a destination such as a fleet headquarters). The details about the objects determined from the video data, information in the encoded audio, the sensor data, and the vehicle state data may be recorded in the metadata. The metadata may be input into a system configured to reproduce the scene as an animation for review based on the metadata alone.

Embodiments of the present invention may be configured to generate the metadata with sufficient information to re-create the captured scene such that encoded video may no longer need to be archived. Since the encoded video data may occupy a larger capacity of memory than the metadata, by not storing and/or transmitting the video data, the cost of the system may be reduced (e.g., cost savings on bandwidth costs for transferring data and cost savings on data storage). For the camera system, a storage medium (e.g., an SD card) may be implemented with a smaller capacity (e.g., lower cost) if the encoded video data does not need to be stored. For example, a large capacity SD card may be used to archive large amounts of encoded video data. However, the metadata may provide a condensed version of the details of the objects in the video data. In one example, the smaller sized metadata may be transmitted in real time using internal buffers. In another example, the smaller sized metadata may be stored using a smaller sized SD card since less video data may be stored (or none at all).

Since the metadata may provide a condensed (or compressed or minimized) version of the information about the content in the video data, the bandwidth consumed for uploading flagged events or the entire data feed may be possible. On roadways in localities where wireless communication infrastructure is not ideal, the lesser bandwidth consumed by transmitting the metadata without the video data may facilitate communication. Since bandwidth is generally expensive and costs increase as the amount of data transmitted increases, transmitting the metadata alone may limit costs significantly.

The reduction in bandwidth resulting from embodiments of the present invention may enable the camera systems to be implemented without communication modules that implement expensive data communication protocols (e.g., LTE/5G radio components or even Wi-Fi). The amount of data in the metadata may be small enough that less expensive (e.g., slower speed) wireless components may be implemented (e.g., Bluetooth communication to a smartphone may communicate the metadata and the smartphone, which may have the faster communication protocols may forward the metadata to the remote computing device). In another example, a wired connection (e.g., USB) may be implemented to transmit the metadata directly to a smartphone. Once the data is transmitted to the smartphone, the smartphone and may archive the metadata and/or communicate the metadata to a remote computing device (e.g., cloud storage).

Since the amount of data in the metadata may be small, the metadata may be constantly uploaded to the remote computing device. Constantly uploading the metadata may ensure all the data is uploaded in the case of data loss on the camera system. For example, the storage medium (e.g., an SD card, an SSD, an HDD, onboard memory) may become corrupted or destroyed resulting in data loss. By uploading the small amount of data in real time, data preservation on the local storage medium may not be critical.

The video data may be discarded after being processed into the metadata. The metadata may comprise a smaller coding for the objects, positions, sensor cluster data and/or vehicle state information than the video data. In some embodiments, the camera systems may be implemented without a video encoder (e.g., further reducing costs).

Referring to FIG. 1, a diagram illustrating an example system 50 in accordance with an embodiment of the present invention is shown. The system 50 may comprise a block (or circuit) 60, blocks (or circuits) 100a-100n, blocks (or circuits) 110a-110n, blocks (or circuits) 112a-112n and/or a block (or circuit) 120. The block 60 may be a network. The blocks 100a-100n may implement video capture devices. The blocks 110a-110n may implement subscriber devices (e.g., subscriber communication devices). The blocks 112a-112n may implement user devices (e.g., user communication devices). The block 120 may implement a server computer. The system 50 may comprise other components (not shown). The number and/or types of components implemented by the system 50 may be varied according to the design criteria of a particular implementation.

The network 60 may enable communication between the various components of the system 50. In an example, the network 60 may be the internet and/or a wide area network. Some of the components of the system 50 may communicate with the internet 60 wirelessly. Some of the components of the system 50 may communicate with the internet via a hard-wired connection.

The subscriber devices 110a-110n and/or the user communication devices 112a-112n may be configured to execute computer readable instructions (e.g., executable programs, apps, binaries, etc.). For example, the subscriber devices 110a-110n and/or the user communication devices 112a-112n may be implemented as a desktop computer, a laptop computer, a netbook computer, a tablet computing device, a phablet computing device, a smartphone, a smartwatch, smart clothing (e.g., clothing with LTE communication built in), human implantable devices (e.g., a computer chip embedded under the skin), etc. In an example, the subscriber devices 110a-110n and/or the user communication devices 112a-112n may be implemented as a vehicle capable of 3G/4G/LTE/5G communication (e.g., a vehicle with a touch-screen infotainment system). Generally, the subscriber devices 110a-110n and/or the user communication devices 112a-112n may be a device capable of data transmission to the network 60 and may comprise a display, a processor, a memory, an input (e.g., mouse, keyboard, touchscreen, voice recognition, etc.) and/or an output (e.g., a display, haptic feedback, a speaker, etc.). In some embodiments, the subscriber devices 110a-110n and/or the user communication devices 112a-112n may have similar implementations. For example, the user communication devices 112a-112n may be wireless communication devices. The type and/or features of the subscriber devices 110a-110n and/or the user communication devices 112a-112n may be varied according to the design criteria of a particular implementation.

Each of the subscriber devices 110a-110n may be configured to connect to the network 60 (e.g., hard-wired, Wi-Fi, etc.). The subscriber devices 110a-110n may be configured to store and/or execute the computer readable instructions 114a-114n. Executing the computer readable instructions 114a-114n may enable the subscriber devices 110a-110n to display various interfaces, generate output and/or receive input. For example, the app 114a may be a front-end for interacting with the system 50.

Each of the capture devices 100a-100n may be configured to capture video data. In some embodiments, the capture devices 100a-100n may be implemented as vehicle-mounted cameras (e.g., dashcams) to record video while a user drives the vehicle. In one example, each vehicle may be equipped with one of the capture devices 100a-100n. In another example, one vehicle may be equipped with more than one of the capture devices 100a-100n (e.g., to capture multiple fields of view and/or perspectives from the vehicle). In some embodiments, the capture devices 100a-100n may be cameras mounted at stationary locations (e.g., security cameras mounted on buildings). For example, the stationary camera may generate metadata used to determine roadway data. The implementation of the capture devices 100a-100n may be varied according to the design criteria of a particular implementation.

In some embodiments, the capture devices 100a-100n may be configured to communicate directly with the network 60. For example, the capture devices 100a-100n may comprise components implementing Wi-Fi communication and/or 3G/4G/LTE/5G (e.g., cellular) communication. In some embodiments, the capture devices 100a-100n may be configured to communicate indirectly with the network 60. For example, the capture devices 100a-100n may comprise short-range communication such as Bluetooth and/or Wi-Fi (e.g., short-range communication to a tethered device such as a smartphone). A cost of manufacturing the capture devices 100a-100n may be reduced if no 3G/4G/LTE/5G is implemented. A 3G/4G/LTE/5G connection further adds costs for the user since 3G/4G/LTE/5G generally involves a subscription to a carrier (and potential data usage penalties). For example, a cost of the capture devices 100a-100n may be lower when Bluetooth alone and/or Bluetooth/Wi-Fi is implemented compared to a camera that implements 3G/4G/LTE/5G hardware. Implementing the capture devices 100a-100n with a low cost may enable users to buy more than one of the capture devices 100a-100n and/or provide a larger user base. When the system 50 has more of the capture devices 100a-100n available to capture video data and/or provide metadata, more data points may be available for analysis. Generally, having more data points enables more useful analytical results generated by the system 50. In some embodiments, the capture devices 100a-100n may comprise a display and/or an input interface. For example, the capture devices 100a-100n may be configured to run apps (e.g., the computer executable instructions 114a-114n). In another example, the capture devices 100a-100n may be implemented as smartphones configured as cameras.

Each of the user communication devices 112a-112n may be configured to connect to the network 60 and/or the capture devices 100a-100n. In one example, the user communication devices 112a-112n may implement wireless communication devices. The user communication devices 112a-112n may comprise components configured to implement a wide area network connection (e.g., Wi-Fi) and/or local, device-to-device connections (e.g., Bluetooth, ZigBee, Z-Wave, etc.). For example, the user communication devices 112a-112n may implement a Wi-Fi and/or 3G/4G/LTE/5G connection to the internet 60 and a Bluetooth and/or Wi-Fi connection to one or more of the capture devices 100a-100n. In some embodiments, the user communication devices 112a-112n may be configured to send/receive data to/from the internet 60. For example, the user communication devices 112a-112n may receive data (e.g., video data, metadata, etc.) from one or more of the capture devices 100a-100n and transmit the data to the internet 60. In another example, the user communication devices 112a-112n may receive data (e.g., data requests, interrupt requests, firmware updates, etc.) from the internet 60 and transmit the data to the capture devices 100a-100n.

Generally, the user communication devices 112a-112n are implemented as portable devices (e.g., carried by a person, mounted in a vehicle, battery powered, etc.). The user communication devices 112a-112n may be configured to execute the computer readable instructions 114a-114n. In one example, the subscriber devices 110a-110n may store and/or execute one version (e.g., a subscriber version) of an app (e.g., the computer readable instructions 114a) and the user communication devices 112a-112n may store and/or execute another version (e.g., a provider version) of an app (e.g., the computer readable instructions 114b). One of the user communication devices 112a-112n may be configured to communicate with more than one of the capture devices 100a-100n (e.g., one smartphone may connect to multiple vehicle-mounted cameras in the same vehicle). In the example shown, the smartphone 112a communicates with the capture device 100a and the capture device 100b (e.g., the driver may have the smartphone and the vehicle may have two vehicle-mounted cameras). The connections between the user communication devices 112a-112n and/or the capture devices 100a-100n may be varied according to the design criteria of a particular implementation.

Each of the capture devices 100a-100n may comprise a respective block (or circuit) 102a-102n. The circuits 102a-102n may implement video processor functionality. In some embodiments, the circuits 102a-102n may be a system-on-chip (SoC). For example, the circuits 102a-102n may comprise input/output, a memory, processors, etc. The components and/or functionality of the circuits 102a-102n may be varied according to the design criteria of a particular implementation.

The circuits 102a-102n may be configured to record, encode, decode, transmit and/or store video data. The circuits 102a-102n may be configured to perform video analysis and/or video analytics. For example, the circuits 102a-102n may process video, identify patterns in the video data and/or recognize objects captured by the video data. Heuristics, templates and/or comparisons may be performed by the circuits 102a-102n to recognize and/or identify objects in captured video frames (e.g., video data) as objects that can be perceived by humans. In one example, the circuits 102a-102n may identify an object as a vehicle (or part of a vehicle such as a hood, a license plate, etc.). In another example, the circuits 102a-102n may identify text, shapes and/or colors. In yet another example, the circuits 102a-102n may identify objects (e.g., signs, pedestrians, street lights, etc.). The video data captured by the circuits 102a-102n may be stored by the capture devices 100a-100n. In one example, the circuits 102a-102n may implement a memory. In another example, the circuits 102a-102n may connect to an external memory (e.g., the capture devices 100a-100n may be configured to receive a flash memory such as a SD card, a microSD card, NAND memory, Compact Flash (CF) and/or an XD card).

The circuits 102a-102n may be configured to extract metadata from the captured video frames. The metadata may comprise information about objects detected in the video frames by the video analysis. The metadata may comprise information about the video data (e.g., a time the video was recorded, the model number of the camera recording the video, a location that the video was captured based on GPS information, an altitude that the video was recorded, a direction of the capture device while capturing the video data, etc.). For example, the circuits 102a-102n may comprise a GPS unit to determine GPS coordinates, a magnetometer to determine direction of travel and/or a real time clock (RTC) circuit to determine time.

The circuits 102a-102n may be configured to detect license plates. License plates may be detected, and the alphanumeric characters and/or symbols on the license plate may be identified. The license plate alphanumeric characters and/or symbols may be extracted from the captured video data as the metadata. For example, the circuits 102a-102n may detect, and store as metadata, the license plate alphanumeric characters and/or symbols, and store the license plate alphanumeric characters and/or symbols, the time the video was recorded, the longitude coordinate, the latitude coordinate, an altitude value, time of capture and/or the direction of the capture devices 102a-102n when the video was recorded. The circuits 102a-102n may be further configured to analyze the video data to extract metadata such as a make of a vehicle, a model of a vehicle, color(s) of a vehicle, number of pedestrians, number of vehicles and/or roadway characteristics (e.g., road condition, weather condition, traffic signals present, state of traffic signals, road signs present, amount of traffic, flow of traffic, etc.). The metadata may be associated with the corresponding video data. For example, each video clip captured may be assigned an identification number and the metadata associated with the video clip may have the identification number.

The server 120 may be configured to store data, retrieve and transmit stored data, process data and/or communicate with other devices. In an example, the server 120 may implement a metadata server. The server 120 may be implemented as part of a cloud computing platform (e.g., distributed computing). In an example, the server 120 may be implemented as a group of cloud-based, scalable server computers. By implementing a number of scalable servers, additional resources (e.g., power, processing capability, memory, etc.) may be available to process and/or store variable amounts of data. For example, the server 120 may be configured to scale (e.g., provision resources) based on demand. The server 120 may implement scalable computing (e.g., cloud computing). The scalable computing may be available as a service to allow access to processing and/or storage resources without having to build infrastructure (e.g., the provider of the system 50 may not have to build the infrastructure of the server 120).

The server 120 may be configured to execute computer readable instructions. In an example, the server 120 may process HTML, CSS, Javascript, PHP, SQL, AJAX applications, APIs, etc. The server 120 may be configured to distribute apps (e.g., one or more of the computer readable instructions 114a-114n) to the subscriber devices 110a-110n and/or the user communication devices 112a-112n. The server 120 may be configured to generate interfaces (e.g., graphical user interfaces) based on stored data for the subscriber devices 110a-110n. For example, the server 120 may generate data to implement an interface, the data may be sent to the subscriber devices 110a-110n, the subscriber devices 110a-110n may interpret the data to generate a user interface, the user may interact with the user interface to provide requests, the subscriber devices 110a-110n may transmit the requests to the server 120 and the server may process the requests. Similarly, the capture devices 100a-100n and/or the user communication devices 112a-112n may interpret data from the server 120 to implement an interface. The processing capabilities and/or functionality of the server 120 may be varied according to the design criteria of a particular implementation.

The server 120 may comprise a block (or circuit) 120. The circuit 120 may implement a database (e.g., a remote database). The database 130 may store data and/or filter the stored data in response to search parameters. Details of the database 130 may be described in association with FIG. 2. Generally, the database 130 may store data provided by the capture devices 100a-100n. In an example, the database 130 may store the metadata. Search parameters may be transmitted by the subscriber devices 110a-110n and the database 130 may be searched based on the search parameters. For example, the database 130 may enable the metadata to be associated with the video data stored by (and located on) the capture devices 100a-100n.

The system 50 may be configured to provide a searchable, real time database of roadway video. In an example, the system 50 may be implemented to assist in time-critical challenges (e.g., AMBER alerts, roadway crime, asset recovery, auto insurance investigation, etc.). The system 50 may implement a "Big Data" approach to providing and/or searching captured video and/or metadata.

The system 50 may be implemented using inexpensive cameras 100a-100n to program participants (e.g., the users and/or the data producers). The data producers may install the capture devices 100a-100n. For example, the data producers may install the capture devices 100a-100n on vehicles as dashcams. The capture devices 100a-100n may provide the benefits of a security camera and/or a dashboard camera to the data producers (e.g., security, video evidence, video data for uploading to video services such as YouTube, etc.). In some embodiments, the system 50 may determine an amount of video recorded and provide rewards (e.g., perks) to the data producers (e.g., discounts on the capture devices 100a-100n).

The data producers may use the capture devices 100a-100n to collect and/or upload video metadata to the server 120 (e.g., for storage in the database 130). For example, the video metadata may be uploaded via the user communication devices 112a-112n. The data producers may provide the recorded video to the server 120 on demand. The data producers may be compensated on an ongoing basis for providing the video metadata and/or the recorded video. In one example, the data producer may receive a payment for providing and/or making a pre-determined amount of recorded video available. In another example, the data producer may receive a payment each time one of the video recordings is requested.

The video metadata may be accumulated in the remote database 130. For example, the database 130 may be curated. The video metadata may be made available through a web interface to subscribers (e.g., the data consumers). The subscribers may use the subscriber devices 110a-110n to access the database 130. The database 130 and/or the server 120 may enable the subscribers to search the database 130 using search parameters. In one example, the interface may provide a map overlay (e.g., based on data presented by the server 120) that the subscriber may interact with on the subscriber devices 110a-110n to provide the search parameters. In another example, the subscriber may specify search parameters such as a location, a time of an incident and/or license plate data. The database 130 may perform a search of the metadata to determine whether any of the video metadata matches the search parameters.

The database 130 may provide the search results. The interface generated on the subscriber devices 110a-110n may provide the subscriber with a list of videos that match the search results communicated by the server 120. The subscriber may request available recorded video files for a given event. If a subscriber requests one of the video files, a request may be sent to the server 120. The server 120 and/or the database 130 may determine which of the capture devices 100a-100n captured the video based on the video metadata (e.g., the metadata may comprise an ID of a camera and/or user that captured the video). The server 120 may send a request to the user communication devices 112a-112n and/or the capture devices 100a-100n to upload the recorded video. If the capture devices 100a-100n still have the requested video stored, a video upload may be initiated. The recorded video may be trickled (e.g., uploaded as a low priority data transfer) from the corresponding one of the capture devices 100a-100n, through the corresponding one of the user communication devices 112a-112n and to the internet 60. In some embodiments, the recorded video may be buffered on one of the user communication devices 112a-112n until particular conditions are met for uploading the video recording (e.g., until a Wi-Fi connection is available). The server 120 may notify the subscriber that the video is available for download. An account of the data producer that uploaded the video may be credited in response to the video upload.

The system 50 may enable data provider users to access the database 130. The data provider users may feed the database 130 in real time with video metadata. The system 50 may enable the subscriber users to search the database 130. When the database 130 determines there is a hit for a search request, the system 50 may allow the subscriber to get access to the video metadata and/or the video recording.

The capture devices 100a-100n may be implemented with inexpensive hardware powerful enough to perform video analytics (e.g., license plate recognition (LPR)). The video analytics may be performed in real time, while capturing the video data. In one example, the capture devices 100a-100n may be sold with a low margin to encourage wide adoption of the device so that many users may be the data providers to capture large amounts of video data for the system 50. Since data providers may be compensated for providing the video data and/or video metadata, the data providers may have the ability to turn the capture devices 100a-100n into a money making tool. For example, in the system 50 the drivers may own the capture devices 100a-100n and use them to make money (e.g., similar to how an Uber, Lyft or other ridesharing service drivers own a vehicle and use the vehicle to make money).

The database 130 may be implemented to receive video metadata, index the metadata and/or provide responses to search requests in real time. In some embodiments, the database 130 may store video recordings. Generally, the video metadata (e.g., plate number, GPS coordinates, time, etc.) is uploaded via the user communication devices 112a-112n without the corresponding recorded video (e.g., the metadata may be uploaded before the video data is uploaded). If one of the subscriber users requests a recorded video file corresponding to the video metadata, the system 50 may enable the video data to be uploaded to the metadata server 120 (e.g., data may be uploaded as a low-priority data transfer). The recorded video data may have a limited time frame of availability. In one example, the capture devices 100a-100n may be configured to overwrite stored video as new video data is captured (e.g., a loop recording). In an example of 40 hours of driving per week with the capture devices 100a-100n implementing a 128 GB SD card and recording at 10 Mbit/s, the recorded video may be overwritten in approximately 3.5 days. When a video expires (e.g., is overwritten), the video metadata stored in the database 130 may still provide useful information to the subscriber user (e.g., which vehicles were in a particular area at a particular time).

The video metadata and/or the recorded video may provide useful information to the subscriber users. In one example, the system 50 may be helpful in an AMBER Alert situation. In another example, video evidence may be provided to insurance companies involved with a given auto accident. Different viewpoints and/or camera angles may be used to determine the circumstances that led up to an accident. In yet another example, the system 50 may save many government agencies (e.g., Department of Transportation) a tremendous amount of money in planning infrastructure (e.g., to limit infrastructure development and/or expand infrastructure development based on driving habits). In still another example, the system 50 may provide investigative departments (e.g., Department of Justice, local police, highway patrol, homeland security, etc.) with more information (e.g., post-mortem incident investigation).

Generally, the provider of the system 50 may not capture any video data. The video data may be captured by the data providers that have purchased (or otherwise received) the capture devices 100a-100n. The provider of the system 50 may curate the resulting data generated by the data providers.

Figure 2:
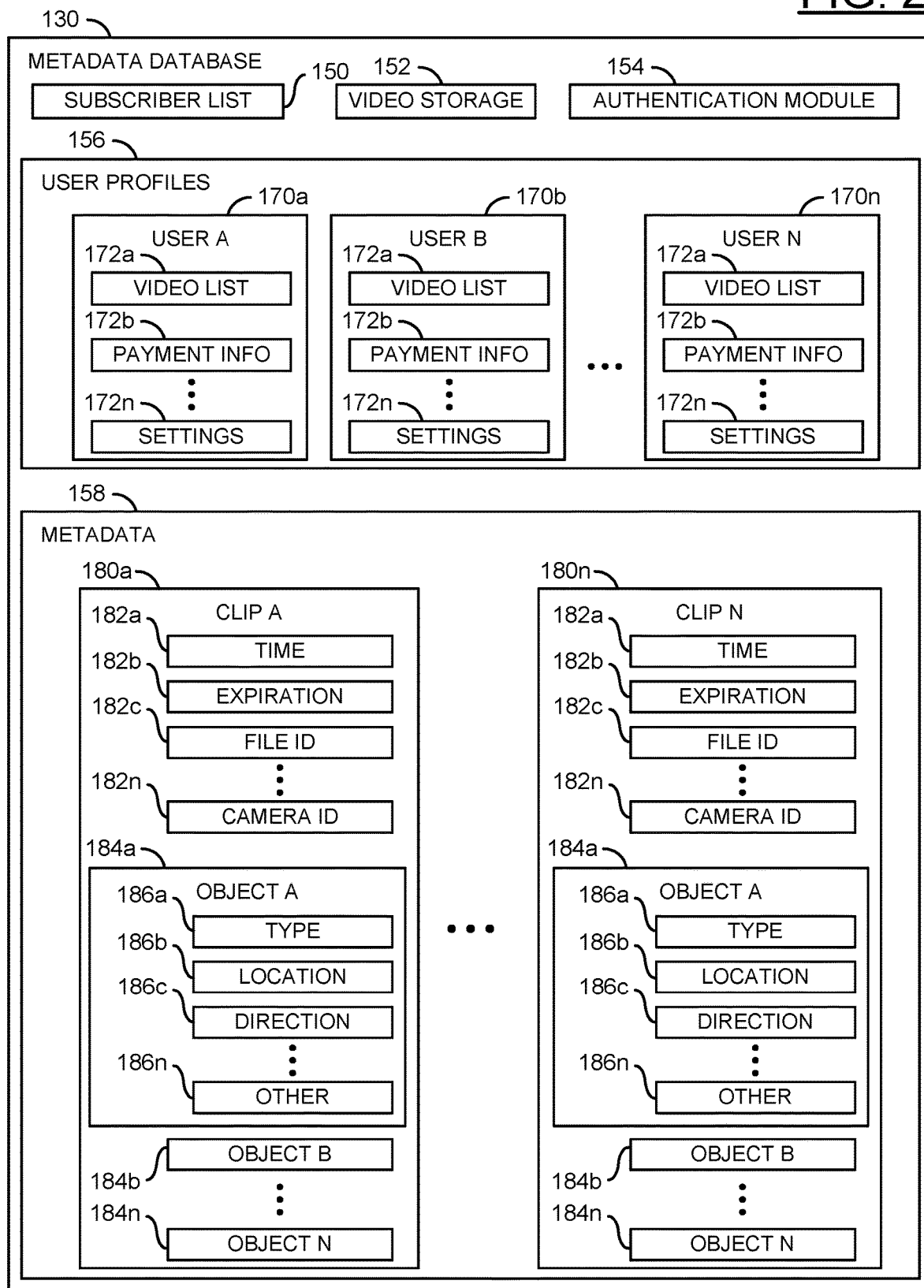
FIG. 2 is a diagram illustrating a block diagram representing data sets stored in a database.

Referring to FIG. 2, a diagram illustrating a block diagram representing example data sets stored in the database 130 is shown. The database 130 may comprise a block (or circuit) 150, a block (or circuit) 152, a block (or circuit) 154, a block (or circuit) 156 and/or a block (or circuit) 158. The block 150 may comprise a subscriber list. The block 152 may comprise video storage. The block 154 may comprise an authentication module. The block 156 may comprise user profiles. The block 158 may comprise plate and/or object metadata. The database 130 may comprise other blocks (or data sets). The implementation of the database 130 may be varied according to the design criteria of a particular implementation.

The subscriber list 150 may be configured to store information about the subscriber users. The subscriber list 150 may provide an account for each subscriber user. For example, a log in with password may be implemented by the app 114a to enable the subscriber user to access the database 130 from the subscriber device 110a. The subscriber list 150 may enable the system 50 to accept payment from subscriber users that request video data (e.g., store payment information, process payment information, etc.). The subscriber list 150 may implement individual settings, configurations and/or notifications for each of the subscriber users.

The video storage 152 may store recorded video data. In some embodiments, the data providers may upload the recorded video data to the database 130 when requested by the subscriber users. The database 130 may provide storage (e.g., temporary hosting) of the recorded video data to enable the subscriber user to download the requested video data. In some embodiments, peer-to-peer data transfers may be implemented to share the recorded video data (e.g., the database 130 may not store the recorded video data). Generally, the recorded video uploaded from the capture devices 100a-100n may be stored by the server 120.

The authentication module 154 may be configured to provide security for the data stored in the database 130. The authentication module 154 may be configured to prevent unauthorized access to the database 130. In one example, the authentication module 154 may be implemented as a username and password. For example, the user communication devices 112a-112n may provide credentials to the database 130 to upload the video metadata and/or the recorded video. In another example, two-factor authentication may be implemented by the authentication module 154. For example, the subscriber user may log in using the subscriber devices 110a-110n by providing a username, a password, and an additional key (e.g., a text message with a passcode provided to the smartphone 110a). The implementation of the authentication module 154 may be varied according to the design criteria of a particular implementation.

For example, users on the subscriber list 150 may be authorized users of the database 130. Generally, not all users have access to the database 130. The authentication module 154 may implement a heavy layer of security for the subscriber users and/or the data provider users to log onto the system 50. Since the database 130 may store privacy information (e.g., license plate data, location information, credit card information, banking information, etc.) the database 130 may be secured with a traditional approach and then have a second layer of security added. Security may be provided even if the implementation of the authentication module 154 adds inconvenience to the users.

The user profiles 156 may store data corresponding to the data provider users. The user profiles 156 may comprise blocks (or circuits) 170a-170n. The blocks 170a-170n may comprise the data provider profiles. Each of the data provider profiles 170a-170n may store information corresponding to an individual data provider. Each of the data provider profiles 170a-170n may comprise blocks (or circuits) 172a-172n. The blocks 172a-172n may be configured to store data sets for the data providers 170a-170n.

The data sets 172a-172n may facilitate access to the database 130 for each of the data provider users. In an example, the data set 172a may store a video list. The video list 172a may comprise a list of videos that have been recorded by a particular data provider. For example, the video list 172a may be used to send a request to the capture devices 100a-100n and/or the user communication devices 112a-112n to upload the recorded video data. In another example, the video list 172a may be used to provide a payment to the particular data provider that captured the requested video data. In an example, the data set 172b may store payment information. The payment information 172b may associate credit card, electronic payment (e.g., PayPal, Bitcoin, Apple Pay, Google Wallet, etc.) and/or bank information with a particular one of the data provider users. The payment information 172b may be used to facilitate payments to the data provider that has uploaded a requested recorded video.

In some embodiments, the data provider may receive one of the capture devices 100a-100n in exchange for providing the payment information 172b and if enough video data is provided (e.g., provided on a consistent basis) the data collector user may not be charged. If the capture device is not used enough (or not used regularly, a charge may be incurred (e.g., due to inactivity). In an example, the data provider may receive one of the capture devices 100a-100n free of charge and be able to use the camera as a regular dashcam as well as for providing data for the system 50. In one example, the data provider may not be charged for one of the capture devices 100a-100n for the first 90 days and if data is provided to the system 50 during the first 90 days no charge will be incurred. To avoid a situation where a freeloader receives the camera for free and uses the camera with the system 50 for a minimum threshold amount to avoid a fee and then stops providing data to the system 50, the payment information 172b may be stored to charge a penalty fee to encourage the data provider to provide data.

In an example, the data set 172n may comprise user settings. The user settings 172n may provide a configuration and/or preferences for each of the data providers 170a-170n. The data sets 172a-172n may store other information (e.g., a user name, a profile picture, a data usage plan of the data provider, etc.). In an example, the data usage plan may provide details of a carrier (e.g., 3G/4G/LTE/5G provider) to manage data transmission (e.g., prefer transferring large files over Wi-Fi instead of a limited data plan). The amount and/or type of data stored in the data sets 172a-172n of each of the data provider profiles 170a-170n may be varied according to the design criteria of a particular implementation.

The metadata 158 may store information about various captured videos (e.g., video clips) 180a-180n. The video clips 180a-180n may not be the actual video data (e.g., the actual video data may be stored with the video storage 152). The video clips 180a-180n may comprise information about the video clips and/or information about objects detected in the video clips by the capture devices 100a-100n.

In some embodiments, each video clip metadata 180a-180n that is captured and/or uploaded by the capture devices 100a-100n may be stored by the database 130. The video data associated with the video clip metadata 180a-180n may be stored in the video storage 152. Generally, the video data in the video storage 152 may be stored temporarily. For example, video data may have a relatively large file size and storing video data indefinitely may be impractical. However, the video clip metadata 180a-180n may have a much smaller file size than the video data. The video clip metadata 180a-180n may be configured to provide sufficient information about the video data to re-create the positioning of various objects in the video data even after the video data is no longer available.

Every time video data is uploaded to the database 130, the corresponding video metadata 180a-180n may be stored by the database 130. The video metadata 180a-180n may be stored long-term compared to the video data. In some embodiments, the metadata 158 may be organized by detected objects instead of the video clip metadata 180a-180n. In one example, where the objects detected are license plates, each time a license plate is detected a new metadata entry may be created. For example, each of the license plate entries may comprise the associated clips 180a-180n. The clips 180a-180n may comprise metadata entries for each time a license plate has been read by one of the capture devices 100a-100n. For example, each time a license plate is detected, a new one of the clips 180a-180n may be appended to the corresponding one of the license plate entries. Similarly, if the objects detected are vehicles then the video clips 180a-180n may be associated with a particular vehicle. The arrangement of the metadata 158 may be varied according to the design criteria of a particular implementation.

Each video clip 180a-180n is shown comprising metadata 182a-182n. The clip metadata 182a-182n may comprise the data extracted by the capture devices 100a-100n from the video recorded by the capture devices 100a-100n and/or data associated with the video recorded by the capture devices 100a-100n. The video clip metadata 182a-182n may be configured to provide useful information about the video clips that have been uploaded.

In one example, the video clip metadata 182a may comprise a time. The time 182a may indicate a date and/or time of day when the corresponding video was recorded (e.g., a timestamp). The time 182a may be used to find recorded video that occurred at a particular time. In another example, the video metadata 182*b* may comprise an expiration flag. The expiration flag 182*b* may indicate whether or not the recorded video is still available (e.g., stored in the memory of the capture device, stored in the video storage 152, has not been overwritten, etc.). For example, the expiration flag 182*b* may have a particular value (e.g., a logical one value) if the video has been overwritten. If the expiration flag 182*b* indicates that the recorded video is no longer available, the video clip metadata 180*a*-180*n* may still provide useful information. The video clip metadata 182*c* may provide a file ID. The file ID 182*c* may be used to associate the video clip metadata 180*a*-180*n* to a particular stored video file (e.g., either in the video storage 152 and/or in the memory of the cameras 100*a*-100*n*). For example, if the expiration flag 182*b* indicates the video data is still available then the file ID 182*c* may be used to retrieve the video data. The video clip metadata 182*n* may provide a camera ID. The camera ID 182*n* may be used to associate the video clip metadata 180*a*-180*n* to a particular one of the cameras 100*a*-100*n* (e.g., the camera that captured the video data associated with the metadata). The camera ID 182*n* may enable the video data to be retrieved from the capture devices 100*a*-100*n* (if the video is still available) and/or to enable the data provider to be contacted for more information (or provide payment to the data provider user). The number and/or type of video clip metadata 182*a*-182*n* available may be varied according to the design criteria of a particular implementation.

The video clip metadata 180*a*-180*n* may comprise a number of objects 184*a*-184*n*. The objects 184*a*-184*n* may correspond to each object detected using the video analysis performed by the capture devices 100*a*-100*n*. In one example, the object 184*a* may be a particular vehicle detected in the video data. In another example, the object 184*b* may be a particular pedestrian detected in the video data. In yet another example, the object 184*c* may be a license plate detected in the video data. In still another example, the object 184*n* may be a particular sign and/or landmark detected in the video data. The number and/or types of objects 184*a*-184*n* stored with the video clip metadata 180*a*-180*n* may be varied according to the design criteria of a particular implementation.

Each of the objects 184*a*-184*n* may have associated object information 186*a*-186*n*. In an example, the object information 186*a* may correspond to an object type (e.g., a person, a vehicle, a building, a sign, a billboard, a license plate, etc.). The object type 186*a* may provide details about the associated objects 184*a*-184*n*. In one example, if the object is a vehicle, the object type 186*a* may indicate the make, model, year, color, license plate, number of passengers, distinctive markings, etc. The object information 186*b* may correspond to a location. The location 186*b* may comprise GPS coordinates corresponding to the object in the recorded video. The location 186*b* may be used to find recorded video that was captured at a particular location (e.g., at an intersection at a particular time). In some embodiments, the location 186*b* may comprise an absolute location of the objects 184*a*-184*n*. For example, the absolute location 186*b* may be determined by the video analysis performed by the capture devices 100*a*-100*n* to determine the actual coordinates of the objects detected instead of merely the GPS coordinates of the capture devices 100*a*-100*n*. In some embodiments, the location 186*b* may be the location of the object within the video frame (e.g., the distance of the object from the camera lens determined by the capture devices 100*a*-100*n* using video analysis).

The object information 186*c* may comprise a direction. In some embodiments, the direction 186*c* may indicate the direction of travel of the objects 184*a*-184*n* (or if the objects 184*a*-184*n* are stationary). For example, the direction 186*c* may be determined by the capture devices 100*a*-100*n* analyzing a sequence of video frames to determine where the object is moving over time. In some embodiments, the direction 186*c* may be the direction that the capture device 186*a*-186*n* was facing when the video data was captured. For example, the information from the location 186*b* and the direction 186*c* may be combined to determine the absolute location coordinates of the objects 184*a*-184*n*. Other types of metadata 186*n* may be stored about the objects 184*a*-184*n*. The types and/or amount of object information 186*a*-186*n* may be varied according to the design criteria of a particular implementation.

The information stored about the video clips 180*a*-180*n* may be used to identify vehicles, times, locations and/or other data about the recorded videos. The video clip metadata 180*a*-180*n* may be the data checked by the database 130 to determine results for a search query from the subscriber users. The video metadata 180*a*-180*n* may be used to approximate what may be recorded and/or visible when viewing the corresponding recorded video. The storage format for the metadata 158 may be implemented to enable re-enact and/or re-creating a scene (e.g., the vehicle locations) after the video data has expired (e.g., re-creating the arrangement of the objects when the video data is no longer available).

The circuits 102*a*-102*n* may be configured to perform object detection and/or video analysis to determine and/or recognize details of an object (e.g., of objects other than license plates). For example, in some video scenes, license plates may not be visible (e.g., the license plate is obstructed and/or not clear enough for optical character recognition). The circuits 102*a*-102*n* may be configured to determine roadway data in real time. In one example, the object information 186*a*-186*n* may store information corresponding to a type of vehicle detected (e.g., color of a car, make of a vehicle, model of a vehicle, year of a vehicle, speed of a vehicle, etc.). In another example, the object information 186*a*-186*n* may comprise roadway data (e.g., a lamp post detected, a street sign detected, a shape of a roadway detected, conditions of the road detected, etc.).

The database 130 may be configured to index the video metadata and/or associate new video metadata with license plate numbers and/or objects in real time. The database 130 may arrange the data to enable efficient filtering of information to provide fast search results for the subscriber users. In the example shown, the metadata 158 is arranged according to the video clips 180*a*-180*n*. In another example, the metadata 158 may be arranged based on a time, a location, a camera ID, etc.). The arrangement of the storage of the data in the database 130 may be varied according to the design criteria of a particular implementation.

The database 130 may be configured to create a database entry for each incoming video clip. In one example, the video metadata 182*a*-182*n* for the clip 180*a* may comprise information such as id="1", lp="5SAM333", date="20170307", time="14:30", alt="141.46354", lat="37.804440" and/or lng="−122.422874". In another example, the video metadata 182*a*-182*n* for the clip 180*i* may comprise information such as id="2", lp="5SAM333", date="20170307", time="14:32", alt="142.13576", lat="37.804643" and/or lng="−122.420899". The database 130 may receive a large amount of data collected from various data provider users in a short amount of time. The database 130 may be constantly (e.g., continually, regularly, periodically, etc.) sorting the received data in order to serve up results to the subscriber users on the web interface. For example, the database 130 may implement one file for each license plate to avoid parsing all stored data in order to filter out license plate results in real time.

Figure 3:
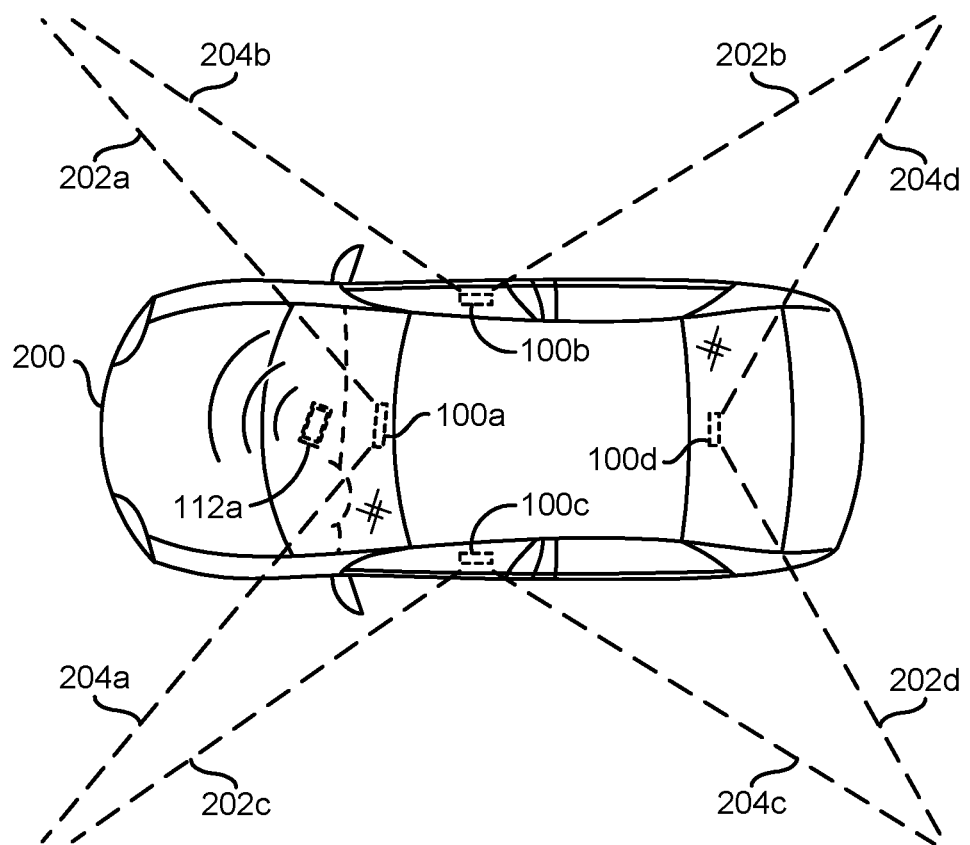
FIG. 3 is a diagram illustrating capturing video data from vehicle-mounted cameras.

Referring to FIG. 3, a diagram illustrating capturing video data from vehicle-mounted cameras is shown. A vehicle 200 is shown. The vehicle 200 may be a vehicle of a data provider (e.g., a data provider vehicle). The vehicle 200 may comprise a number of the capture devices 100a-100n. In the example shown, the capture device 100a may be installed facing the direction of travel of the vehicle 200, the capture device 100b may be installed directed away from a passenger side of the vehicle 200, the capture device 100c may be installed directed away from a driver side of the vehicle 200 and the capture device 100d may be installed directed facing opposite from the direction of travel of the vehicle 200.

The user communication device 112a is shown in the vehicle 200. In the example shown, the user communication device 112a may be a smartphone communicating to the network 60 (e.g., via a 3G/4G/LTE/5G wireless connection). For example, each of the installed cameras 100a-100d may communicate with the smartphone 112a (e.g., creating a local network) and the smartphone 112a may communicate with the external network 60. In the example shown, the capture devices 100a-100d may be positioned on the windows of the front, side and back of the vehicle 200 (e.g., suction cupped from the inside of the vehicle 200). The number, installation and/or locations of the capture devices 100a-100n in a vehicle may be varied according to the design criteria of a particular implementation and/or a preference of the data provider.

A line 202a and a line 204a are shown extending from the capture device 100a. The line 202a and the line 204a may represent a field of view captured by the capture device 100a. The field of view of the capture device 100a may record video of a view from the front of the vehicle 200 (e.g., from a perspective of a front of the vehicle 200). A line 202b and a line 204b are shown extending from the capture device 100b. The line 202b and the line 204b may represent a field of view captured by the capture device 100b. The field of view of the capture device 100b may record video of the view from the right of the vehicle 200 (e.g., from a perspective of a passenger side of the vehicle 200). A line 202c and a line 204c are shown extending from the capture device 100c. The line 202c and the line 204c may represent a field of view captured by the capture device 100c. The field of view of the capture device 100c may record video of the view from the left of the vehicle 200 (e.g., from a perspective of a driver side of the vehicle 200). A line 202d and a line 204d are shown extending from the capture device 100d. The line 202d and the line 204d may represent a field of view captured by the capture device 100d. The field of view of the capture device 100d may record video of the view from the rear of the vehicle 200 (e.g., from a perspective of a back of the vehicle 200).

The vehicle 200 may have a number of the capture devices 100a-100n installed. In the example shown, four of the capture devices 100a-100n may be installed. For example, the cameras may be directed for a "drive mode" (e.g., the camera 100a directed forward, and the camera 100d directed backwards) and the cameras may be directed for a "trawl mode" (e.g., the camera 100b and the camera 100c each directed sideways). For example, the trawl mode may be useful when in parking lots. The number of the capture devices 100a-100n installed on the vehicle 200 may be varied according to the design criteria of a particular implementation.

Figure 4:
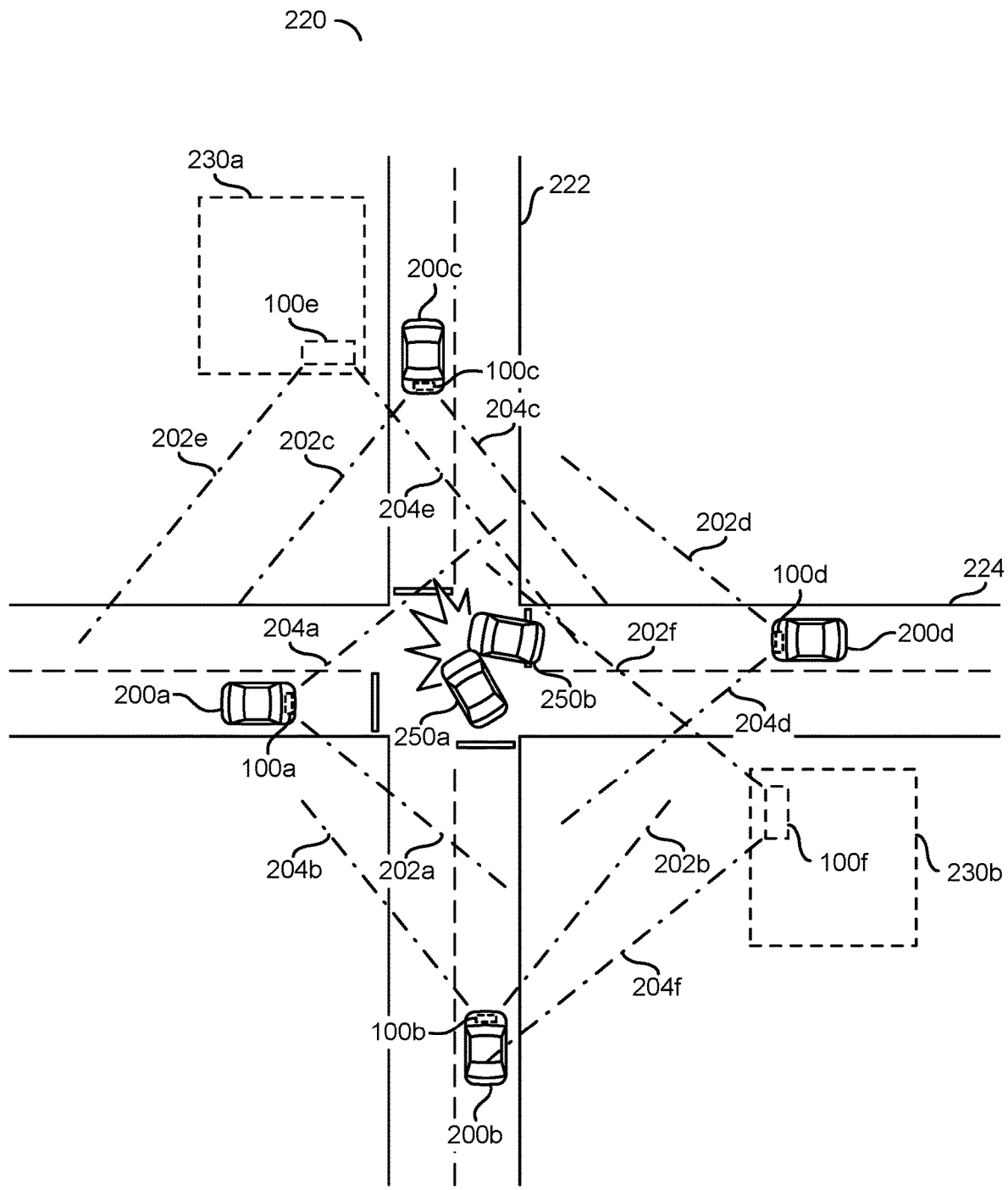
FIG. 4 is a diagram illustrating multiple vehicles capturing video footage of an event.

Referring to FIG. 4, a diagram illustrating multiple vehicles capturing video footage of an event 220 is shown. The event 220 may be a collision at an intersection of a road 222 and a road 224. A vehicle 250a and a vehicle 250b are shown colliding. The drivers of the vehicle 250a and the vehicle 250b may use the system 50 as subscriber users. For example, the subscriber users that drive the vehicle 250a and the vehicle 250b (or insurance companies representing the drivers of the vehicle 250a and/or the vehicle 250b to determine fault) may want video evidence from different viewpoints of the collision (e.g., to aid in resolving insurance claims that may arise as a result of the event 220).

The vehicle 200a may have the capture device 100a installed, the vehicle 200b may have the capture device 100b installed, the vehicle 200c may have the capture device 100c installed and/or the vehicle 200d may have the capture device 100d installed. The drivers of the vehicle 200a, the vehicle 200b, the vehicle 200c and/or the vehicle 200d may be data providers. A building 230a and a building 230b are shown. The building 230a may have the capture device 100e installed and the building 230b may have the capture device 100f installed as a security camera. In some embodiments, one or more of the capture devices 100a-100n may be implemented as stationary cameras. The owner of the building 230a and the owner of the building 230b may be data providers for the system 50 (e.g., capture video of the event 220).

The capture device 100a may capture one field of view (e.g., the line 202a and the line 204a) from the viewpoint of the vehicle 200a. The capture device 100b may capture one field of view (e.g., the line 202b and the line 204b) from the viewpoint of the vehicle 200b. The capture device 100c may capture one field of view (e.g., the line 202c and the line 204c) from the viewpoint of the vehicle 200c. The capture device 100d may capture one field of view (e.g., the line 202d and the line 204d) from the viewpoint of the vehicle 200d. The capture device 100e may capture one field of view (e.g., the line 202e and the line 204e) from the viewpoint of the building 230a. The capture device 100f may capture one field of view (e.g., the line 202f and the line 204f) from the viewpoint of the building 230b. The various fields of view may provide video metadata and/or video recordings from different viewpoints.

The database 130 may receive metadata corresponding to the video data captured by the capture devices 100a-100f of the event 220. For example, the database 130 may receive six different user IDs of the data provider users. The database 130 may receive six slightly different GPS coordinates corresponding to the different locations of the cameras 100a-100f. In some embodiments, the database 130 may receive the same timestamp from each of the capture device 100a-100f. In some embodiments, the timestamp may be slightly different because the video files may be stored as video clips having a pre-determined time (e.g., 2 minute video clips) and the start and end time of each video clip may depend on when the cameras 100a-100f were booted up (e.g., when the vehicles 200a-200d were started). In some embodiments, system 50 may be configured to synchronize the time on each of the capture devices 100a-100n (e.g., to ensure the timestamp for a start and end time of each video clip matches between the capture devices 100a-100n). The database 130 may receive up to 6 different direction metadata information. In some embodiments, multiple clips 180a-180n with metadata information 182a-182n and/or object information 186a-186n for each object detected may be received (e.g., depending on the length of the event 220).

The video metadata from each of the cameras 100a-100f may be uploaded to the database 130. Since two vehicles (e.g., 250a-250b) are in the car accident, the database 130 may associate at least the objects 184a-184b with two license plates and/or vehicle type entries (e.g., 184a for the vehicle 250a and 184b for the vehicle 250b). Depending on the fields of view, some of the cameras 100a-100n may not capture both license plates and/or vehicles (e.g., the field of view of the camera 100b may capture the license plate of the vehicle 250a but not capture the license plate of the vehicle 250b). License plate entries may be made for the data provider vehicles 200a-200d (e.g., the capture device 100a may capture the license plate of the vehicle 200d). Additional license plate and/or vehicle entries may be made for other objects and/or vehicles captured (e.g., the capture device 100b may capture the colliding vehicles 250a-250b as well as the vehicle 200a).

The metadata 158 may be extracted from the video data captured by each of the capture devices 100a-100n. The video metadata 158 may be associated with the video clips 180a-180n corresponding to each field of view captured. In one example, the video clip 180a may correspond to the metadata associated with the video data captured by the capture device 100a. In another example, the video clip 180b may correspond to the metadata associated with the video data generated by the capture device 100b. In one example, the object 184a may correspond with the vehicle 250a captured by the capture device 100a and associated with the video clip 180a and the object 184b may correspond to the vehicle 250b captured by the capture device 100a and associated with the video clip 180a. In another example, the object 184a may correspond with the vehicle 250b captured by the capture device 100b and associated with the video clip 180b and the object 184b may correspond to the vehicle 250a captured by the capture device 100b and associated with the video clip 180b. The subscriber users may use the subscriber devices 110a-110n (e.g., via the app and/or web interface 114a) to search the metadata 184a-184n to view any videos that may have been captured of the event 220.

In some embodiments, the capture devices 100a-100n may implement Wi-Fi communication (e.g., to transmit the metadata and/or the recorded videos to the network 60). Implementing the Bluetooth communication to transfer data between the capture devices 100a-100n and the user communication devices 112a-112n may be useful in the vehicles (e.g., 200a-200d) to forward metadata and/or recorded videos to the network 60. In some embodiments, the capture devices 100a-100n may implement Wi-Fi functionality to connect to access points that may be fixed (e.g., Wi-Fi hotspots, home networks, business networks, etc.). For example, if someone had a storefront or house that overlooked the intersection (or any field of view where license plate recognition and/or other type of roadway metadata extraction could be performed on passing vehicles), the cameras 100a-100n could be placed to face out a window of a home and/or business (e.g., similar to a consumer IP camera). Connecting the capture devices 100a-100n to a Wi-Fi access point may enable the cameras 100a-100n to operate like a consumer IP Camera but additionally provide the video clip metadata 180a-180n (e.g., by receiving payments from the system 50 in exchange for providing the video metadata, the cost of a security camera for the business may be subsidized). Similarly, a business operating a fleet of vehicles (e.g., taxi drivers, delivery drivers, drivers of a car-sharing company, etc.) may install the capture devices 100a-100n in an existing fleet of vehicles and make a small profit over time by receiving payments from the system 50 by being a data provider (and use the video data like an ordinary dash camera for post mortem analysis of any crash involving a vehicle from the fleet).

If the subscriber user (e.g., the driver of the vehicle 250a, the driver of the vehicle 250b, an insurance company representing the drivers of the vehicles 250a-250b, and/or another user) searches the video clips 180a-180n in the database 130, a list of videos of the event 220 may be provided. If the subscriber user decides to request a video recording of the event, the server 120 may send a request to one or more of the capture devices 100a-100n (or the associated user communication device 112a-112n). The circuits 102a-102n may set a flag for the requested video in response to the request from the server 120. Setting the flag for the requested video may be used to preserve the requested video recording (e.g., prevent the video from being over-written). The capture devices 100a-100n and/or the user communication devices 112a-112n may upload the video data to the server 120. In some embodiments, the associated video may be preserved for all data points that may be returned as search results of a search query. For example, the server 120 may send the request to one or more of the capture devices 100a-100n (or the associated user communication device 112a-112n) to preserve the video data associated with the search results so that the video data may be preserved in order to be made available if the subscriber user later decides to request the video data. The flag may be set for a pre-determined amount of time before the video is unflagged (e.g., to prevent storage of video data indefinitely).

In some embodiments, the video recording may be flagged for preservation in response to a request from a subscriber user. In some embodiments, the system 50 may send a request to all capture devices 100a-100n that have video data from a particular time and a particular location. For example, an event may occur that may be considered important (e.g., a VIP such as a celebrity is at a location, a crime has been committed, a gunshot was reported, a blast was reported, etc.). When a particular event has been determined to have occurred, all cameras 100a-100n in the vicinity may start preserving data. In one example, if the VIP event is happening presently, the video data being currently recorded may be preserved. In another example, the video data currently residing in the memory of the capture devices 100a-100n associated with the time of the event may be preserved (e.g., a crime is reported after the event occurs and later an interrupt request is provided to the capture devices 100a-100n to preserve potential evidence).

In some embodiments, the video metadata 182a-182b and/or the object information 186a-186n associated with each of the objects 184a-184n may enable the event 220 to be re-created, even if the video data is no longer available (e.g., expired, over-written, etc.). For example, the object information 186a-186n may be used for each of the objects 184a-184n of each of the video clips 180a-180n associated with the event 220 (e.g., based on a timestamp and/or general location) to determine the absolute location of each of the vehicles 200a-200d and/or the colliding vehicles 250a-250b. Even if the video data is no longer available, the object information 186a-186bn may provide detailed absolute coordinate information over a sequence of time. For example, the detailed absolute coordinate information may be used to indicate where each of the colliding vehicles 250a-250b were before, during and after the event 220. For example, by analyzing the absolute location coordinates over a sequence of time, the speed, direction of travel, the timing of the event 220 and/or other information about the colliding vehicles 250*a*-250*b* may be determined to re-create the event 220.

Figure 5:
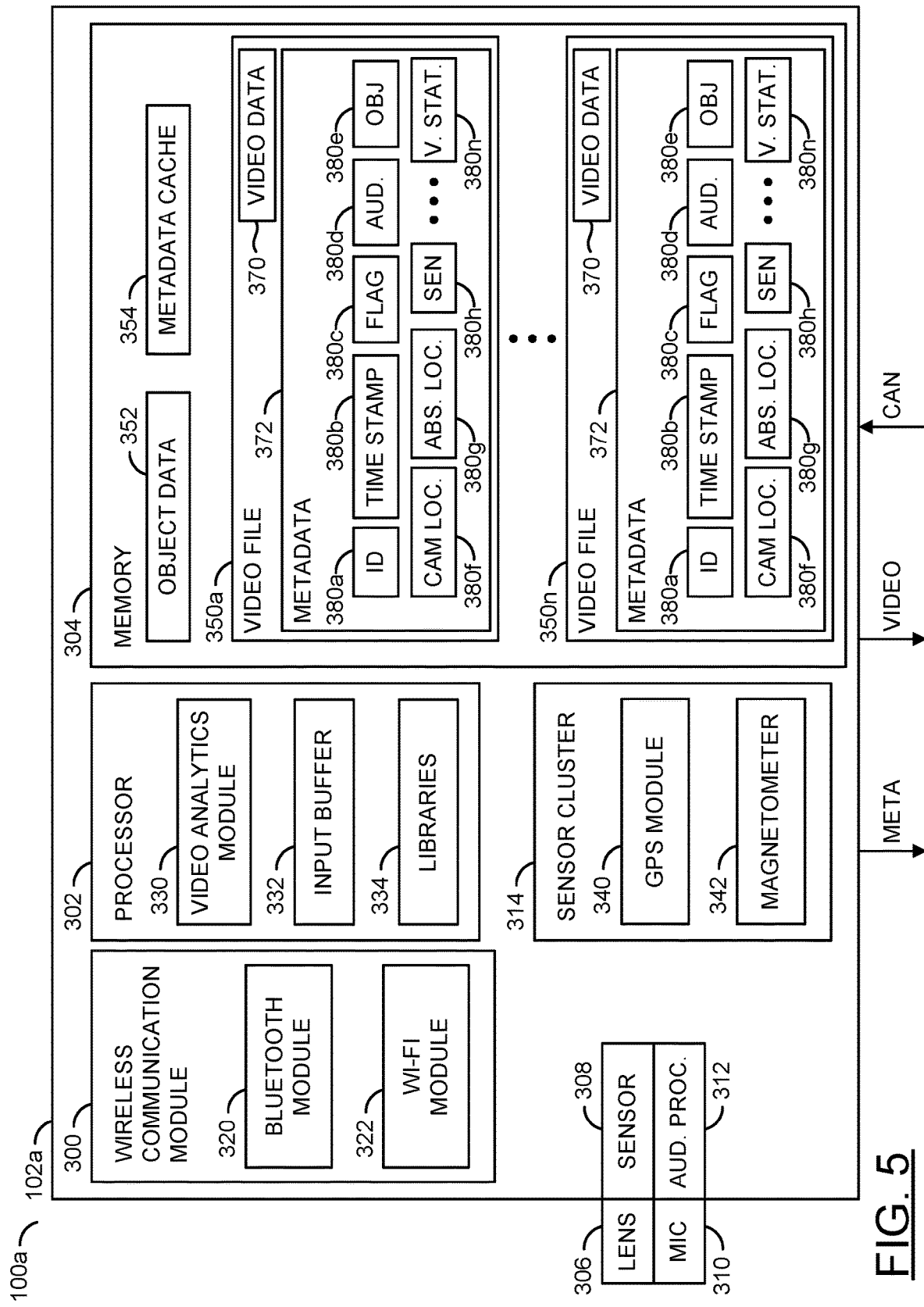
FIG. 5 is a block diagram illustrating an example implementation of circuit for performing the functionality of a vehicle-mounted camera.

Referring to FIG. 5, a block diagram illustrating an example implementation of the circuit 102*a* configured to perform the functionality of a vehicle-mounted camera 100*a*. The capture device 100*a* may be a representative example of one of the capture devices 100*a*-100*n*. The capture device 100*a* may comprise the circuit 102*a*. In some embodiments, the circuit 102*a* may be a main printed circuit board for the capture device 100*a*. In some embodiments, the circuit 102*a* may comprise various circuit boards, daughter boards and/or modules. For example, the circuit 102*a* may comprise multiple printed circuit boards connected using cables. In another example, the circuit 102*a* may comprise input/output slots configured to connect to drop in components (e.g., off-the-shelf components). Generally, the circuit 102*a* may be designed to fit a space and/or heat dissipation specification for the capture device 100*a*.

The circuit 102*a* may comprise a block (or circuit) 300, a block (or circuit) 302, a block (or circuit) 304, a block (or circuit) 306, a block (or circuit) 308, a block (or circuit) 310, a block (or circuit) 312 and/or a block (or circuit) 314. The block 300 may implement a wireless communication module. The block 302 may implement a processor. The block 304 may implement a memory. The block 306 may implement a lens module. The block 308 may implement a camera sensor module. The block 310 may implement a microphone. The block 312 may implement an audio processor. The block 314 may implement a sensor cluster. The circuit 102*a* may comprise other components (not shown). For example, the circuit 102*a* may comprise a firmware, input/output ports, memory expansion slots, a battery, a power adapter (for connection to an external power supply), etc. The components of the circuit 102*a* may be varied according to the design criteria of a particular implementation.

The circuit 102*a* is shown presenting a signal (e.g., META) and a signal (e.g., VIDEO). The circuit 102*a* is shown receiving a signal (e.g., CAN). The circuit 102*a* may present the signal META to a corresponding one of the user communication devices 112*a* (e.g., a paired wireless communication device). The circuit 102*a* may present the signal VIDEO to a video processing pipeline. The circuit 102*a* may receive the signal CAN from a communication bus of the vehicle 200*a* (e.g., a CAN bus).

The wireless communication module 300 may be configured to implement one or more wireless communication protocols. The wireless communication module 300 may be configured to transmit data and/or receive data. For example, the wireless communication module 300 may enable the circuit 102*a* to communicate with one or more of the user communication devices 112*a*-112*n* and/or the network 60. In the example shown, the wireless communication module 300 may comprise a block (or circuit) 320 and/or a block (or circuit) 322. The block 320 may implement a Bluetooth module. The block 322 may implement a Wi-Fi module. The wireless communication module 300 may comprise other components (not shown). For example, the wireless communication module 300 may comprise a module configured to implement 3G/4G/LTE/5G communication. The implementation of the wireless communication module 300 may be varied according to the design criteria of a particular implementation.

The Bluetooth module 320 may be configured to implement Bluetooth communication. For example, the Bluetooth module 320 may be configured to pair the circuit 102*a* with the user communication device 112*a*. The Bluetooth module 320 may enable a transfer of the video data and/or the metadata from the circuit 102*a* to the user communication device 112*a*. The Bluetooth module 320 may enable a short-range and/or low-power communication.

The Wi-Fi module 322 may be configured to implement Wi-Fi communication. In some embodiments, the Wi-Fi module 322 may be configured to connect to a local and/or wide area network. In some embodiments, the Wi-Fi module 322 may be configured to create a local network and other devices (e.g., the user communication device 112*a*) may connect to the Wi-Fi module 322. The Wi-Fi module 322 may enable wireless communication of the video data and/or the metadata. In some embodiments, the Wi-Fi module 322 may be configured implement a mesh network with other Wi-Fi modules. For example, the Wi-Fi module 322 implemented in the capture device 100*a* may form a mesh network with other nearby Wi-Fi module(s) 322 in the capture devices 100*b*-100*n*. Implementing a mesh network may enable the circuits 102*a*-102*n* to communicate using an ad-hoc Wi-Fi network as vehicles move around. For example, one or more of the data provider users may have a desired connectivity to the network 60 (e.g., sufficient upload bandwidth, sufficient data quota with the service provider, an unlimited data plan, etc.). Other data provider users that do not have the desired connectivity to the network 60 may use the mesh network to utilize the connectivity to the network 60 of data provider users that do have the desired connectivity to the network 60. The mesh network may help more of the data provider users to have reliable access to the network 60.

In some embodiments, the circuit 102*a* may be implemented without the Wi-Fi module 322. For example, since the signal META may be transmitted to the user communication device 112*a* without the video data, the circuit 102*a* may have a low bandwidth requirement. The small amount of data communicated in the signal META may enable a lower cost communication protocol (e.g., the Bluetooth module 320) to be implemented. The circuit 102*a* may rely on the user communication device 112*a* to communicate with the network 60. Using a low cost communication protocol to communicate with the user communication device 112*a* and relying on the user communication device 112*a* to communicate with the network 60 may enable the circuit 102*a* to be implemented at a low cost.

The processor 302 may be configured to read, write and/or process data, perform calculations and/or execute computer readable instructions. The processor 302 may implement one or more processing cores to enable parallel processing. The processor 302 may be implemented using various architectures (e.g., x86/x64, ARM, RISC-V, etc.). In some embodiments, the processor 302 may be a Tensor processing unit configured for deep machine learning. The processor 302 may be configured to perform various types of operations (e.g., a general purpose processor). In some embodiments, the processor 302 may implement various hardware modules configured to implement specific tasks. In the example shown, the processor 302 may comprise a block (or circuit) 330 a block (or circuit) 332 and/or a block (or circuit) 334. The block 330 may implement a video analytics module. The block 332 may implement an input buffer. The block 332 may comprise an input buffer. The block 334 may implement a detection libraries module. The processor 302 may comprise other types of modules such as a video encoding module, an image encoding module and/or other modules (not shown). For example, the processor 302 may further comprise an encryption module. The implementation of the processor 302 may be varied according to the design criteria of a particular implementation.

The video analytics module 330 may be configured to perform real-time video analytics on the captured video data. The video analytics module 330 may be configured to perform the real-time video analytics on the video data captured by multiple installed camera systems in parallel (e.g., all of the camera systems 100a-100d configured to provide an all-around view as shown in association with FIG. 3). The video analytics module 330 may be configured to extract the metadata in response to the video analytics. The video analytics module 330 may be configured to scan visual data present in each video frame captured by the capture device 100a. In some embodiments, the video analytics module 330 may implement optical character recognition. In some embodiments, the video analytics module 330 may be configured to detect and/or classify objects detected in the video data. For example, the video analytics module 330 may compare features of the captured video frames to known features (e.g., templates) to identify an object captured in the video frame as a particular type of object (e.g., identify a vehicle as a particular make, model and year of a vehicle). The type of video analytics performed by the video analytics module 330 may be varied according to the design criteria of a particular implementation.

In some embodiments, the analytics performed by the video analytics module 330 may comprise determining characteristics of roadway features and/or objects. The metadata generated by the video analytic module 330 may be used as training data sets for machine learning. In one example, the capture devices 100a-100n may be implemented as dashboard cameras (e.g., dashcams) and the images captured may comprise various roadway data. The video analytics module 330 may analyze many images of various roadways and/or obstacles (e.g., curves, lane markings, curbs, street signs, traffic lights, license plate styles, road markings, pedestrians, vehicle types, vehicle makes, vehicle models, road hazards (e.g., snow, ice, flooding, chemical spills, etc.), construction barriers, etc.). The large amounts of metadata produced by the video analytics module 330 may provide many sample images and/or metadata of roadway data and/or object data. The data generated by the video analytics module 330 may be used to generate feature templates to improve detection when video analytics is performed (e.g., provide a greater data set to compare against). In an example, the metadata generated by the video analytics module 330 may be combined with data from other sensors (e.g., LIDAR, GPS and/or other sensors used to gather roadway data) for machine learning for autonomous driving.

In some embodiments, the analytics performed by the video analytics module 330 may comprise determining a distance of various detected objects from the lens 306. The video analytics module 330 may be configured to compare the sizes of objects detected in the video data with known object sizes. The video analytics module 330 may be configured to determine a region of a license plate, and compare the detected plate characters with the size of the license plate characters for the detected region (e.g., or vehicle type for vehicles such as motorcycles that have smaller plates). The video analytics module 330 may be configured to detect the corners of objects (e.g., such as the corners of a license plate) to determine a size of the detected object.

In some embodiments, the analytics performed by the video analytics module 330 may be configured to account for (e.g., normalize) objects that are at an angle to determine the size of the detected objects. For example, relationships between various portions of an object may be analyzed to determine an orientation of an object (e.g., rotated, at an angle, slanted, skewed, etc.). The video analytics module 330 may be configured to correct distortion caused by the lens 306. For example, de-warping may be performed to correct distortions caused by a wide (e.g., fisheye) lens.

The video analytics module 330 may utilize a number of libraries provided by the detection libraries module 334. Each of the libraries may be configured to recognize various types of objects. Each of the libraries may be specialized and/or customized for detecting specific types of objects. In one example, one of the libraries may be configured to detect and/or identify vehicles in the captured video frames. In another example, one of the libraries may be configured to recognize street signs. In yet another example, one of the libraries may be configured to perform OCR for license plate reading. The libraries may be third party modules for recognizing objects that may be divided into discrete tasks. Different libraries may be provided by different vendors (e.g., each vendor may specialize in a particular area of object detection). The different libraries may run sequentially or in parallel and operate on different parts of the video frame stored in the input buffer 332.

The input buffer 332 may be a memory configured to provide temporary storage for newly captured video data. The video data may be in the input buffer 332 while the video analytics module 330 performs the video analysis in real time and/or video encoding is performed to store the video data in the memory 304. The input buffer 332 may be configured to limit the amount of spatial data used from an input video frame as input to the buffer used for video analytics. By limiting the amount of spatial data input to the working buffer the inherently limited system resources of the real time system may allocated more efficiently.

The detection libraries module 334 may comprise a computer vision model comprising features of various objects for the video analytics module 330 to detect. For example, the various objects detected by the video analytics module 330 may be determined in response to a comparison with the data in the detection libraries module 334. The detection libraries module 334 may be updateable. For example, as various feature libraries are loaded into the detection libraries module 334, the video analytics module 330 may detect different types of objects and/or characteristics. In an example, one detection library may provide features for identifying vehicles, another detection library may provide features for identifying pedestrians, another detection library may provide features for identifying traffic signals, etc. Details of various library data implemented by the detection libraries module 334 may be described in U.S. Application No. 16,156,254, filed on Oct. 10, 2018 and U.S. application Ser. No. 17/568,746, filed on Jan. 5, 2022, appropriate portions of which are incorporated by reference.

The library (or libraries) implemented by the detection libraries module 334 for each of the camera systems 100a-100n may be determined based on a type of vehicle used or the type of service provided by the vehicle (e.g., details that may be important to one type of driver or property owner may not be important to another driver or property owner). In an example, for a regular commuter, the libraries implemented may be configured to detect details about traffic accidents (e.g., vehicles, traffic signals, pedestrians, etc.). In another example, for a delivery vehicle, the libraries implemented may be configured to detect details about property damage (e.g., to provide proof that the delivery truck did not cause damage). In yet another example, for a municipal traffic enforcement vehicle, the libraries may be configured to detect parking locations and/or parking violations. The types of libraries implemented by the libraries module 334 may be varied according to the design criteria of a particular implementation.

The lens module 306 may be configured to focus light onto the camera sensor 308. The lens module 306 may comprise mechanisms for zooming, panning, tilting, focusing, adjusting a DC iris, etc. The camera sensor 308 may be configured to convert the light from the lens module 306 into images. The images generated by the camera sensor 308 may be the video frames of the captured video data. The video frames generated by the camera sensor 308 may be processed by the processor 302 to generate the captured video.

The microphone 310 may be configured to capture sound in the environment near the vehicle 200a. In some embodiments, the microphone 310 may be located on the device 102a. In some embodiments, the microphone 310 may be part of the vehicle 200a. The location of the microphone 310 may be varied according to the design criteria of a particular implementation.

The audio processor 312 may be configured to perform various operations on the sound captured by the microphone 310. In an example, the audio processor 312 may be configured to encode and/or compress the captured sound into an audio file. The audio file generated by the audio processor 312 may be associated with the captured video data (e.g., to synchronize the audio data with the video data). In some embodiments, the audio processor 312 may be configured to perform audio analytics. For example, the audio processor 312 may be configured to implement speech recognition and/or speech-to-text. The audio processor 312 may be configured to generate a text reproduction of the sound captured (e.g., provide a transcription of words spoken by occupants of the vehicle 200a, provide a transcription of pedestrians near the vehicle 200a, provide a text description of sounds heard (e.g., crashes, tires squealing, engines revving, etc.). In the example shown, the audio processor 312 is shown as a separate module from the processor 302. In some embodiments, the functionality of the audio processor 312 may be performed by the processor 302.

The sensor cluster 314 may comprise various input sensors implemented by the device 102a. The sensor cluster 314 may be configured to generate sensor data that may be added to the metadata. The sensor cluster 314 may be configured to perform sensor fusion to interpret data from and/or make decisions based on disparate sources of data that would not be achievable using one data source alone. The sensor cluster 314 may be configured to perform various measurements (e.g., temperature, humidity, wind speed, acceleration, rotation, etc.). In the example shown, the sensor cluster 314 may comprise a block (or circuit) 340 and/or a block (or circuit) 342. The circuit 340 may implement a location device. The circuit 342 may implement a magnetometer. The sensor cluster 314 may comprise other components (not shown). The number, type and/or arrangement of the sensors implemented by the sensor cluster 314 may be varied according to the design criteria of a particular implementation.

The location device 340 may be configured to calculate the location coordinates of the vehicle 200a. In an example, the location device 340 may be a GPS/GNSS module. The location device 340 may be configured to communicate with GPS/GNSS satellites, receive data from the GPS/GNSS satellites and/or perform calculations on the data from the GPS/GNSS satellites to determine the current location of the capture device 100a. The current location of the capture device 100a determined by the location device 340 may be stored as part of the metadata.

The magnetometer 342 may be configured to calculate a direction of travel and/or a direction the capture device 100a is facing. The direction of travel and/or direction the capture device 100a is facing may be a numerical representation of a direction and/or angle. The direction of the capture device 100a determined by the magnetometer 342 may be stored as the location coordinates, which may be part of the metadata. In some embodiments, if the magnetometer 342 is not available the previous GPS coordinates may be used to infer the direction of travel.

The memory 304 may be configured to store data. The memory 304 may comprise a solid state memory (e.g., NAND flash). In some embodiments, the memory 304 may comprise memory onboard the circuit 102a and/or external memory (e.g., a microSD card). The memory 304 may comprise blocks (or circuits) 350a-350n, a block (or circuit) 352 and/or a block (or circuit) 354. The blocks 350a-350n may each implement storage of a video file. The block 352 may implement object data. The block 354 may implement a metadata cache. The memory 304 may comprise other data (not shown). For example, the memory 304 may further comprise a firmware. The type of memory implemented by the data arrangement of and/or the data stored by the memory 304 may be varied according to the design criteria of a particular implementation.

The video files 350a-350n may comprise the captured/recorded video and/or other information associated with the video. Each of the video files 350a-350n may comprise storage locations for a video clip (e.g., a discrete video recording and/or a video segment). In some embodiments, the video files 350a-350n may represent video clips having a same length (e.g., 2 minute video clips). In some embodiments, the video files 350a-350n may represent video clips (or segments) having different lengths (e.g., based on a storage size of each video file). Each video file storage location 350a-350n may comprise a corresponding one of a block (or circuit) 370 and/or a block (or circuit) 372. The block 370 may comprise video data. The block 372 may comprise metadata. For example, the metadata 372 may be associated with the corresponding video data 370. The metadata 372 may each comprise blocks (or circuits) 380a-380n. The blocks 380a-380n may comprise various data sets of the metadata 372. The block 380a may comprise the video ID. The block 380b may comprise a time stamp. The block 380c may comprise a flag. The block 380d may comprise audio data. The block 380e may comprise object information. The block 380f may comprise location coordinates and/or a direction. The block 380g may comprise absolute locations. The block 380h may comprise sensor data. The block 380n may comprise vehicle status information. The video files 350a-350n may comprise other data (not shown). The type of data stored and/or the arrangement of data stored in the video files 350a-350n may be varied according to the design criteria of a particular implementation.

The video data 370 may comprise the viewable captured video. The video data 370 may be the data transmitted in response to a request from the subscriber user (e.g., one of the subscriber devices 110a-110n). The video data 370 may be encoded before the video data 370 is created and stored. In some embodiments, the video data 370 may not be stored (e.g., only the metadata 372 may be stored and the video data 370 may be discarded after the video analytics is performed).

The video ID 380a may comprise an identification for the video files 350a-350n. The video ID 380a may be implemented as a data string comprising alphanumeric characters (e.g., a hash). The video ID 380a may represent a portion of the metadata 372 associated with the video files 350a-350n. The video ID 380a may be used by the database 130 to locate and/or match the metadata clips 180a-180n to a particular one of the video files 350a-350n on the devices 100a-100n.

The time stamp 380b may comprise an indication of when the video files 350a-350n have been recorded. The time stamp 380b may comprise a data string. For example, the time stamp 380b may indicate a year, a month, a date, a day of the week, an hour, a minute, seconds, fractions of a second, etc. The time stamp 380b may represent a portion of the metadata associated with the video files 350a-350n. The time stamp 380b may be used by the processor 302 to determine which of the video files 350a-350n is the oldest. The time stamp 380b may be used by the processor 302 to determine an order that the video files 350a-350n were recorded, based on time. The time stamp 380b may be used by the processor 302 to correlate the captured video data 370 and/or extracted metadata 372 with the location coordinates 380f.

The flags 380c may be used to indicate whether the video data 370 may be overwritten. The flags 380c may represent one or more preservation bits for the video files 350a-350n. In one example, when one of the flags 380c is set (e.g., to indicate the file should be preserved) by the capture devices 100a-100n, the corresponding video data 370 of one of the video files 350a-350n may not be overwritten. In another example, when one of the flags 380c is not set (e.g., to indicate the file should not be preserved), the corresponding video data 370 of one of the video files 350a-350n may be made available to be overwritten (e.g., by a new video file).

In some embodiments, the flags 380c may be implemented using a single bit. In some embodiments, multiple bits may be used for each of the flags 380c. In one example, when using multiple bits for the flags 380c, a condition for determining how long to preserve the video data 370 may be set (e.g., an amount of time, a particular date, an occurrence of an event, etc.). In another example, when multiple bits are used for the flags 380c, different lengths of time to preserve the video data 370 may be set based on a reason for preserving the video data 370 (e.g., preserve video files for 3 days if a video is the result of a subscriber search, preserve video files indefinitely if the video is evidence, preserve video files one week if an event was captured, etc.). In yet another example, when multiple bits are used for the flags 380c, the bits may represent an amount of time to preserve the video data 370 based on a value of a subscriber user and/or subscription tier (e.g., a subscriber user paying a higher fee may result in a value of 5 being stored for the flags 380c to indicate preservation for 5 days, a subscriber user paying a lower fee may result in a value of 2 being stored for the flags 380c to indicate preservation for 2 days, etc.). Generally, a user that does not have a subscription to access the database 130 (e.g., a user that is not a subscription user) may not receive search results from the database 130 (e.g., the database 130 may not generate search results and/or may not allow a search query if a user is not one of the subscriber users). In some embodiments, the processor 302 may use the flags 380c to decide when to overwrite the video data 370 (e.g., compare the creation date of the video files 350a-350n plus the flag value to the current date). The implementation of the flags 380c may be varied according to the design criteria of a particular implementation.

The audio data 380d may comprise audio information corresponding to the video data 370. In some embodiments, the audio data 380d may comprise compressed audio generated by the audio processor 312 (e.g., sound information compressed into an .mp3 file, a .flac file, a .aac file, a .ogg file, etc.). For example, since sound information may be relatively smaller than the video data 370, the sound information captured by the microphone 310 may be preserved even if the video data 370 is not. In some embodiments, the audio processor 312 may perform audio analytics to transcribe sounds captured in the audio data (e.g., speech-to-text, describe sounds such as crashes and car horns, etc.) and the transcribed sounds may be stored as the audio data 380d. Audio transcribed as text may be relatively smaller than storing sound information.

The object data 380e may comprise information about the objects detected in response to the video analytics performed by the video analytics module 330. In an example, the object data 380e may be comprised of relative coordinates of each object detected (e.g., a distance and/or direction from the lens 306, an X/Y coordinate position, etc.). In another example, the object data 380e may comprise a classification of the objects detected (e.g., vehicles, people, signs, street lights, etc.). In yet another example, the object data 380e may comprise characteristics of the objects detected (e.g., make/model/year of vehicle, color of vehicle, identifying markers on the vehicle (e.g., scratches, truck balls, bumper stickers, etc.), description of pedestrians, status of traffic lights, license plate information, text on signs, condition of roads, etc.). The type of data stored about the objects detected in the object data 380e may be varied according to the design criteria of a particular implementation.

The location coordinates 380f may comprise the location coordinates determined by the sensor cluster 314 determined at the time the corresponding video files 350a-350n were created. The location coordinates 380f generally correspond with the location and/or direction of travel of the capture device 100a. For example, the location of the capture device 100a may be used as a proxy for the location and/or direction of travel of the vehicle 200a. The location coordinates 380f may comprise a sequence of values (e.g., to track the location of the capture device 100a as the vehicle 200a moves over the duration of the recording). The location coordinates 380f may comprise longitude values, latitude values, altitude values and/or the alternate coordinates (e.g., location information from the user communication devices 112a-112n) generated by the location module 340. The location coordinates 380f may further comprise the direction of travel determined by the magnetometer 342 in the sensor cluster 314. The direction of travel may correspond to the direction that the capture device 100a was facing when while the corresponding video files 350a-350n were recorded. The direction may be a sequence of values (e.g., to track the direction of the capture device 100a as the associated vehicle 200a moves over the duration of the recording).

The absolute location 380g may comprise the actual location of each of the objects in the object data 380e identified by the video analytics module in the video data 370. The absolute coordinates 380g may be determined based on the location coordinates 380f (e.g., location and direction of the capture devices 100a-100n) and the distance of the detected objects from the capture devices 100a-100n. The distance of the objects may be determined by the video analytics module 330. The absolute locations 380g may be a sequence of values associated with a particular detected object (e.g., each object detected may have a corresponding array of values). The sequence of values for the absolute locations 380g may indicate where the detected object is over time (e.g., to track each of the detected objects over the duration of the recording). In some embodiments, the absolute locations 380g may comprise a distance with reference to the capture device 100a (e.g., how far the object is from the capture device 100a). In some embodiments, the absolute locations 380g may comprise real-world location values without reference to the capture device 100a (e.g., latitude, longitude, altitude, etc.).

The sensor data 380h may comprise the other sensor data generated from the sensor cluster 314. The sensor data 380h may comprise sensor data that may have been captured alongside the video data 370. In an example, the sensor data 380h may comprise acceleration information generated by an accelerometer, positional, rotational and/or acceleration information generated by a gyroscope, temperature information generated by a thermometer, etc. In one example, the thermometer may measure a temperature of the environment near the vehicle 200a. In another example, the thermometer may measure a temperature of the processor 302 (e.g., when the temperature of the processor 302 reaches a high threshold, various operations may be scaled back such as real-time video analytics in order to prevent damage to the processor 302). The sensor data 380h may provide information about the environment associated with the time that the video data 370 has been captured. The type of information stored in the sensor data 380h may be varied according to the design criteria of a particular implementation.

The vehicle status information 380n may comprise information about the vehicle 200a. The vehicle status information 380n may be data generated by various systems of the vehicle 200a. In an example, the vehicle status information 380n may be communicated over a communication bus (e.g., a CAN bus) of the vehicles 200a-200n. The vehicle status information 380n may be received as the input signal CAN. In an example, the vehicle status information 380n may comprise steering wheel position and movement, gas and brake pedal activation, service codes related to the vehicle engine state, tire inflation details, seatbelt engagement status, door ajar sensor warnings, etc. The type of information stored in the vehicle status information 380n may depend on the communication and/or sensor capabilities of each individual one of the vehicles 200a-200n. The number and/or types of data stored in the vehicle status information 380n may be varied according to the design criteria of a particular implementation.

The object data 352 may comprise information about known objects. The information about known objects may be used to identify, detect, and/or compare objects in the video data 370. In one example, the object data 352 may comprise a database of vehicle makes, models, years, colors, sizes, dimensions, etc. In another example, the object data 352 may comprise regional information about license plates (e.g., shape, size, font, character size, design for each state/country, etc.). In yet another example, the object data 352 may comprise information about signs, billboards, buildings, cell towers, and/or other objects (trees, lane dividers, pylons, pedestrians, animals, etc.). The object data 352 may be used in order to provide various information for the object data 380e.

The video analytics module 330 may be configured to compare the objects detected in the video data 370 with the known object data 352. The comparison may be used to determine the distance of the detected object from the capture device 100a. For example, if the detected object is a 2018 Ford F-150, the known dimensions of a 2018 Ford F-150 in the stored in the object data 352 may be compared with the dimensions of the detected 2018 Ford F-150. Based on a size comparison of the known and detected dimensions, the distance of the 2018 Ford F-150 from the capture device 100a may be determined. In another example, if a license plate is detected as a Michigan license plate, the size of the alphanumeric plate characters may be compared to the known size of characters for Michigan license plates to determine the distance of the license plate from the capture device 100a. The types of objects and/or information about objects stored in the object data 352 may be varied according to the design criteria of a particular implementation.

In some embodiments, the object detection may be performed in real-time and the distance calculations for the detected objects may be performed later. In an example, the object data 352 may not have the capacity to store known characteristics of all objects. For example, if the dimensions of the 2018 Ford F-150 are not currently stored in the known object data 352, the size comparison may be delayed. In an example, the capture device 100a may send a request to the user communication device 112a to retrieve dimensions for the 2018 Ford F-150. When the information becomes available to the capture device 100a, the size comparison may be performed.

The metadata cache 354 may be configured to store the metadata extracted by the video analytics module 330 and/or any other metadata corresponding to the captured video data 370. The metadata cache 354 may provide temporary storage. In some embodiments, the metadata 372 may not be stored long-term by the memory 304. For example, the metadata 372 may be deleted after being successfully stored by the database 130 as the metadata 158. Temporarily storing the metadata may increase an amount of the memory 304 available for storing the video data 370. Some of the metadata 372 may be stored long-term by the memory 304 (e.g., the video ID 380a and/or the time stamp 380b). The metadata cache 354 may provide storage for the metadata 372 until the metadata 372 is uploaded to the database 130. In some embodiments, when the database 130 communicates that the metadata 372 for a particular one of the video files 350a-350n has been successfully stored, the metadata cache 354 may purge the corresponding metadata 372. Generally, the metadata files may be created in the metadata cache 354, filled with metadata, compressed, encrypted, transferred to the user communication devices 112a-112n, and then deleted from the metadata cache 354 (e.g., after a confirmation of successful upload to the database 130 has been received). In some embodiments, the metadata cache 354 may provide an output buffer for the metadata 372 that may be uploaded to the database 130 and the metadata 372 stored with the video files 350a-350n may be stored long-term.

The signal META may comprise the data that may be stored by the database 130 as the metadata 158 extracted from the captured video by the processor 302. The signal META may comprise the metadata stored by the metadata cache 354. The signal META may be generated by the metadata cache 354 and transmitted to the database 130 for storage and/or indexing. The wireless communication module 300 may implement a short-range, inexpensive and/or low power consumption communications protocol (e.g., Bluetooth) to communicate with the user communication device 112a. The user communication device 112a may forward the signal META from the circuit 102a to the network 60. The network 60 may transmit the signal META to the server 120 for storage in the database 130.

The signal VIDEO may comprise the video data 370 recorded by the capture device 100a and/or the circuit 102a. The signal VIDEO may be generated by the wireless communication module 300 and transmitted to the server 120 and/or one of the subscriber devices 110a-110n. The wireless communication module 300 may implement a short-range, inexpensive and/or low power consumption communications protocol (e.g., Bluetooth) to communicate with the user communication device 112a. The user communication device 112a may forward the recorded video to the network 60.

Transmitting the video data 370 to the subscriber users may be a low-priority data transfer. One of the flags 380c corresponding to the video file 350a-350n being transferred may be set to ensure the video file 350a-350n is preserved at least until the data transfer is completed. Generally, the transfer of the signal VIDEO may not be initiated by the circuit 102a until the subscriber user requests the video. For example, if a user does not request a recorded video, the video file may eventually be overwritten by the capture device 100a. Since the recorded video is not transmitted until requested, unnecessary transfer and/or storage of data may be reduced.

The signal CAN may comprise the vehicle status information generated by the vehicle 200a. In an example, the signal CAN may comprise an input presented by the CAN bus of the vehicle 200a. The information from the signal CAN may be used to generate the vehicle status information 380n for the metadata 372.

The metadata 158 stored in the database 130 may comprise the video ID 380a of the corresponding video 350a-350n and/or store data used to derive the video ID 380a and/or the capture device 100a-100n that stores the corresponding video file 350a-350n. For example, the metadata 158 may store the time stamp 380b as the time 182a (e.g., when the first entry is inserted to the video files 350a-350n), a user ID as the camera ID 182n (e.g., to identify the user communication device 112a-112n corresponding to the capture device 100a-100n that captured the corresponding video files 350a-350n), a sequence number (e.g., a sequential number incrementing from 0 to 1029 and then looping back to 0). In one example, the metadata 158 may be a filed named "DATA-2017-03-07-14-30-00-00-01-0099.txt" (e.g., corresponding to the first timestamp and/or GPS entry deposited Mar. 7, 2017 at 2:30:00 PM by Driver ID #0001 and a sequence number of video file 0099). The contents of the file for the video clip metadata 180a-180n may comprise a sequence of lines of data. Each line of data may comprise at least a time stamp entry, a latitude and/or a longitude (e.g., 2017 Mar. 7 14:30:00, 37.804440, −122.422874, 2017 Mar. 7 14:30:20, 37.804440, −122.422874, etc.). Some lines of data may comprise a video file name and/or status of the video file (e.g., FILE DELETED: VIDEO-2017-03-06-14-30-00-0001-0022. MP4, FILE CREATED: VIDEO-2017-03-07-14-31-40-0001-0052.MP4, etc.). The video file names of the metadata 180a-180n may correspond with the names of the video files 350a-350n. The format of the metadata clips 180a-180n stored in the database 130 may be varied according to the design criteria of a particular implementation.

The processor 302 may be configured to receive captured images from the sensor 308 and/or perform video analytics using the video analytics module 330 to extract the metadata. In some embodiments, the processor 302 may be further configured to encode the captured video and/or store the encoded video data 370 as the video files 350a-350n in the memory 304. The video files 350a-350n may be created in the memory 304 to implement a loop recording. The loop recording implementation may create new video files 350a-350n in available (e.g., free) space in the memory 304. For example, if the memory 304 has free space available, the newest encoded video data may be stored in the free space of the memory 304 (e.g., previously stored data may not be overwritten). When the memory 304 is filled (e.g., stored to capacity), the memory 304 may overwrite previously stored data with the new data.

Generally, a loop recording default storage implementation may overwrite the oldest data (e.g., the video data 370 having the oldest/lowest time stamp 380b) first. For example, if the video data 370 of the video file 350a is written into the memory 304 first and the video data 370 of the video file 350i is written into the last of the available free space (e.g., video files 350a-350i take up all the available free space), then the video data 370 for the next video file 350j may overwrite the video data 370 of the video file 350a (e.g., and subsequently the video data 370 of the video files 350b, 350c, etc. may be overwritten by new video data) but the metadata 372 may be preserved. The loop recording default storage implementation may enable the video data 370 of the video files 350a-350n to be stored in the memory 304 as portions of a continuous recording (e.g., the video data 370 may be continuously captured as the vehicle 200 is being driven and the video files 350a-350n may be the continuous video segmented into shorter clips).

The flags 380c may be configured to override the loop recording default storage implementation. The flags 380c may indicate that the video data 370 of one or more of the video files 350a-350n should be preserved even if the video data 370 of the video file would be the next (e.g., oldest) file to be overwritten in the loop recording default storage implementation. For example, if the video data 370 of the video file 350a is written into the memory 304 first and the flag 380c is set, the video data 370 in the video file 350b is written into the memory 304 second and the flag 380c is not set and the video data 370 of the file 350i is written into the last of the available free space (e.g., video data 370 of the video files 350a-350i take up all the available free space), then the next video file 350j may overwrite the video data 370 of the video file 350b instead of the video data 370 video file 350a (e.g., and subsequently the video files 350c, 350d, etc. may be overwritten unless a respective one of the flags 380c has been set) but not the corresponding metadata 372. Generally, the processor 302 may store the next portion of the captured video (e.g., the newest created video file 350a-350n) in an empty storage location of the memory 304 when free space is available (e.g., one or more storage locations of the memory 304 are empty), and in one of the storage locations of the memory 304 that stores the oldest portion of the captured video (e.g., overwrite the video data 370 of one of the video files 350a-350n having the oldest time stamp 380b) that does not have the flag 380c set if there are no empty storage locations in the memory 304.

The flags 380c may be modified to enable the video data 370 of the video files 350a-350n to be preserved in case that one of the subscriber users decides to request the video data 370 of one of the video files 350a-350n. The flags 380c may be implemented to strike a balance between preserving the video data 370 that may be potentially requested, and ensuring that the memory 304 may have space available for recording new video data 370 as well as the associated metadata 372.

In some embodiments, the flags 380c may be set to preserve the corresponding video data 370 of one of the video files 350a-350n when the database 130 selects the corresponding one of the video clips 180a-180n as the search result(s) in response to a search query from the subscriber users (e.g., sent using the app 114a on the subscriber devices 110*a*-110*n*). For example, from the search results of the query, the database 130 may identify the video ID(s) and/or the ID of the capture device(s) 100*a*-100*n* for the video clips 180*a*-180*n* based on the metadata 158. The database 130 may transmit a signal to the capture device(s) 100*a*-100*n* corresponding to the ID of the capture device stored in the metadata 158. The signal may identify the video IDs 380*a* corresponding to the search result. When the signal is received by the corresponding one of the circuits 102*a*-102*n*, the processor 302 may match the video IDs 380*a* with the video data 370 of the video files 350*a*-350*n* stored in the memory 304 and set (e.g., modify) the corresponding one of the flags 380*c* to preserve the video. The flags 380*c* may be set to preserve the video data 370 of the video files 350*a*-350*n* when the metadata 158 corresponds to the search result determined by the database 130 (e.g., a request for the video files 350*a*-350*n* may not be needed for preservation). By preserving the video data 370 of the video files 350*a*-350*n* in response to a match to a search query by the subscriber user, the system 50 may preserve the video data 370 of the video files 350*a*-350*n* in the event that the subscriber user later decides to request the video file. In some embodiments, the preserved video data 370 of the video files 350*a*-350*n* may not be requested and to prevent any unnecessary use of data (e.g., data usage limits imposed by internet and/or cellular communication providers) the signal VIDEO may not be uploaded until formally requested by the subscriber user. The video data 370 of the video files 350*a*-350*n* may be requested by the subscriber users using the app 114*a*.

In some embodiments, the flags 380*c* may be set to preserve corresponding video data 370 when an event has been determined to have occurred within a range of the capture devices 100*a*-100*n*. When an event has been determined to occur (e.g., a pre-scheduled notification to the system 50, a notification from police, a notification from news reporters, notifications from insurance investigators, etc.), the location and/or a time may be presented to the database 130 (e.g., similar to a search query from the subscriber users). In an example, when the event is pre-scheduled, the processor 302 may store the recorded video data 370 of the video files 350*a*-350*n* that correspond to the event with the flags 380*c* set to preserve. In another example, when the event is determined after the event has occurred, the database 130 may search the metadata 158 to determine the clips 180*a*-180*n* that match the event (e.g., a location, a time, a person of interest, a vehicle of interest, etc.). When the clips 180*a*-180*n* that match the event are found, the database 130 may find the video ID and/or the ID of the capture devices 100*a*-100*n* that potentially captured the event. A signal may be sent to the capture devices 100*a*-100*n* that potentially captured the event, and the flags 380*c* may be modified (e.g., set) for the video files 350*a*-350*n* that match the video IDs 380*a* of the request signal. The flags 380*c* may be set to preserve the video data 370 of the video files 350*a*-350*n* when the metadata 158 corresponds to the event, even if the video data 370 has not been requested. By preserving the video data 370 of the video files 350*a*-350*n* in response to a match of the event, the system 50 may preserve the video data 370 in case that the video files 350*a*-350*n* are requested later.

In some embodiments, the event may be conditions used for machine learning for autonomous driving (e.g., deep learning). For example, to provide training data for machine learning, particular situations, environments and/or circumstances may need to be analyzed. The processor 302 may be configured to identify particular situations, environments and/or circumstances. For example, if more training data is requested for blizzard (or flooding, or hail) conditions, the event may be when there is a blizzard (or flood, or hail) outside. In another example, if more training data is requested for identifying a type of animal, the event may be when an animal is detected. In yet another example, if more training data is requested for particular types of roadways, the event may be when pre-determined road conditions are detected. The conditions for an event may be varied according to the design criteria of a particular implementation.

When the flags 380*c* are modified to preserve the video data 370, the video data 370 of one or more of the video files 350*a*-350*n* may be preserved for a pre-determined amount of time. For example, when the flags 380*c* are implemented as a single bit, the single bit may represent the pre-determined amount of time (e.g., one week). In another example, when the flags 380*c* are implemented as multiple bits, the multiple bits may represent an amount of time to preserve the video (e.g., the bits may be encoded to represent time). Limiting the amount of time that the video data 370 may be preserved may ensure that memory space is available for recording new the video data 370 and the associated metadata 372 (e.g., if too many videos are preserved, new videos may not be recorded). Limiting the amount of time that the video data 370 may be preserved may prevent against malicious attacks and/or spam bots (e.g., prevent attacks that request all videos to prevent new data from being recorded).

In some embodiments, the pre-determined amount of time for preserving the video data 370 may be configured to comply with local legislation. For example, privacy laws may limit data retention. In some embodiments, the processor 302 may determine a location of the capture device 100 and adjust the length of time for preservation based on the legislation of the region. The pre-determined amount of time for preserving the video data 370 may be configured to be updated. For example, as legislation is adjusted, introduced and/or repealed and/or new court decisions are provided, the pre-determined amount of time may be updated to comply with the latest legislation. The pre-determined amount of time may be varied according to the design criteria of a particular implementation. In some embodiments, the video files 350*a*-350*n* (e.g., the video data 370 and/or the metadata 372) may be purged to comply with the law. In some embodiments, the video data 370 may have a default amount of time set to purge the data from the memory 304. The default amount of time to purge the data may be selected arbitrarily and/or based on the design criteria of a particular implementation.

In some embodiments, the system 50 may be implemented to aid in one or more of asset recovery (e.g., locating an asset with a large number of GPS data points from the metadata 158), roadway investigation (e.g., video evidence for post mortem analysis of roadway events), motor vehicle theft (e.g., real time location of stolen vehicles), locating a person of interest and/or providing roadway video for deep learning and autonomous driving training. In an example, when locating a person of interest, a person may be located based on a large number of GPS data points (e.g., the metadata 158) corresponding to the vehicle of the person of interest (e.g., often individuals are within one thousand feet of the vehicle the individual drives). In an example of providing roadway video, self-driving car developers train machine learning techniques (e.g., for deep learning) by collecting video and/or sensor streams of various scenarios and then annotate the streams (e.g., manually and/or automatically outlining and labeling various objects in each frame). In another example of providing roadway video data, an event recorded in the video files 350a-350n may comprise a particular road and/or weather type (e.g., the event may be defined as a hail storm that occurs within city boundaries, approaching a traffic signal during night, etc.). In some embodiments, the video analytics module 330 may have the ability to distinguish objects and the database 130 may be searched for video streams with particular characteristics (e.g., the hail storm). The hail storm may only last a few minutes, but assuming a large number of drivers are collecting data during the hail storm event, there may be a significant number of video streams available for download that match the criteria of a hail storm. The content of the video data 370 may be determined based on the information stored in the metadata 372, even if the video data 370 is no longer available.

In some embodiments, the video data 370 of the video files 350a-350n may not be stored long term. For example, the metadata 372 may provide a sufficient amount of detail for the metadata server 120 to re-create the scene that was captured in the video data 370. The metadata server 120 may use all the data sets 380a-380n in the metadata 372 in order to generate an animation that represents the content of the video data 370. Relying on the metadata 372 for providing an animation that represents the content of the video data 370 may reduce an amount of storage in the memory 304 since the metadata 372 may occupy less space than the video data 370. For example, the amount of data stored for the metadata 372 in order to re-create a scene similar to the content of the video data 370 may be less than the amount of data stored for the scene in the video data 370.

Figure 6:
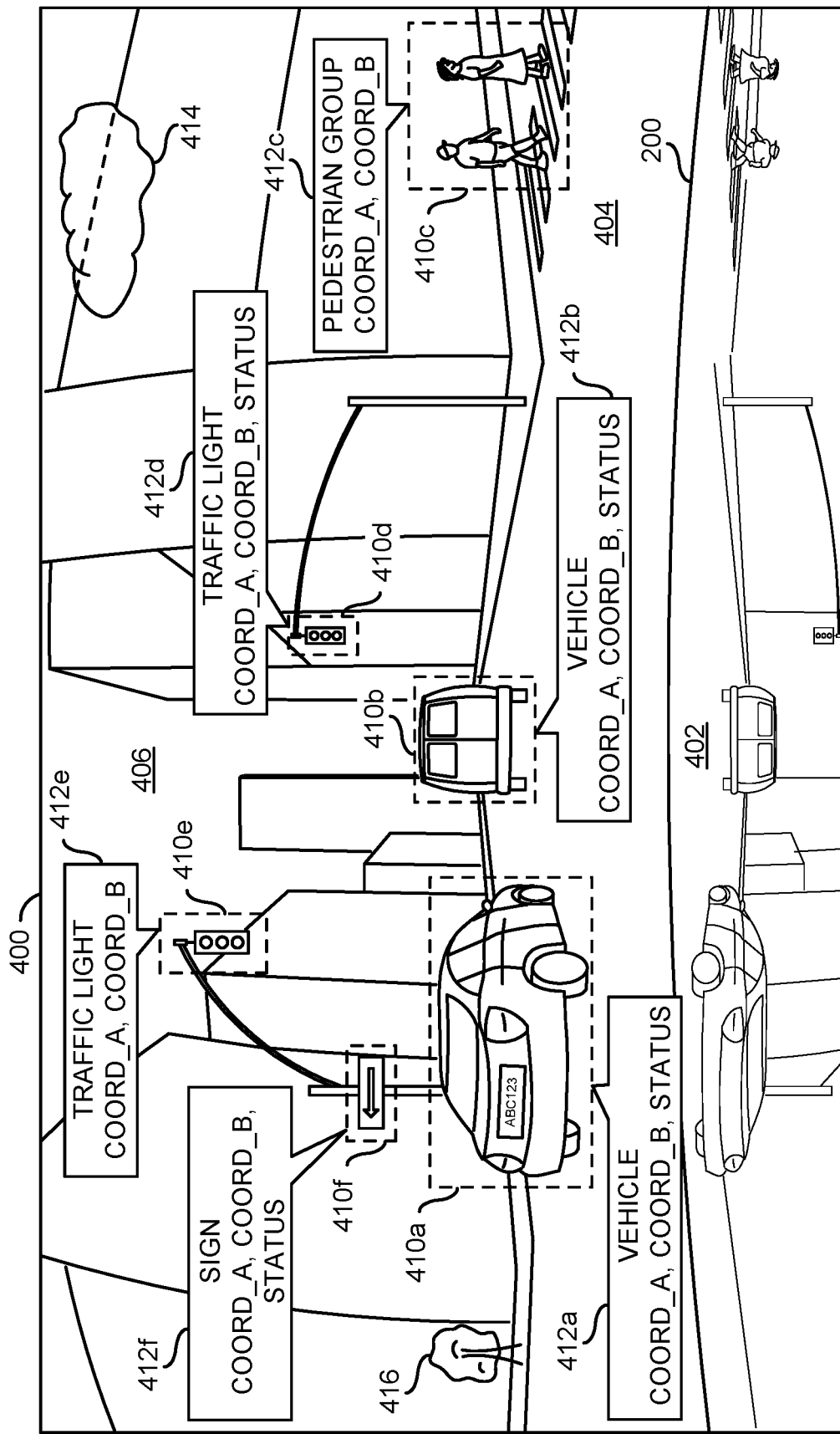
FIG. 6 is a diagram illustrating video analysis performed on an example video frame captured by the camera.

Referring to FIG. 6, a diagram illustrating video analysis performed on an example video frame captured by the camera is shown. An example video frame 400 is shown. The example video frame 400 may be an example of a video frame captured by one of the capture devices 100a-100n and/or stored as part of the video data 370. In the example shown, the video frame 400 may comprise a captured view of an urban area.

The vehicle 200 is shown in the example video frame 400. For example, one of the capture devices 100a-100n (e.g., 100a) may be a dash-mounted camera located within the vehicle 200 directed towards the windshield of the vehicle 200. The portion of the vehicle 200 shown may be a hood 402. Generally, the dashcam 100a may be mounted in a static position with respect to the vehicle 200. Since the location of the dashcam 100a may not move (or may have minimal movement) with respect to the vehicle 200, the hood 402 may be located in the same space of each captured video frame.

The example video frame 400 may comprise the hood 402, a middle section 404 and an upper section 406. The hood 402 may be located at a bottom edge of the video frame 400. Generally, the middle section 404 may comprise roadway. Generally, the upper section 406 may comprise the sky and buildings.

Various objects 410a-410f are shown in the example video frame 400. The various objects 410a-410f may be detected by the video analysis module 330. As an illustrative example, boxes are shown around the detected/recognized objects 410a-410f. In the example shown, the object 410a may be a vehicle, the object 410b may be a vehicle (e.g., a utility van), the object 410c may be a group of pedestrians, the objects 410d-410e may be stop lights, and the object 410f may be a road sign (e.g., a one-way sign). Other objects may be detected such as curbs, street markings, buildings, billboards, lampposts, sidewalks, lane markers, etc. The number and/or type of objects detected by the video analysis module 330 may be varied according to the design criteria of a particular implementation.

Status captions 412a-412f are shown. The status captions 412a-412f may be associated with the detected objects 410a-410f. The status captions 412a-412f may represent some of the information that the video analysis module 330 may tag for the detected objects 410a-410f. In the example shown, the status caption 412a may indicate that the object 410a has been identified as a vehicle, is located at a particular coordinate in the video frame 400 (e.g., an X coordinate, a Y coordinate location and depth/distance from the camera system 100) and/or status information about the detected object 410a may be stored (e.g., make/model of vehicle, whether the object is moving or stationary, color, size, license plate number, presence of decorations such as bumper stickers and/or truck nuts, etc.). In another example, for the detected object 410e, the object may be detected as a traffic light and the status may indicate that the light is green. In yet another example, for the detected object 410f, the object may be detected as a street sign and the status may indicate that the sign is a one-way street sign. Generally, the information in the status captions 412a-412f may correspond to the information stored in the metadata 158 (in the database 130) and the object data 380e (in the metadata 372 stored on the camera 100a).

In some embodiments, the location in the status captions 412a-412f may be a GPS location. In one example, the GPS location may be acquired by the location module 340. In another example, the GPS location may be acquired from the user device 112a (e.g., the smartphone 112a may comprise a GPS module and provide the location to the camera 100a and/or the smartphone 112a may add to the metadata before uploading). In yet another example, the GPS location may be received from an OBD device of the vehicle 200 capable of determining GPS coordinates (e.g., stored as the vehicle status information 380n and received by the signal CAN). In some embodiments, the camera 100a may be configured to determine more granular location coordinates based on the location of the camera 100a that captured the video frame 400 and using video analysis to determine distances to the detected objects 410a-410f as described in U.S. patent application Ser. No. 16/106,777, filed Aug. 21, 2018, appropriate portions of which are hereby incorporated by reference.

Generally, the status captions 412a-412f and/or the boxes shown around the detected objects 410a-410f may not appear in the example video frame 400 when stored as a recording (e.g., when the video data 370 is played back using a playback device). The boxes around the detected objects 410a-410f and/or the status captions 412a-412f may be illustrative examples indicating the types of objects detected by the video analysis module 330 and/or the type of information stored as the object data 380e in the metadata 372 that may be uploaded to the database 130 as the metadata 158. In some embodiments, for testing purposes (e.g., in a debug mode), the boxes around the objects 410a-410f and/or the status captions 412a-412f may be shown overlaid on the video frame 400.

An unimportant object 414 and a potentially important object 416 are shown. In the example shown, the unimportant object 414 may be a cloud and the potentially important object 416 may be a shrub. In the example shown, there may be one unimportant object 414 and one potentially important object 416. However, the number of unimportant objects 414 and/or potentially important objects 416 may be varied according to particular circumstances and/or the settings of the computer vision model implemented by the library module 334.

Generally, the unimportant object 414 may be a classification of one or more objects by the video analytics module 330. The unimportant object 414 may be an object determined by the processor 302 to be irrelevant to re-creating the scene in the video frame 400 (e.g., unimportant visual information). For example, if the video frame 400 corresponds to an event that may be later re-created using the system 50, the presence or absence of the unimportant object 414 may be irrelevant. In the example shown, where the unimportant object 414 is a cloud, an animation that illustrates the video data 370 in the video frame 400 may not be affected by the presence of the cloud. Generally, locations of vehicles, buildings, pedestrians, animals, signs, traffic lights, trees, road markings, etc. may be important in re-creating a scene. The unimportant object 414 may be a trivial detail. For example, the presence or absence of the unimportant object may not affect a driving behavior of the vehicle 200, the detected vehicles 410a-410b, the pedestrians 410c, etc. The types of objects determined to be the unimportant objects 414 may be determined according to the object detection libraries implemented by the detection libraries module 334. Which types of the objects are the unimportant objects 414 may be determined through machine learning and/or from input from experts (e.g., insurance investigators may provide input about which types of objects and/or obstacles are likely to contribute to a vehicle accident). In some embodiments, information about the unimportant objects 414 may not be included in the metadata 372. In some embodiments, information about the unimportant objects 414 may be used for general information (e.g., the metadata 372 may include information that the video data 370 corresponds to a cloudy day based on the unimportant cloud detected), but not necessarily record the location information about the unimportant objects 414. The types of the unimportant objects 414 may be varied according to the design criteria of a particular implementation.

The potentially important object 416 may be a classification of one or more objects by the video analytics module 330. The potentially important object 416 may be an object determined by the processor 302 to be irrelevant to re-creating the scene in the video frame 400 in some circumstances (e.g., the unimportant visual information) and relevant to re-creating the scene in the video frame 400 in other circumstances (e.g., desired visual information). Often times the potentially important object 416 may be a trivial object. In the example shown, the potentially important object 416 may be a shrub on the sidewalk. In some scenarios, the presence or absence of an object like a shrub may not affect an event (e.g., the shrub may not have significant value, the shrub may not cause damage to vehicles, the shrub may not provide insight as to why an event occurred, etc.). However, in some scenarios, the potentially important object 416 may be important and/or relevant. In an example, the shrub may be expensive flowers and may be part of the damages caused by a vehicle accident.

Whether the potentially important object 416 is used for re-creating the scene in the video data 370 (e.g., whether the information about the potentially important object 416 is included in the metadata 372) may be determined according to the computer vision model implemented by the detection libraries module 334. Each of the cameras 100a-100n may implement different video analytics libraries. Some of the cameras 100a-100n may be configured to ignore the potentially important object 416, while other of the cameras 100a-100n may be configured to extract the object data 380e about the potentially important object 416. In one example, a police vehicle implementing one of the cameras 100a-100n may perform the video analytics using a detection library that does not bother to detect landscaping details, but a homeowner may install one of the cameras 100a-100n (e.g., as a home security camera) that may perform the video analytics using a detection library that does detect the landscaping details. Since the metadata server 120 may store the metadata 158 received from multiple sources, the re-created scene may comprise the details about the potentially important object 416 if at least one of the cameras 100a-100n recorded the metadata 372 about the potentially important object 416. The potentially important objects 416 that are determined to be unimportant may be treated as the unimportant objects 414. Which of the potentially important objects 416 are determined to be relevant to scene re-creation and which of the potentially important objects 416 are determined to be irrelevant to scene re-creation may be varied according to the design criteria of a particular implementation.

In some embodiments, the cameras 100a-100n may be configured to generate automated incident reports. In one example, the video analytics module 330 may be configured to flag an event (e.g., a collision such as the collision between the vehicle 250a-250b as shown in association with FIG. 4). In another example, the driver may manually flag an event by providing an input to the camera 100a (e.g., by pressing a button on the camera 100a and/or using the smartphone 112a connected to the camera 100a). In yet another example, the sensor cluster 314 may comprise an accelerometer and/or gyroscope that may detect an abrupt speed and/or direction change that may be flagged. In response to flagging the event, the cameras 100a may preserve the video data 370 corresponding one of the video files 350a-350n (e.g., including a pre-determined amount of time before and after the event, such as 30 seconds before and 30 seconds after). The camera 100a (e.g., via the smartphone 112a) may communicate the video data 370 associated with the event and the metadata 372 (e.g., including the sensor data 380h from the vehicle 200 and/or the camera 100a) to the metadata server 120. In some embodiments, the metadata 372 alone may provide sufficient information to enable the metadata server 120 to generate an animation that may be used for the incident report.

In some embodiments, the metadata server 120 may overlay the metadata 158 on the video corresponding to the event. In some embodiments, the processor 302 may be configured to overlay the metadata on the video corresponding to the event before communicating the video file to the metadata server 120. The data overlay may be similar to the status captions 412a-412f. For example, the automated incident report may comprise the location and/or speed data as well as showing other vehicles and/or pedestrians that may have been involved (e.g., to indicate which party may have crossed illegally, signaled incorrectly and/or behaved improperly). The annotated data of the status captions 412a-412f may provide additional information to insurance investigators and/or police to see the status of the traffic light 410e, license plates and/or make/model of the vehicle 410a, determine an identity of the pedestrians 410c (e.g., potential witnesses), etc. In an example, the camera 100a may be configured to generate a file (e.g., a PDF file) as the incident report that may reside in the memory 304 (e.g., an expandable SD-type card slot) and/or be downloaded to the user device 112a) to enable the incident report to be communicated later when internet connectivity is available.

In the example shown, most of the objects 410a-410f may be located in the middle section 404 of the video frame 400. For example, the vehicle 410a, the vehicle 410b, the pedestrians 410c, the street light 410d and/or the sign 410f may be on, or slightly above the roadway in the middle section 404. Two objects (e.g., the traffic light 412e and the cloud 414) may be located in the upper section 406. No objects may be detected in the portion of the video frame 400 corresponding to the hood 402. In the example shown, the hood 402 may comprise reflections (e.g., of the objects 410a-410c). If the video analysis module 330 interprets the reflections on the hood 402 as objects, the results of the object detection and/or the associated metadata may be incorrect and/or misleading.

The video analysis module 330 may be configured to perform hood detection. For example, one of the library modules for object detection may be configured to detect where the hood 402 is located in the video frame 400. The video analysis module 330 may dynamically determine the location of the hood 402 in video frames in the input buffer 332 based on hood detection. For example, the cameras 100a-100n may be installed by the consumer and the field of view captured by each camera 100a-100n may be slightly different based on the installation. A varying amount of hood and sky may be present in the field of view of the cameras 100a-100n for each installation.

In some embodiments, the hood detection may be performed by the video analytics module 330 (e.g., on-camera). In some embodiments, the hood detection may be performed through cloud (or distributed) processing. For example, after the camera 100a is installed, a series of photos (e.g., video frames) may be captured and transferred to the cloud processing service. The video frames may be analyzed on the cloud server side to detect where the view of the hood starts in the video frame. Generally, the field of view does not change after installation. In one example, a still image may be captured and sent periodically to audit if the field of view has changed (e.g., and the location of the hood 402).

In some embodiments, general statistics may be collected from each of the cameras 100a-100n in the system 50 and/or by the processor 302. The statistics may be analyzed to learn and/or understand how many license plates and/or other objects are typically collected for each time period and general location. For example, if the number of objects detected dramatically falls, then the cameras 100a-100n may generate an alert along with a still image or video file information for an automated (e.g., hood detection) and/or manual analysis. For example, the alert may be used to determine if one or more of the cameras 100a-100n have been damaged or has become dislodged so that the field of view is no longer aligned to position the location of the hood 402 to a particular area of the frame buffer 332.

Metadata extraction from video generated from one of the dash cameras 100a-100n may take advantage of inherent characteristics of the scene to limit the amount of spatial data used from the input video frame 400 as input to the input frame buffer 332 used for video analytics. By limiting the amount of spatial data input to the working buffer 332 the inherently limited system resources of the real time system may be allocated more efficiently. A typical scene captured from the dash cameras 100a-100n may have about 15% to 25% hood surface captured as well as 15% to 25% sky. The hood 402 is typically unimportant for the collection of roadway data. The reflections off the hood surface 402 may further complicate any analysis that is using the bottom of the video frame 400 to look for relevant objects. The sky region may have decreasing importance for roadway data as the top of the video frame 400 is reached. Details of the detection libraries for the video analytics module and/or hood detection may be described in association with U.S. patent application Ser. No. 16/156,254, filed on Oct. 10, 2018 and U.S. patent application Ser. No. 17/568,746, filed on Jan. 5, 2022, appropriate portions of which are incorporated by reference.

Figure 7:
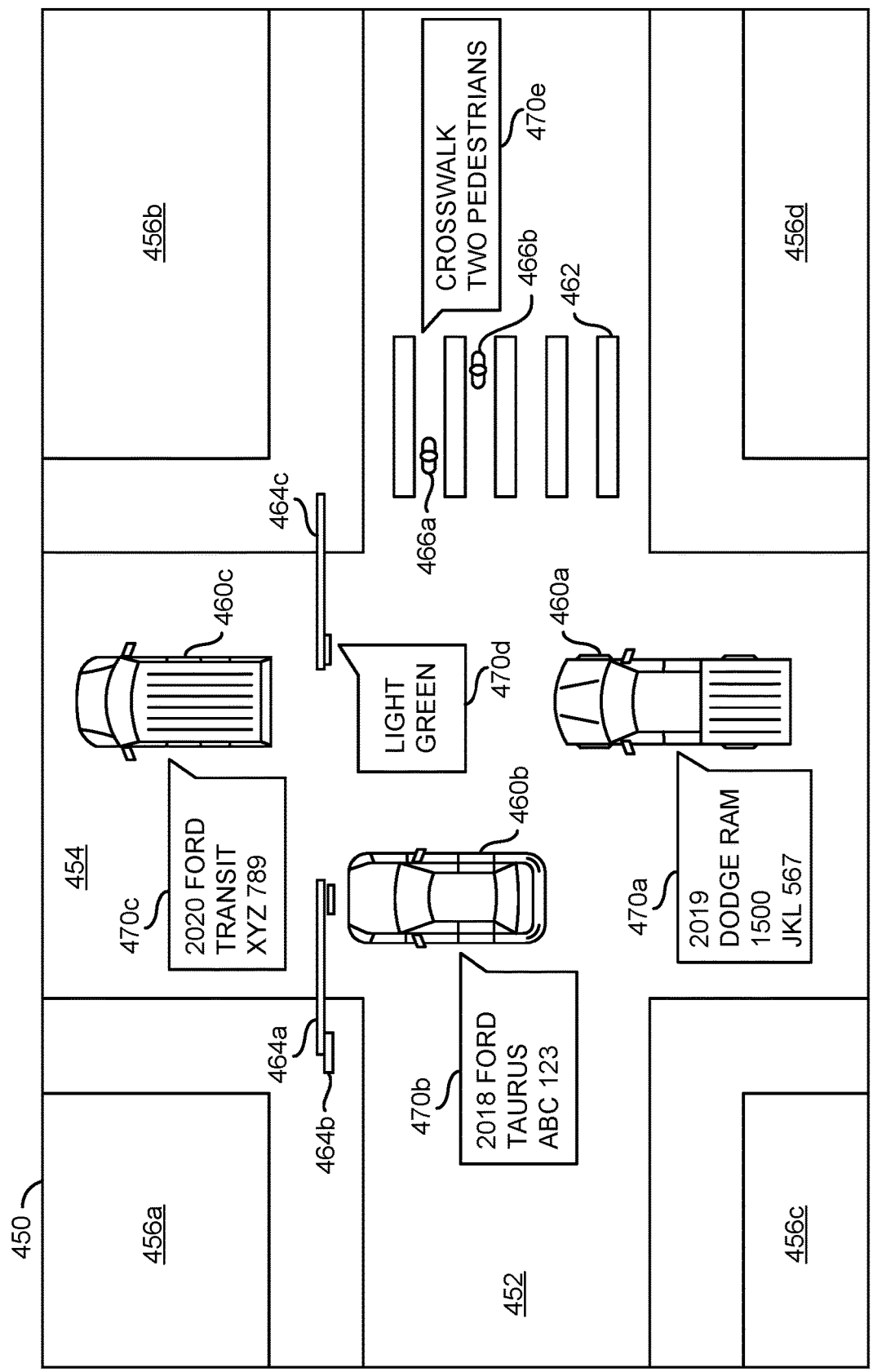
FIG. 7 is a diagram illustrating an example animation generated in response to a scene re-creation based on metadata.

Referring to FIG. 7, a diagram illustrating an example animation generated in response to a scene re-creation based on metadata is shown. A re-created scene 450 is shown. The re-created scene 450 may be a still image of an animation created by the metadata server 120. The re-created scene 450 may be generated in response to the metadata 158 stored in the database 130. The metadata 158 may be stored in the database 130 in response to the cameras 100a-100n uploading the metadata 372 associated with the video files 350a-350n via the signal META.

In the example shown, the re-created scene 450 may comprise an overhead view. The overhead view in the re-created scene 450 may be re-created from the metadata associated with the video frame 400 shown in association with FIG. 6. Using only the metadata 158 (e.g., without any of the video data 370), the metadata server 120 may generate an animation of the re-created scene 450 that may provide information similar to the visual data in the video frame 400. Since the metadata 158 stored in the database 130 is not video data, the re-created scene 450 may provide an alternate perspective than the source video frame 400 or the same perspective as the source video frame 400. In the example shown, metadata server 120 may have created the overhead view in the re-created scene 450 from the first-person perspective of the video frame 400. In some embodiments, the re-created scene 450 may be generated in response to the metadata 372 generated in response to the video data 370 captured by the multiple camera systems 100a-100d (e.g., the trawl mode that captures the video data 370 all around the vehicle 200, as shown in association with FIG. 3). Generally, the re-created scene 450 may be generated based on the information in the metadata 158, regardless of the perspective of the cameras that captured the video data 370 that was used to generate the metadata 372.

The cameras 100a-100n may be configured to recognize the various objects of interest and convert the information about the objects detected into the metadata 372. For example, the metadata 372 may comprise the absolute location data 380g that may be calculated based on the known sizes of license plates, characteristics of the vehicles detected (e.g., a 2010 Ford F150 tailgate may have a known size), etc. The metadata 372 may be communicated to the metadata server 120 as the signal META and stored as the metadata 158. The metadata server 120 may generate the re-created scene 450 and/or a sequence of scenes (e.g., an animation) in response to the metadata 158 received over time.

The re-created scene 450 may comprise a road 452 and a road 454 that may form an intersection and buildings 456a-456d. The roads 452-454 and/or the buildings 456a-456d may be generated based on the roadway in the middle section 404 of the video frame 400. Information about the roads 452-454 and/or the buildings 456a-456d may be part of the metadata 372 generated by the cameras 100a-100n. In some embodiments, the metadata server 120 may retrieve roadway and/or structure information based on a third-party mapping service (e.g., Google Maps, a GPS/GNSS service, etc. may provide location information about the locations of roads and buildings).

The re-created scene 450 may comprise re-created vehicles 460a-460c, re-created road markings 462, re-created traffic signals 464a-464c and/or re-created pedestrians 466a-466b. The re-created vehicles 460a-460c may be generated from the vehicle 200 and/or the objects 410a-410b in the video frame 400. The re-created road markings 462 may be detected on the roadway in the video frame 400. The re-created traffic signal 464a may correspond to the detected traffic light 410e, the re-created traffic signal 464b may correspond to the detected street sign 410f and the re-created traffic signal 464b may correspond to the detected traffic light 410d in the video frame 400. The re-created pedestrians 466a-466b may be re-created from the pedestrian group 410c detected in the video frame 400.

The various re-created objects (e.g., the vehicles 460a-460c, the road markings 462, the traffic signals 464b and/or the pedestrians 466a-466b, etc.) may be generated in response to the metadata 372 captured. For example, the re-created objects may be placed in the re-created scene 450 based on the information in the status captions 412a-412f (which corresponds to the metadata information 380a-380n), which may define the various characteristics of the re-created objects. The re-created scene 450 may exclude the unimportant objects 414 and/or any of the potentially important objects 416 that were determined not to be important. In the example re-created scene 450, the cloud (e.g., the unimportant object 414) and the shrub (e.g., the potentially important object 416) have not been re-created.

Captions 470a-470e are shown. The captions 470a-470e may provide an illustrative example of details that may be shown for the re-created objects in the re-created scene 450. In the example shown, the caption 470a may indicate that the re-created vehicle 460a (e.g., the vehicle 200) may be a 2019 Dodge Ram 1500 with license plate JKL 567, the caption 470b may indicate that the re-created vehicle 460b (e.g., the vehicle 410a) may be a 2018 Ford Taurus with license plate ABC 123, the caption 470c may indicate that the re-created vehicle 460c (e.g., the vehicle 410b) may be a 2020 Ford Transit with license plate XYZ 789, the caption 470c may indicate that the re-created traffic signal 464c (e.g., the traffic light 410d) may have been a green light at the time of capture of the video frame 400, and the caption 470e may indicate that the re-created pedestrians 466a-466b (e.g., the pedestrian group 410c) may be two pedestrians crossing the road 452 at a crosswalk. The captions 470a-470e may be configured to provide the details about the objects detected and stored in the metadata 372 at the time that the video data 370 was captured.

In some embodiments, the re-created scene 450 may display the re-created objects with the details in the captions 470a-470e. For example, the re-created vehicle 460a may appear in the animation as the 2019 Dodge Ram 1500 (e.g., the re-created vehicle 460a may look similar to the 2019 Dodge Ram 1500). In some embodiments, the re-created scene 450 may comprise generic blocks representing the re-created objects (e.g., a wireframe view, generic polygon models, etc.). For example, the information in the captions 470a-470e may be displayed as a pop up caption when a user hovers over the various objects with a mouse cursor. In some embodiments, the captions 470a-470e may be displayed as a separate window with only a text presentation of the data (e.g., so the captions 470a-470e do not cover the re-created scene 450).

The placement of the re-created objects (e.g., the re-created vehicles 460a-460c, the re-created road markings 462, the re-created traffic signals 464a-464c, the re-created pedestrians 466a-466b) may be determined based on the absolute location data 380g in the metadata 372. The captions 470a-470e may comprise all of the metadata 372 (e.g., the object data 380e, the sensor data 380h, the vehicle status information 380n, etc.). The re-created scene 450 may further comprise other information about the environment (e.g., weather information such as 'party cloud'). In some embodiments, the unimportant objects 414 and/or the potentially important objects 416 may be analyzed to provide general details (e.g., the clouds and shrubs may not be important to show in the re-created scene 450 but may be used for a general description such as, "cloudy, heavily landscaped region"). Various details of the re-created object may be enhanced based on known data about the objects (e.g., details of the roadway may be identified based on third-party map information, a size of street signs may be based on known attributes of street signs, road markings may be determined based on regional practices for marking roads, etc.).

A combination of the timestamp data 380b and the absolute location data 380g in the metadata 372 extracted by the video analytics module 330 may enable the absolute locations of each of the re-created objects to be determined from moment to moment. In the example shown, the re-created scene 450 may be one still image. However, using the absolute locations of the detected objects over time, the re-created scene 450 may comprise an animation that follows the absolute locations at each timestamp. In an example, a user viewing the re-created scene 450 may play, pause, fast forward and/or rewind the re-created scene 450 similar to viewing video data. The playback of the animation of the re-created scene 450 may update the absolute locations of the re-created objects based on the timestamp data 380b (e.g., the absolute locations data 380g and/or the other metadata 372 may be updated at each timestamp, and each timestamp may be similar to a video frame when playing back video data). For example, playing back the animation of the re-created scene 450 "frame-by-frame" may update the re-created scene at each available timestamp from the metadata 372. Playing back the re-created scene 450 timestamp by timestamp (e.g., using the metadata received over time) may provide the animation.

The re-created objects in the re-created scene 450 may be implemented as 3D rendered geometry. The object dimensions and/or characteristics of the detected objects may be well defined in order to accurately represent the detected objects as 3D rendered geometry to provide a visualization similar to the captured video 370. Many objects viewed on and/or from the roadway have a standardized shape, form, geometry, etc. In an example, a California license plate may have a specific size (e.g., with letters of a given font and size). The license plate may have an approximate location on a vehicle that has a finite subset of makes, models, years, and colors. In an example, the video analytics module 330 may identify, with a high amount of accuracy, a red 2020 Ford Explorer LX with California license plate 7FVV019. Since the geometry particular to the detected vehicle may be known, along with the license plate size and/or location, a precise relative location from the camera system 100 may be derived. Using the onboard GPS system 340, the absolute location 380g of the detected vehicle in the video data 370 may also be derived. The metadata server 120 may generate the re-created object as a 3D rendered object in the re-created scene based on the known data about the particular vehicle (e.g., the dimensions of the object based on the specifications of the make/model/year of the vehicle).

Since the re-created scene 450 may comprise 3D rendered geometry, the re-created scene 450 may be viewed from various perspectives. In an example, a user may view the re-created scene 450 and zoom and pan around the re-created scene (e.g., similar to a free-floating camera that may be moved around to provide a desired perspective of the re-created scene 450). In one example, if the vehicle 200a that implements the camera system 100a that provided the metadata 372 for the re-created scene 450 is following directly behind the Ford Taurus vehicle 410a (e.g., the re-created vehicle 460b), then the video data 370 may capture a perspective from the camera system 100a with only the back side of the vehicle 410a visible. However, in the re-created scene 450, the user may be able to zoom and pan around to view the front of the re-created vehicle 460b and see an alternate perspective. For example, the re-created vehicle 460b may comprise more details in the re-created scene than would be available in the video data 370 alone.

The re-created scene 450 may comprise the 3D rendered geometry corresponding to the detected objects. However, since one of the camera systems 100a-100n may not capture all the details of a vehicle (e.g., if the 2018 Ford Taurus is only captured from behind), the metadata server 120 may be configured to interpolate one or more details of the object when creating the 3D rendered geometry. For example, the color and/or the factory details of the front of the vehicle may be interpolated (e.g., estimated based on known data about an object). However, the captured vehicle may have specific and/or unique details (e.g., scratches, dents, bumper stickers, etc.) on the front that may not be part of the known object data. In some embodiments, the interpolated details may be displayed with placeholder information (e.g., the re-created scene 450 may draw interpolated portions of the detected objects with hatched and/or diagonal lines instead of solid colors of the unknown details). The placeholder information may provide a visual communication to a user that particular details may be interpolated. In some embodiments, the metadata 372 uploaded by other of the camera systems 100a-100n may be used to fill in the information. For example, multiple of the camera systems 100a-100n may each provide different perspectives of the same scene at the same timestamp and the metadata server 120 may fill in details for the re-created objects by aggregating the object data 380e from multiple sources (e.g., the vehicle 200a implementing the camera system 100a may capture details about the re-created object 460b from the rear while the vehicle 200b implementing the camera system 100b may capture details about the re-created object 460b from the front at the same time).

In some embodiments, the camera system 100a may track the same objects over time to continually fill in details about the detected objects. In an example, a license plate number may be partially obscured by a trailer hitch at one timestamp, but at a later timestamp, the vehicle 200 may have moved to enable the camera system 100a to capture a perspective that shows the previously obscured license plate number. By tracking the objects over time, the video analytics module 330 may fill in details that may be missing at one timestamp with the details captured at another timestamp (e.g., the details may be accumulated over time). In another example, the camera system 100a may provide the video data 370 of the vehicle 200b from behind (e.g., would not provide details about a bumper sticker on the front of the vehicle and a cracked windshield). Eventually the camera system 100a may pass the vehicle 200b and capture the bumper sticker and cracked windshield. The camera system 100a may extract the metadata 372 from the view of the front of the vehicle 200b to fill in the details about the bumper sticker and cracked windshield in the object data 380e. A level of confidence may be associated with details tracked over time (e.g., an indication of certainty about whether the details belong to the same object or a different object). The visual placeholder for interpolation may be adjusted based on the level of confidence (e.g., yellow hatched lines for a medium level of confidence and red hatched lines for a low level of confidence). The level of confidence may decrease the greater the time difference between the captured data (e.g., a higher confidence level for the captured data that is a few seconds or minutes apart and a lower level of confidence for the captured data that is a day or a week apart).

Figure 8:
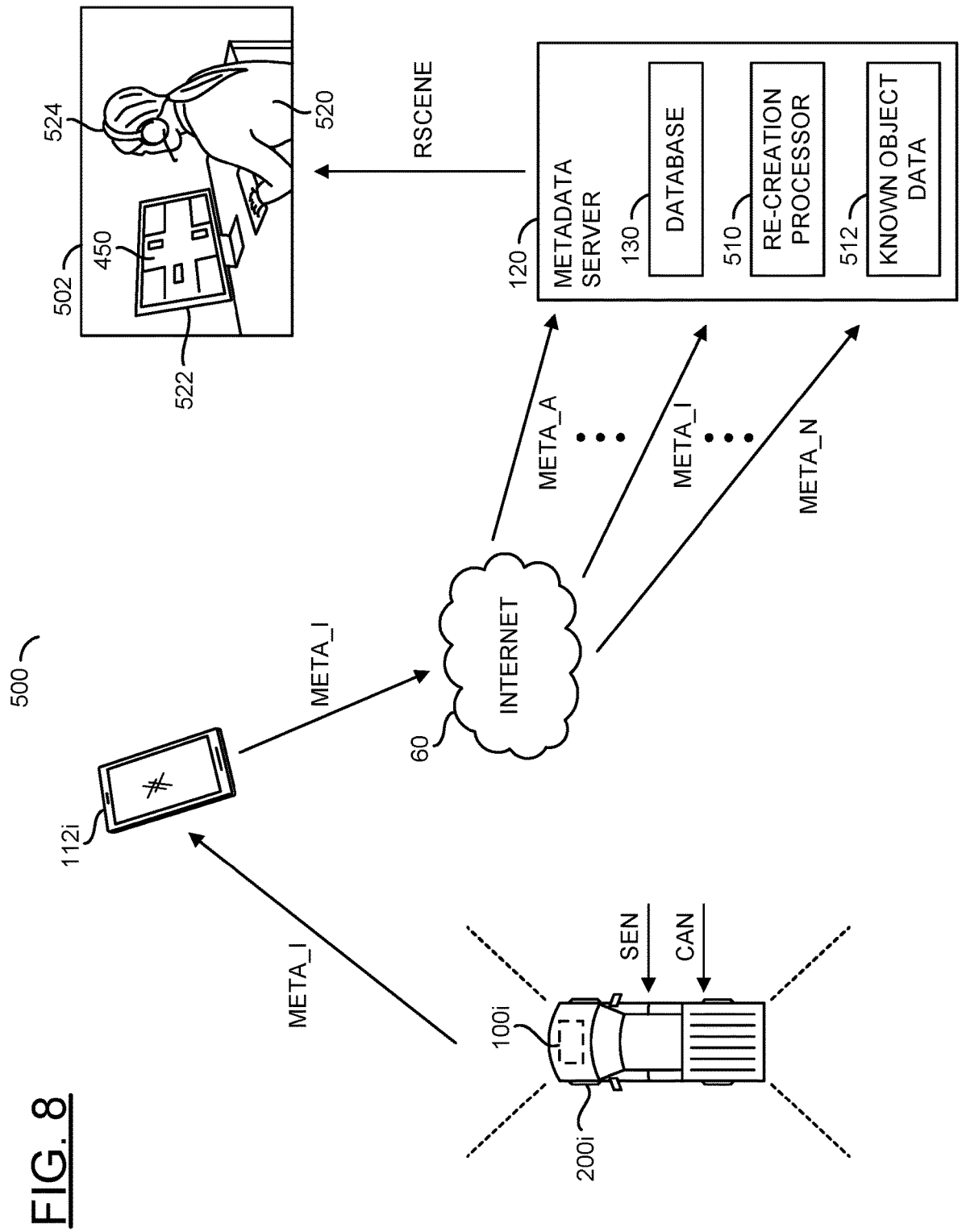
FIG. 8 is a diagram illustrating communicating a scene re-creation to a driving advisor.

Referring to FIG. 8, a diagram illustrating communicating a scene re-creation to a driving advisor is shown. A communications dataflow 500 is shown. The communications dataflow 500 may comprise the network 60, the user device 112i, the metadata server 120, the vehicle 200i implementing the camera system 100i and an operator location 502. The communications dataflow 500 may comprise other devices and/or nodes (not shown). In an example, more than one of the camera systems 100a-100n and/or more than one of the users devices 112a-112n may be implemented. The number, type and/or arrangement of the devices and/or nodes in the communications dataflow 500 may be varied according to the design criteria of a particular implementation.

The camera system 100i is shown capturing the video data 370 of the environment near the vehicle 200i. In the example shown, the camera system 100i may capture multiple views around the vehicle 200i. In one example, the camera system 100i may comprise a 360 degree camera configured to generate an all-around view (e.g., capture video data in all directions around the vehicle 200i). In another example, the camera system 100i may comprise multiple cameras that may each capture a different direction around the vehicle 200i. The camera system 100i is shown receiving a signal (e.g., SEN) and the signal CAM. The signal SEN may be the sensor data generated by the sensor cluster 314. The signal SEN and the signal CAN are shown for illustrative purposes. Generally, the signal CAN and the signal SEN may be internal to the vehicle 200i and/or the circuit 102i.

The camera system 100i may generate the metadata 372 and communicate the metadata 372 via the signal META_I. Since the amount of data in the signal META_I may be small (e.g., small compared to communicating the video data 370), the signal META_I may be communicated to the user device 112i. In an example, the signal META_I may be transmitted via Bluetooth (or another short-range, low-power communications protocol). In the example shown, the user device 112i may be a smartphone. The smartphone 112i may forward the signal META_I to the network 60. The smartphone 112i may communicate with the network 60 via a higher power communications protocol than the communications protocol between the camera system 100i and the user device 112i. In an example, the camera system 100i may be implemented without Wi-Fi to keep costs low for the camera system 100i, and the user device 112i may use Wi-Fi to communicate with the network 60.

The metadata server 120 may receive the metadata signal META_I generated by the camera system 100i via the network 60. The metadata server 120 may receive the metadata 372 from each of the metadata signals META_A-META_N. For example, each of the camera systems 100a-100n implemented in the vehicles 200a-200n (not shown) may independently generate the metadata 372. The metadata 372 from the camera systems 100a-100n may provide different perspectives of a same location and time and/or metadata corresponding to the video data 370 captured at different times and/or different locations. The signals META_A-META_N may be generated by the camera systems 100a-100n, respectively. The metadata server 120 may store the metadata 372 generated by each of the camera systems 100a-100n in the database 130 as the metadata 158 (as shown in association with FIG. 2).

The metadata server 120 may comprise the database 130, a block (or circuit) 510 and/or a block (or circuit) 512. The circuit 510 may implement a re-creation processor. The circuit 512 may implement known object data. The metadata server 120 may comprise other components (not shown). In an example, the metadata server 120 may comprise memory, hardware acceleration processors (GPUs), etc. that may be used in combination with the re-creation processor 510. The number, type and/or arrangement of the components of the metadata server 120 may be varied according to the design criteria of a particular implementation.

The re-creation processor 510 may be configured to re-create various scenes from the metadata 158 without using the video data 370. In an example, the database 130 may only store the metadata 158 and the re-creation processor 510 may only have access to the metadata 158. In an example, the re-creation processor 510 may generate the re-created scene 450 shown in association with FIG. 7.

The re-creation processor 510 may be configured to generate the 3D geometric rendering of a re-created scene and/or an animation. The re-creation processor 510 may interpret the information in the metadata 158 in order to re-create a scene for particular timestamps at a particular location. In some embodiments, the re-creation processor 510 may re-create a scene in response to the metadata 372 from one of the camera systems 100a-100n. For example, the re-creation processor 510 may generate one re-created scene from the metadata 372 communicated by the camera system 100a in the signal META_A, another re-created scene from the metadata 372 communicated by the camera system 100b in the signal META_B, another re-created scene from the metadata 372 communicated by the camera system 100c in the signal META_C, etc.

In some embodiments, the re-creation processor 510 may be configured to aggregate all the metadata 158 to generate the re-created scenes based on multiple sources of metadata. For example, each re-created scene may correspond to a particular location at a particular time. The timestamp data 380b and the absolute location data 380g may be used to determine which of the metadata clips 180a-180n are applicable to a particular time and location. By aggregating the metadata clips 180a-180n from multiple sources, the re-creation processor 510 may fill out all the details in the re-created scene. For example, one of the camera systems 100a may only capture a partial view of a scene, but by using the metadata from the camera system 100b, the re-creation processor 510 may fill in any blanks (or gaps) in information using a different partial view of the same scene. Generally, the more metadata from different of the camera systems 100a-100n available to the re-creation processor 510, the more detailed the re-created scene generated by the re-creation processor 510 may be.

The re-creation processor 510 may generate a signal (e.g., RSCENE). The signal RSCENE may comprise the re-created scene generated in response to the metadata signals META_A-META_N. The metadata server 120 may communicate the signal RSCENE to an end user. The end user may be at the operator location 502.

The known object data 512 may be configured to store known information about various types of objects. The known object data 512 may provide data for the re-creation processor 510 to create the 3D rendered geometry of the objects in the metadata 158. The known object data 512 may comprise information about sizes, shapes and/or other features of various objects that may be detected. In an example, the known object data 512 may store information about a size and shape of various makes, models and years of vehicles. For example, when the metadata 158 indicates that a 2018 Ford Taurus is located at a particular absolute location, the known object data 512 may provide information about a width and length of the 2018 Ford Taurus to enable the re-creation processor 510 to generate the 3D rendered geometry that provides a model of the 2018 Ford Taurus in the re-created scene 450. For example, the video data 370 may capture a rear end of the 2018 Ford Taurus and the video analytics module 330 may determine that the 2018 Ford Taurus is located at a particular absolute location without having a visual captured of the front end of the 2018 Ford Taurus (or being able to provide details about the length and width of the detected vehicle). The known object data 512 may be used to fill in the details (e.g., missing measurement data) that is not present in the metadata 158 based on the stored parameters about the known objects.

The known object data 512 may comprise generic information about the known objects. For example, the known object data 512 may enable the 3D rendered geometry generated by the re-creation processor 510 to appear the same for every 2018 Ford Taurus (or possibly with different colors) in the re-created scene. Details in the metadata 158 may override the generic information in the known objects data 512. For example, the metadata 158 may indicate the red, 2018 Ford Taurus is at a particular location, and the re-creation processor 510 may use the generic information about the 2018 Ford Taurus to render a 3D model version of a generic red, Ford Taurus in the re-created scene. The metadata 158 may further indicate that the detected vehicle has a scratch on the passenger side and a bumper sticker. The details about the scratch and the bumper sticker may be unique to the particular vehicle detected by the video analytics module 330. The re-creation processor 510 may add the unique scratch and bumper sticker to the generic model of the 2018 Ford Taurus model from the known object data 512 based on the information in the metadata 158 for the one particular vehicle (e.g., another detected Ford Taurus may use the generic information from the known object data 512).

In some embodiments, the known object data 512 may be provided by a third-party service. In an example, each vehicle manufacturer may provide specifications about the models of vehicles that are produced. In another example, the known object data 512 may be crowd-sourced (e.g., volunteers may provide information about various models of vehicles). The known object data 512 may comprise information about traffic signs, traffic signals, map data (e.g., the locations of roads and intersections), etc. The data stored in the known object data 512 may be similar to information stored in the object data 352. The type of data and/or amount of data stored in the known object data 512 may be varied according to the design criteria of a particular implementation.

The operator location 502 may comprise an end user 520, a display device 522 and a communication device 524. In an example, the display device 522 may be a computer monitor for one of the subscriber devices 110a-110n. The re-created scene 450 is shown displayed on the display device 522. The re-created scene 450 may be generated on the display device 522 in response to the signal RSCENE.

In an example, the end user 520 may be a coach (or a supervisor or a spotter). The re-created scene 450 may provide a real-time animation of the environment near the vehicle 200i. For example, the metadata 372 generated by the camera system 100i may be communicated to the metadata server 120 in real-time. In an example, the operator location 502 may be a central fleet hub for a business or service that uses a fleet of vehicles (e.g., delivery trucks, taxis, a police fleet, etc.). For example, the end user 520 may view the real-time feed of the re-created scene 450 in order to track a real-time location of the vehicle 200i and/or to view the driving behavior of the vehicle 200i.

The end user 520 may use the communication device 524 (e.g., a headset) to communicate real-time instructions to the driver of the vehicle 200i. For example, the end user 520 may be a driving coach and/or a supervisor viewing the progress of the vehicle 200i via the re-created scene 450. The end user 520 may provide user to the driver using the communication device 524, while watching the re-created scene 450 in real-time. In an example, if the end user 520 is a police dispatcher, the end user 520 may view a crime in progress and inform the vehicle 200i by communicating over the communication device 524 (e.g., "We are watching a stolen truck on highway 101!"). In another example, the end user 520 may cross reference vehicles in the field of view of the camera system 100i with a bank list of vehicles that need to be repossessed (e.g., the captions 470a-470e in the re-created scene 450 may be compared to a make, model, year and license plate data of a repossession list). In yet another example, the end user 520 may be a coach for a delivery truck driver and may inform the vehicle 200i of potential issues (e.g., radio or phone back to the driver saying, "Watch out for that truck ahead of you, it is known to drive erratically!"). The scenario for communication between the end user 520 and the vehicle 200i based on the re-created scene 450 may be varied according to the design criteria of a particular implementation.

Figure 9:
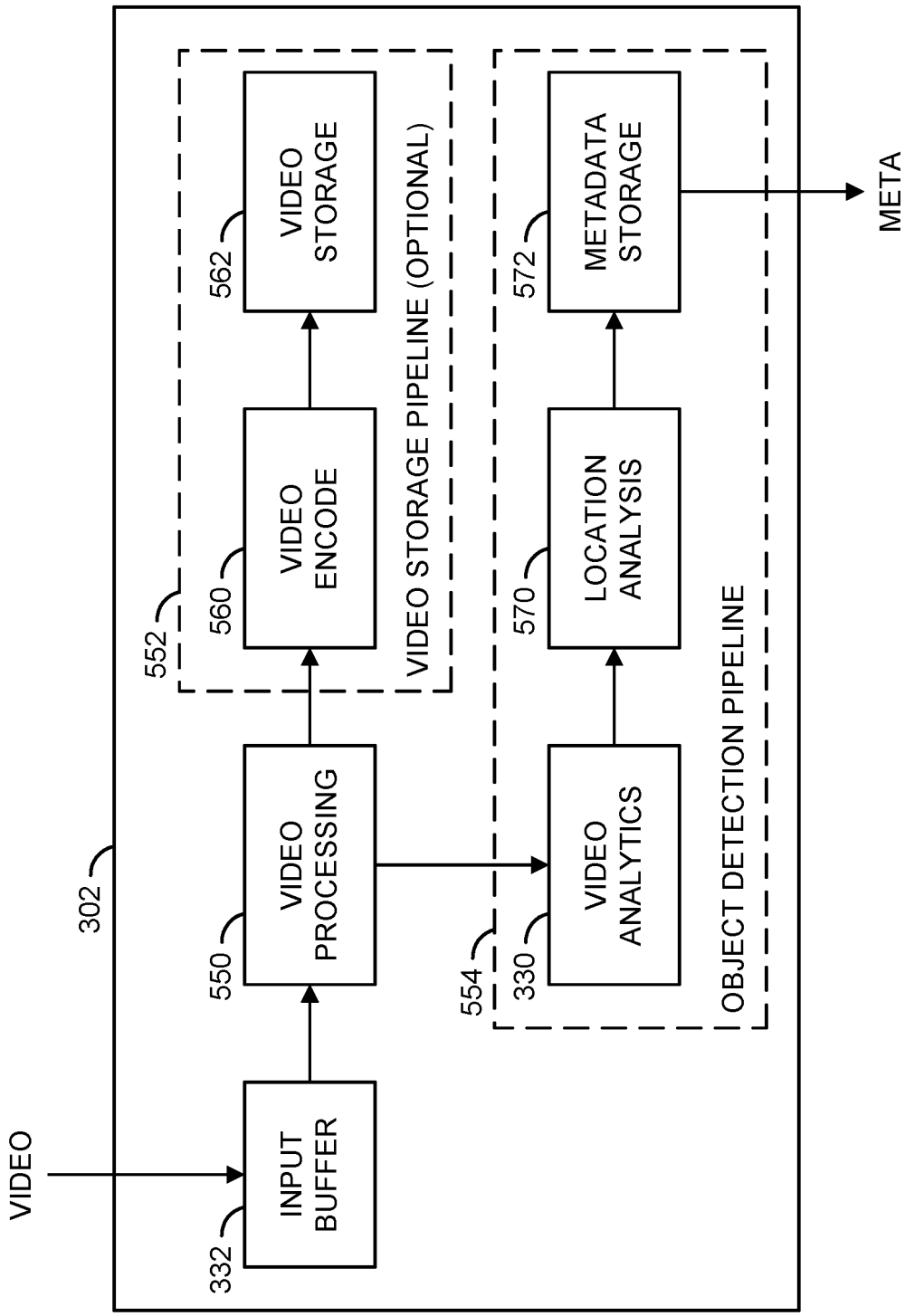
FIG. 9 is a block diagram illustrating an object detection pipeline.

Referring to FIG. 9, a block diagram illustrating an object detection pipeline is shown. A block diagram of the processor 302 is shown. The processor 302 may comprise the input buffer 332, a block (or circuit) 550, a block (or circuit) 552 and/or a block (or circuit) 554. The circuit 550 may implement video processing. The circuit 552 may implement a video storage pipeline. The circuit 554 may implement an object detection pipeline. The processor 302 may comprise other components (not shown). The processor may receive the signal VIDEO and/or generate the signal META. The components implemented by the processor 302 and/or the signals sent/received by the processor 302 may be varied according to the design criteria of a particular implementation.

The input buffer 332 may receive input video frames from the signal VIDEO. The input buffer 332 may present the video data 370 to the video processing module 550. The video processing module 550 may be configured to perform various pre-processing operations to prepare the video data for encoding and/or video analytics.

The video storage pipeline 552 may be an optional component. Since the re-creation processor 510 of the metadata server 120 may be capable of re-creating scenes that provide a visualization similar to the captured content of the video data 370, the camera systems 100a-100n may not necessarily need to store the video data 370 long-term. For example, the video data 370 may be flushed as soon as the corresponding metadata 372 is stored by the memory 304. Implementing the camera systems 100a-100n without the video storage pipeline 552 may enable the camera systems 100a-100n to be produced at a lower per-unit cost than if the video storage pipeline 552 is implemented. In an example, the camera systems 100a-100n may be produced at two different pricepoints (e.g., a higher pricepoint with the video storage pipeline 552 implemented and a lower pricepoint with the video storage pipeline 552 not implemented). Implementing the camera systems 100a-100n without the video storage pipeline 552 may further reduce power consumption and/or heat generation. Both models of the camera systems 100a-100n may communicate the signal META comprising the processed metadata 372, which may consume less bandwidth (e.g., and use less expensive radio transmission equipment).

The video storage pipeline 552 may comprise a block (or circuit) 560 and/or a block (or circuit) 562. The circuit 560 may implement a video encoding module. The circuit 562 may implement a video storage module. The video storage pipeline 552 may comprise other components (not shown). The number, type and/or arrangement of the components of the video storage pipeline 552 may be varied according to the design criteria of a particular implementation.

The video encoding module 560 may be configured to encode and/or decode the captured video data. Encoding and/or decoding the captured video may compress the video data to enable more video data to be stored in the memory 304. The encoding and/or decoding performed by the video encoding module 560 may be lossless and/or lossy compression. The video encoding module 560 may perform the encoding on the captured video data in real-time. For example, the video encoding module 560 may implement encoding such as H.264, H.265, VP8, VP9, Daala, etc. The video encoding module 560 may be further configured to encode and/or decode the captured video frames as still images. For example, the image encoding module 496 may implement image formats such as JPEG, JPEG-XL, BMP, PNG, WebP, SVG, etc. The type of encoding implemented by the video encoding module 560 may be varied according to the design criteria of a particular implementation.

The encoded video data from the video encoding module 560 may be presented to the video storage module 562. The video storage module 562 may comprise an interface to the memory 304. The video storage module 562 may organize the storage of the video data 370 in the memory 304. In an example, the video storage module 562 may manage a circular buffer for storing the most recent video data and/or overwriting the oldest video data. The video storage module 562 may manage the flag data 380c in the metadata 372 to determine which of the video data 370 to preserve.

The object detection pipeline 554 may be configured to generate the metadata 372 in response to the video data 370. The object detection pipeline 554 may comprise the video analytics module 330, a block (or circuit) 570 and/or a block (or circuit) 572. The circuit 570 may implement a location analysis module. The circuit 572 may implement a metadata storage module. The object detection pipeline 554 may comprise other components (not shown). The number, type and/or arrangement of the components of the object detection pipeline 554 may be varied according to the design criteria of a particular implementation.

The location analysis module 570 may be configured to determine the absolute location of the objects detected by the video analytics module 330. In an example, the video analytics module 330 may provide the relative locations of the objects detected and the absolute location module 570 may generate the absolute location data 380g in response to the relative locations and the camera location data 380f. The location analysis module 570 may be configured to determine a direction of travel based on a skew of various objects. The location analysis module 570 may be configured to determine the absolute location of the objects based on a comparison to the known size of the objects stored in the object data 352. Details of the determination of the absolute location of the objects may be described in association with U.S. application Ser. No. 16/208,861, filed on Dec. 4, 2018 (now U.S. Pat. No. 10,984,275, issued on Apr. 20, 2021), appropriate portions of which are incorporated by reference.

The metadata storage module 572 may comprise an interface to the memory 304. The metadata storage module 572 may organize the storage of the metadata 372 in the memory 304. The metadata storage module 372 may be configured to manage which of the metadata 372 is transferred to the metadata cache 354. In an example, the metadata storage module 572 may packetize the metadata 372 for communication via the signal META.

Figure 10:
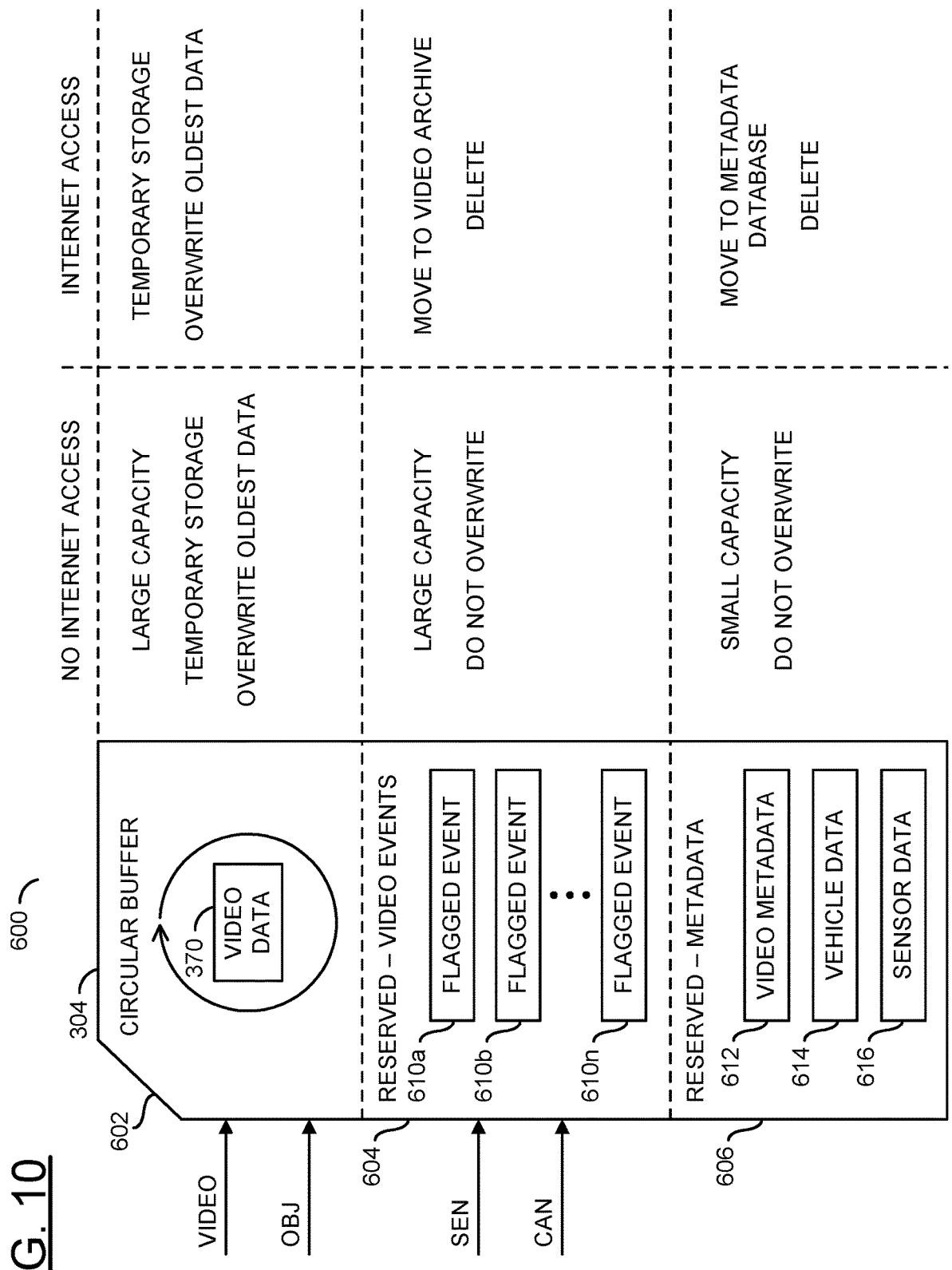
FIG. 10 is a diagram illustrating data management in a removable storage media for a video capture device.

Referring to FIG. 10, a diagram illustrating data management in a removable storage media for a video capture device is shown. Data management 600 is shown. The data management 600 may comprise the memory 304. In the example shown, the memory 304 may comprise a removable storage medium. For example, the memory 304 may comprise a SD card (or a microSD card).

The memory 304 may be configured to receive the signal VIDEO (e.g., the video data 370), the signal SEN (e.g., the sensor cluster data 380h), the signal CAN (e.g., the vehicle status data 380n) and/or a signal (e.g., OBJ). The signal OBJ may comprise the object data 380e generated by the video analytics module 330. The data management 600 implemented by the camera systems 100a-100n may arrange the storage of the various data in the memory 304.

The memory 304 may comprise memory portions 602-606. The memory portion 602 may implement a circular buffer. The memory portion 604 may implement a video events portion. The memory portion 606 may implement a metadata portion. The memory 304 may comprise other memory portions (not shown). The number, type and/or arrangement of the memory portions of the memory 304 may be varied according to the design criteria of a particular implementation.

The circular buffer 602 may be a designated portion of the memory 304 for storing the video data 370. The circular buffer 602 may provide a large capacity in order to store the new incoming video data 370. Eventually, the circular buffer 602 may store a full capacity of the video data 370. In order to continue to record new video, the circular buffer 602 may be configured to overwrite the oldest video data with the newest video data. Generally, the oldest video data may already have the metadata 372 stored and the oldest video data may no longer be needed for purposes other than viewing by an end user. The circular buffer 602 may comprise a large portion of the capacity of the memory 304 (e.g., HD or Ultra-HD video uses a lot of storage capacity). The circular buffer 602 may provide temporary storage for the video data 370. The video data 370 that does not correspond to an event may be flagged for deletion (e.g., remain in the circular buffer 602 until overwritten by new incoming video data).

The video events portion 604 may comprise flagged events 610a-610n. The flagged events 610a-610n may comprise video clips (e.g., portions of the video data 370) that may be stored in the memory 304 outside of the circular buffer 602. For example, the flagged events 610a-610n may be preserved instead of being overwritten in the normal course of data input for the circular buffer 602. For example, the flagged events 610a-610n may correspond to the video files 350a-350n that have the flag 380c set. The video events portion 604 may comprise a relatively large portion of the capacity of the memory 304 (e.g., the video clips may be HD or Ultra-HD video). The video events portion 604 may use less capacity than the circular buffer 602. In some embodiments, the flagged events 610a-610n may be flagged automatically (e.g., by the video analytics module 330). In some embodiments, the flagged events 610a-610n may be flagged manually (e.g., the driver may press a button to indicate that an important event has happened).

The metadata portion 606 may comprise video metadata 612, vehicle data 614 and/or sensor data 616. The video metadata 612 may correspond to the object data 380e and/or other information about the objects detected (e.g., the absolute location data 380g, the audio data 380d, etc.). The vehicle data 614 may correspond to the vehicle status data 380n. The sensor data 616 may correspond to the sensor data 380h. The metadata portion 606 may be a reserved portion of the memory 304 configured to ensure storage space for the metadata 372. Since the metadata 372 is significantly smaller than the video data 370, the metadata portion 606 may be relatively smaller than both the circular buffer 602 and the video events portion 604.

The data management 600 may be implemented by the video storage module 562 and/or the metadata storage module 572. The data management 600 may be configured to determine how data is liberated and/or stored in the memory 304. The data management 600 may operate differently depending on whether the camera systems 100a-100n (or the respective user devices 112a-112n) have internet access. In an example, the vehicles 200a-200n may be in locations that do not have internet access, and may eventually return to a home base (e.g., a fleet of taxis that has limited internet access on the road, but has internet access when returning to the garage). For example, after an eight hour shift, the data in the memory 304 may be transmitted to other locations (e.g., backed up). In an example, the data may be backed up either over a Wi-Fi connection or manually (e.g., by removing the storage medium and connecting to a computing device or connecting the camera systems 100i to the computing device using a wired connection).

Generally, the data management 600 for the circular buffer 602 may operate the same whether or not there is internet access. The circular buffer 602 may provide a large and temporary storage for the video data 370 and overwrite the oldest video data with the newest incoming video data.

The data management 600 for the video events portion 604 may be reserved while there is no internet access. For example, the flagged events 610a-610n may not be overwritten while there is no internet access (e.g., until the flagged events 610a-610n are backed up). When there is internet access, the flagged events 610a-610n may be moved to an archive for backup. The flagged events 610a-610n may be deleted from the video events portion 604 after the data is backed up. In an example, a person may copy the flagged events 610a-610n to a local computer (or a home NAS) for archival purposes.

The data management 600 for the metadata portion 606 may be reserved while there is no internet access. For example, the video metadata 612, the vehicle data 614 and the sensor data 616 may not be overwritten while there is no internet access (e.g., until the metadata 372 is uploaded to the database 130). When there is internet access, the metadata 372 may be moved to the metadata server 120 for long term storage. The metadata server 120 may use the metadata uploaded to generate the re-created scene 450. The video metadata 612, the vehicle data 614 and the sensor data 616 may be deleted from the metadata portion 606 after the data is uploaded to the database 130. Since the metadata 372 uses such a small amount of storage space, the metadata 372 may be preserved on the memory 304 for a long time (e.g., an entire eight hour shift).

The metadata server 120 may reproduce the captured scene using the metadata 372. The data management 600 may further enable the flagged events 610a-610n to be preserved so that some of the original video data is still available. Generally, the flagged events 610a-610n may not be uploaded to the database 130 unless specifically requested. In some embodiments, the metadata 372 may be uploaded in real time (e.g., no SD card may be implemented). In some embodiments, the camera systems 100a-100n may be implemented without the video encoding module 560 or the wireless communication module 300 (e.g., to reduce costs). Instead, the driver may manually remove the SD card periodically (e.g., once a week, or when notified by the camera systems 100a-100n via an LED, alarm, prompt, etc.) and the data could be moved from the SD card to a fleet hub archive via an SD card reader.

Figure 11:
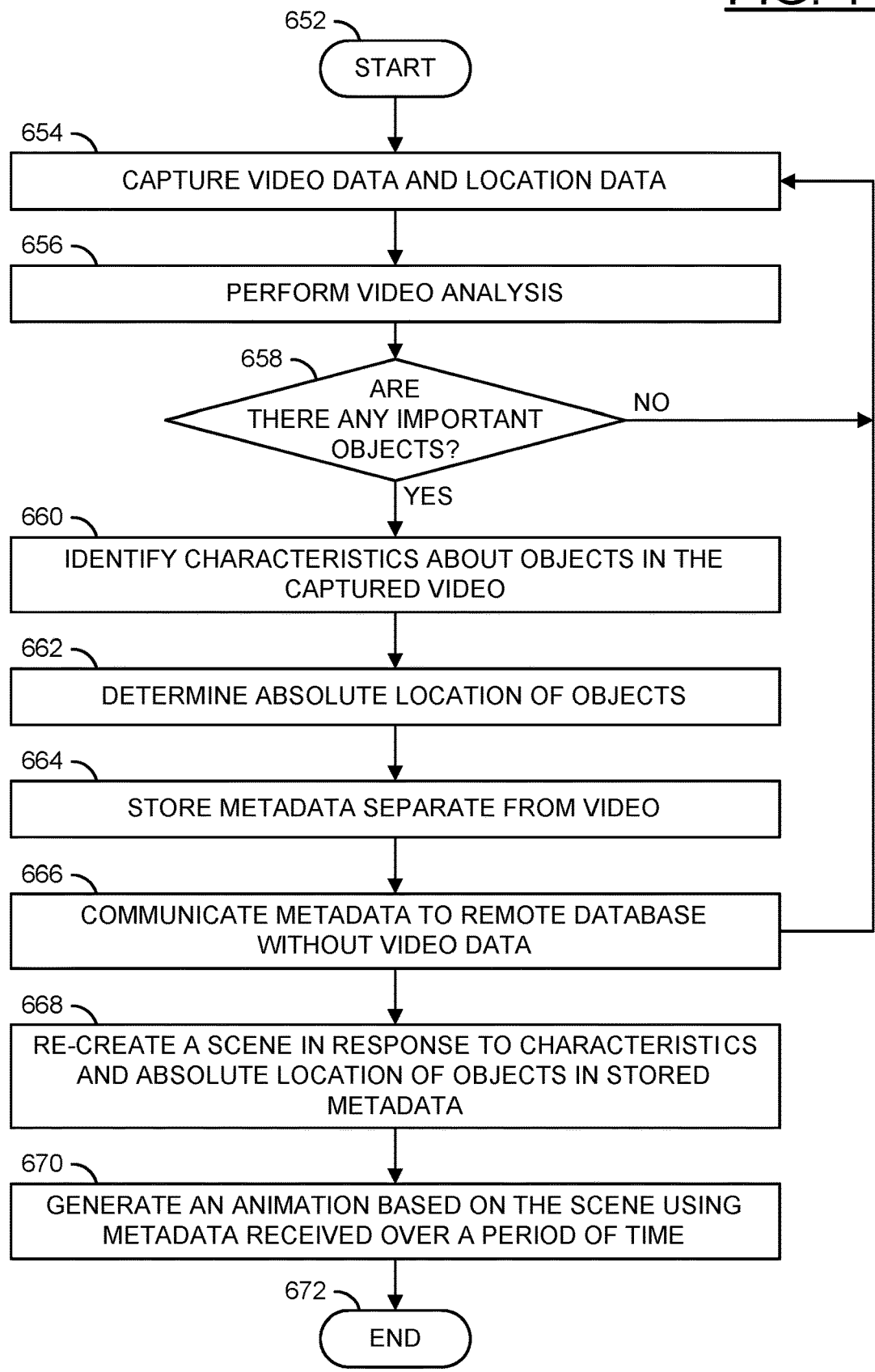
FIG. 11 is a flow diagram illustrating a method for performing roadway scene re-creation using video analytics and metadata.

Referring to FIG. 11, a method (or process) 650 is shown. The method 650 may perform roadway scene re-creation using video analytics and metadata. The method 650 generally comprises a step (or state) 652, a step (or state) 654, a step (or state) 656, a decision step (or state) 658, a step (or state) 660, a step (or state) 662, a step (or state) 664, a step (or state) 666, a step (or state) 668, a step (or state) 670, and a step (or state) 672.

The step 652 may start the method 650. In the step 654, the camera system 100 may capture the video data 370 and the location data of the camera system 100. The location data may be stored as the camera location data 380f. Next, in the step 656, the video analytics module 330 may perform the video analysis using the feature sets in the library module 334 in order to detect one or more objects. Next, the method 650 may move to the decision step 658.

In the decision step 658, the video analytics module 330 may determine whether there are any important objects. Whether an object is considered to be important or not may be determined based on the feature set(s) provided in the library module 334. For example, different camera systems 100a-100n that implement different feature sets may be configured to detect different types of objects. If there are no important objects, then the method 650 may return to the step 654. If there are important objects, then the method 650 may move to the step 660. In the step 660, the video analytics module 330 may identify characteristics about the objects 410a-410n detected in the video data 370. Next, the method 650 may move to the step 662.

In the step 662, the video analytics module 330 may determine an absolute location of the detected objects 410a-410n. In an example, the current location 380f of the camera system 100 may be used as a reference point and the distance measured in the video frames to the objects may be stored as the absolute location data 380g. Next, in the step 664, the processor 302 may store the metadata 372 for the video files 350a-350n separate from the video data 370. In an example, the processor 302 may store the video ID 380a, the timestamp 380b, audio data 380d, the object data 380e, the camera location 380f, the absolute location data 380g, the sensor data 380h, the vehicle status data 380n, etc. as the metadata 372. In the step 666, the camera system 100 may communicate the metadata 372 to the remote database 130 without communicating the video data 370. In some embodiments, the wireless communication module 300 may communicate with the user device 112 and the user device 112 may send the metadata (e.g., the signal META) to the metadata server 120. The metadata 372 communicated in the signal META may be stored as the metadata 158 in the database 130. The video data 370 may be deleted after uploading the metadata 372 to the metadata server 120. Next, the method 650 may return to the step 654 (e.g., the camera system 100 may continually capture the video data 370 and generate the metadata 372) and move to the step 668.

In the step 668, the metadata server 120 may re-create a scene in response to the characteristics of the objects and the absolute location of the objects stored in the metadata 158. In an example, the absolute location data 380g and the object data 380e may be used to re-create a scene that occurred at a particular timestamp 380b. Next, in the step 670, the re-creation processor 510 may generate the animation 450 based on the scene described in the metadata 158 received over a period of time. In an example, the re-creation processor 510 may generate a single (e.g., static) scene corresponding to one timestamp. In another example, the re-creation processor 510 may generate a sequence of scenes (e.g., an animation) corresponding to a span of timestamps received over time. In some embodiments, the animation may be generated after the video data 370 has been deleted. Next, the method 650 may move to the step 672. The step 672 may end the method 650.

Figure 12:
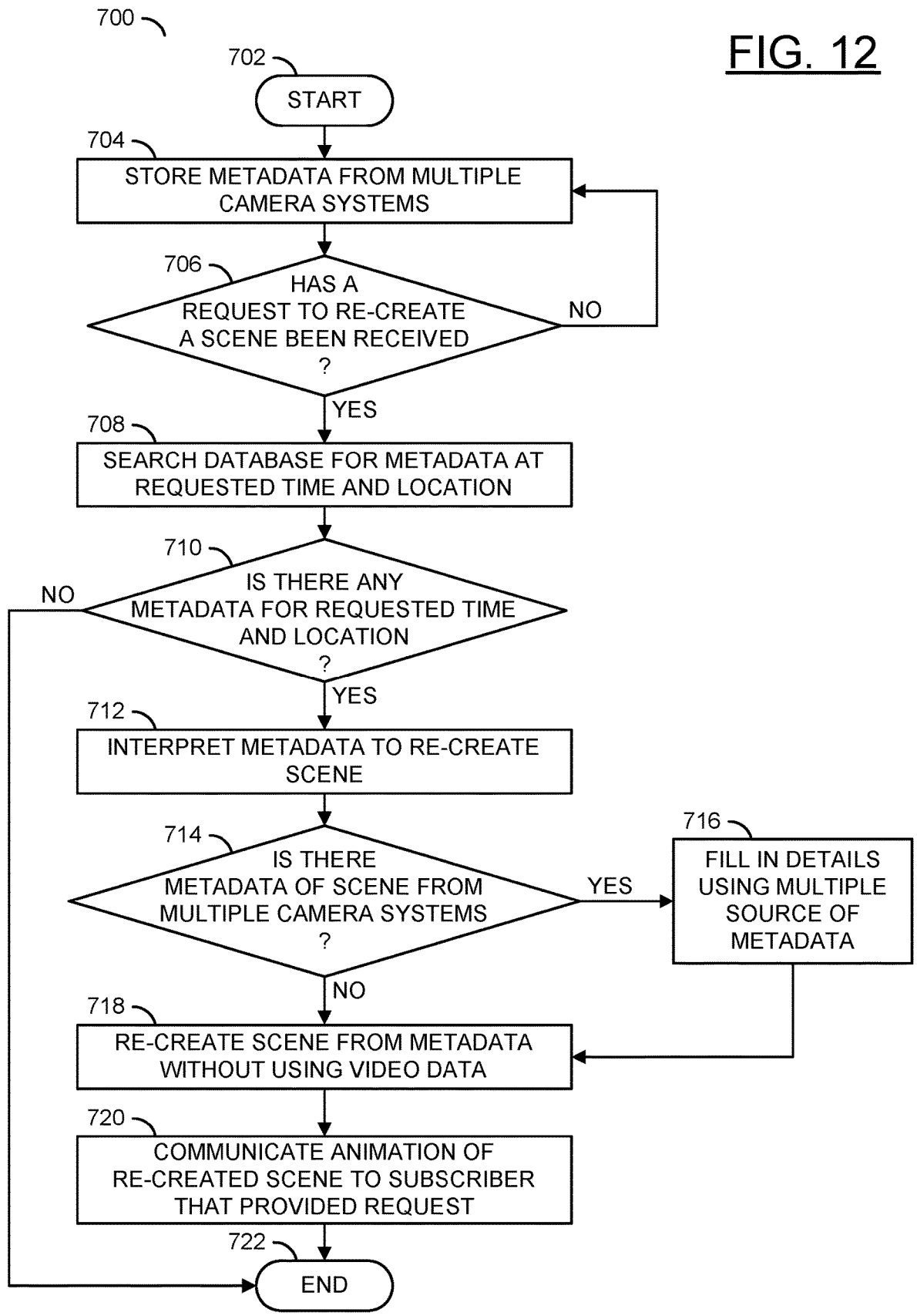
FIG. 12 is a flow diagram illustrating a method for re-creating a scene using metadata from multiple camera systems to fill in details.

Referring to FIG. 12, a method (or process) 700 is shown. The method 700 may re-create a scene using metadata from multiple camera systems to fill in details. The method 700 generally comprises a step (or state) 702, a step (or state) 704, a decision step (or state) 706, a step (or state) 708, a decision step (or state) 710, a step (or state) 712, a decision step (or state) 714, a step (or state) 716, a step (or state) 718, a step (or state) 720, and a step (or state) 722.

The step 702 may start the method 700. In the step 704, the metadata server 120 may store the metadata 372 received from multiple of the camera systems 100a-100n in the database 130. For example, the signals META_A-META_N may each be communicated by a different one of the camera systems 100a-100n and the metadata server 120 may store the information in the signals META_A-META_N as the metadata 158 (e.g., as the clips 180a-180n). Next, the method 700 may move to the decision step 706. In the decision step 706, the re-creation processor 510 may determine whether a request to re-create a scene has been received. In an example, one of the subscriber devices 110a-110n may request a scene to be re-created that occurred at a particular time and location (e.g., for an insurance claim, for a criminal investigation, etc.). If there has been no request, then the method 700 may return to the step 704. If there has been a request, then the method 700 may move to the step 708. In the step 708, the re-creation processor 510 may search the database 130 for the metadata 158 that corresponds to the requested time and location. In an example, the clips 180a-180n may comprise information about the time 182a and the location 186b for each of the objects 184a-184n. Next, the method 700 may move to the decision step 710.

In the decision step 710, the re-creation processor 510 may determine whether there is any metadata stored in the database 130 for the requested time and location. For example, the re-creation processor 510 may compare the time 182a and the location 186b stored for the clips 180a-180n with the time and location of the request. If there is no metadata that matches, then the method 700 may move to the step 722. If there is metadata that matches, then the method 700 may move to the step 712. In the step 712, the re-creation processor 510 may interpret the metadata 158 to re-create the scene. In an example, one of the camera systems 100a-100n may have provided the metadata 372 that corresponds to the requested time and location. Next, the method 700 may move to the decision step 714.

In the decision step 714, the re-creation processor 510 may determine whether the metadata 158 comprises metadata of the scene from more than one of the multiple camera systems 100a-100n. If there is only one of the camera systems 100a-100n that provided the metadata 372 that corresponds to the requested time and location, then the re-creation processor 510 may move to the step 718 using the metadata from the single source. If there is metadata from more than one of the camera systems 100a-100n, then the method 700 may move to the step 716. In the step 716, the re-creation processor 510 may fill in details using the multiple sources of metadata. In an example, the re-creation processor 510 may generate the scene using the metadata 158 stored from one of the camera systems 100a-100n and then fill in extra (or missing) details that may be provided by another of the camera systems 100a-100n (e.g., details about a front end of a car provided by a second camera may be used to fill in the details that another camera system that captured the same vehicle from behind did not provide). The re-creation processor 510 may combine the metadata provided by one camera system 100a with the metadata provided by another camera system 100b. Next, the method 700 may move to the step 718.

In the step 718, the re-creation processor 510 may re-create the scene 450 using the stored metadata 158, without using the video data 370. For example, the camera systems 100a-100n may have never uploaded the video data 370 that corresponds to the re-created scene to the metadata server 120. Next, in the step 720, the metadata server 120 may communicate the animation (e.g., via the signal RSCENE) to the subscriber that provided the request. Next, the method 700 may move to the step 722. The step 722 may end the method 700.

Figure 13:
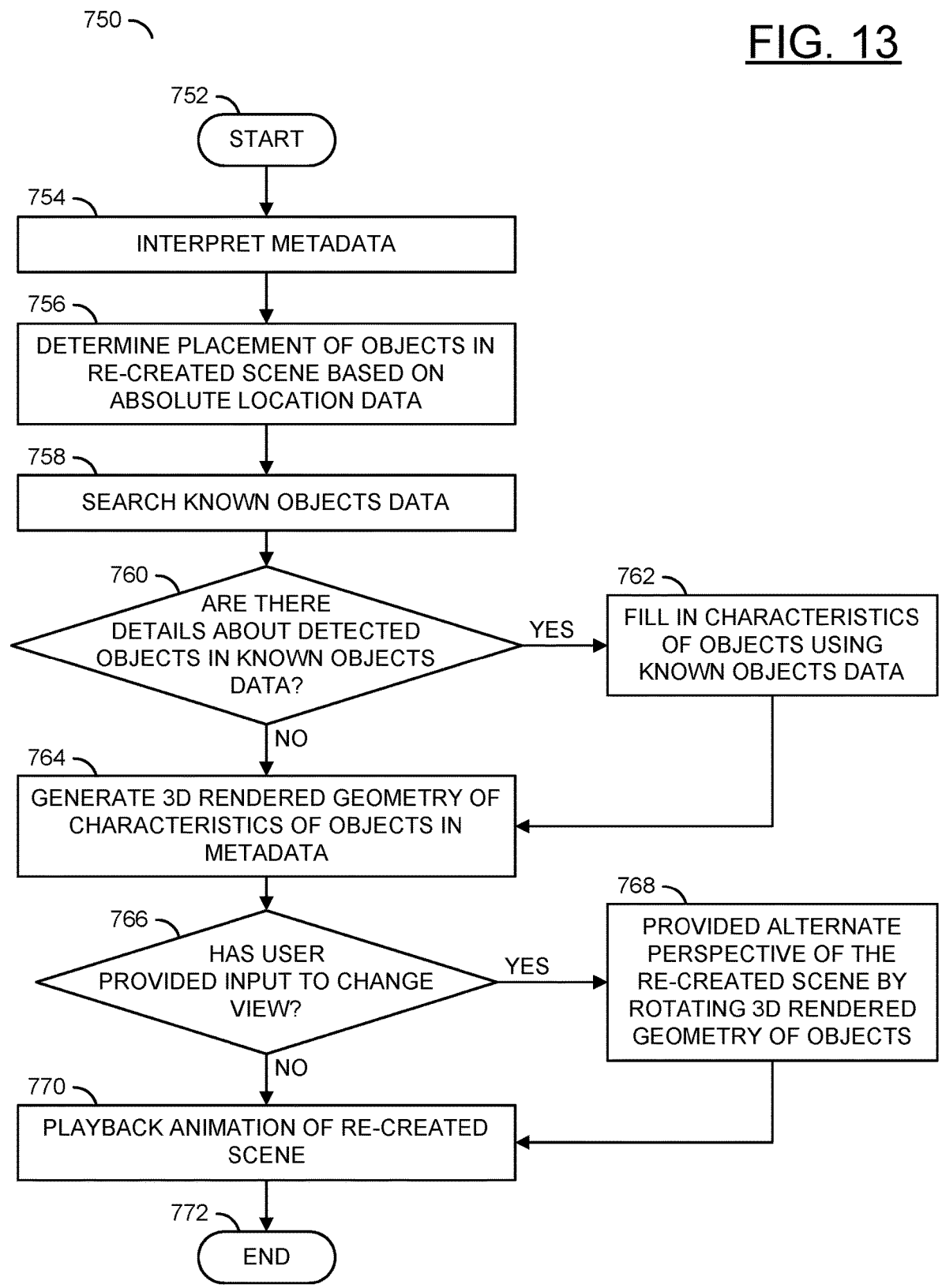
FIG. 13 is a flow diagram illustrating a method for using known object data to generate 3D rendered geometry to represent objects in the metadata.

Referring to FIG. 13, a method (or process) 750 is shown. The method 750 may use known object data to generate 3D rendered geometry to represent objects in the metadata. The method 750 generally comprises a step (or state) 752, a step (or state) 754, a step (or state) 756, a step (or state) 758, a decision step (or state) 760, a step (or state) 762, a step (or state) 764, a decision step (or state) 766, a step (or state) 768, a step (or state) 770, and a step (or state) 772.

The step 752 may start the method 750. In the step 754, the re-creation processor 510 may interpret the metadata 158. Next, in the step 756, the re-creation processor 510 may determine the placement of the re-created objects (e.g., the re-created vehicles 460a-460c, the re-created traffic signals 464a-464c, the re-created pedestrians 466a-466b, etc.) based on the absolute location data 380g. In the step 758, the re-creation processor 510 may search the known objects data 512. Next, the method 750 may move to the decision step 760.

In the decision step 760, the re-creation processor 510 may determine whether the known objects data 512 has any details about the detected objects. In an example, the known objects data 512 may store dimensions and/or other characteristics about a particular make/model/year of a vehicle. If there are details in the known objects data 512, then the method 750 may move to the step 762. In the step 762, the re-creation processor 510 may fill in the characteristics of the objects in the metadata 158 using the known objects data 512. In an example, if the metadata provides information about a front end of a vehicle and does not provide the size of the vehicle, then the information from the known objects data 512 may be used to fill in the size and/or details about what the rear end of the vehicle looks like. The re-creation processor 510 may combine the details in the metadata 158, with the general information about the objects provided by the known objects data 512. Next, the method 750 may move to the step 764. In the decision step 760, if there are no details about the detected objects in the known objects data 512, then the method 750 may move to the step 764 using only the information in the metadata 158. In the step 764, the re-creation processor 510 may generate the 3D rendered geometry of the characteristics of the objects provided in the in the metadata 158. Unknown details (e.g., information not available in the metadata 158 or in the known object data 512) may be rendered in wireframe, using a plain texture, using a hatched texture and/or another generic indicator. Next, the method 750 may move to the decision step 766.

In the decision step 766, the re-creation processor 510 may determine whether the user 520 viewing the re-created scene 450 has provided input to change the view. In some embodiments, the signal RSCENE may provide the full 3D, freeform view of the animation to one of the subscriber devices 110a-110n and the input may be received by the subscriber devices 110a-110n. If the user 520 has provided input, then the method 750 may move to the step 768. In the step 768, the re-creation processor 510 (or one of the subscriber devices 110a-110n that received the signal RSCENE) may provide an alternate perspective of the re-created scene 450 by rotating the 3D rendered geometry of the various re-created objects. For example, the signal RSCENE may provide the re-created scene 450 in a format that enables a free floating camera view to be manually moved and/or rotated by the end user 520. Next, the method 750 may move to the step 770. In the decision step 766, if the user 520 did not provide input, then the method 750 may move to the step 770. In the step 770, the re-creation processor 510 and/or the subscriber devices 110a-110n that received the signal RSCENE may playback the animation of the re-created scene (e.g., the 3D rendered geometry of the location representing a particular span of time). Next, the method 750 may move to the step 772. The step 772 may end the method 750.

Figure 14:
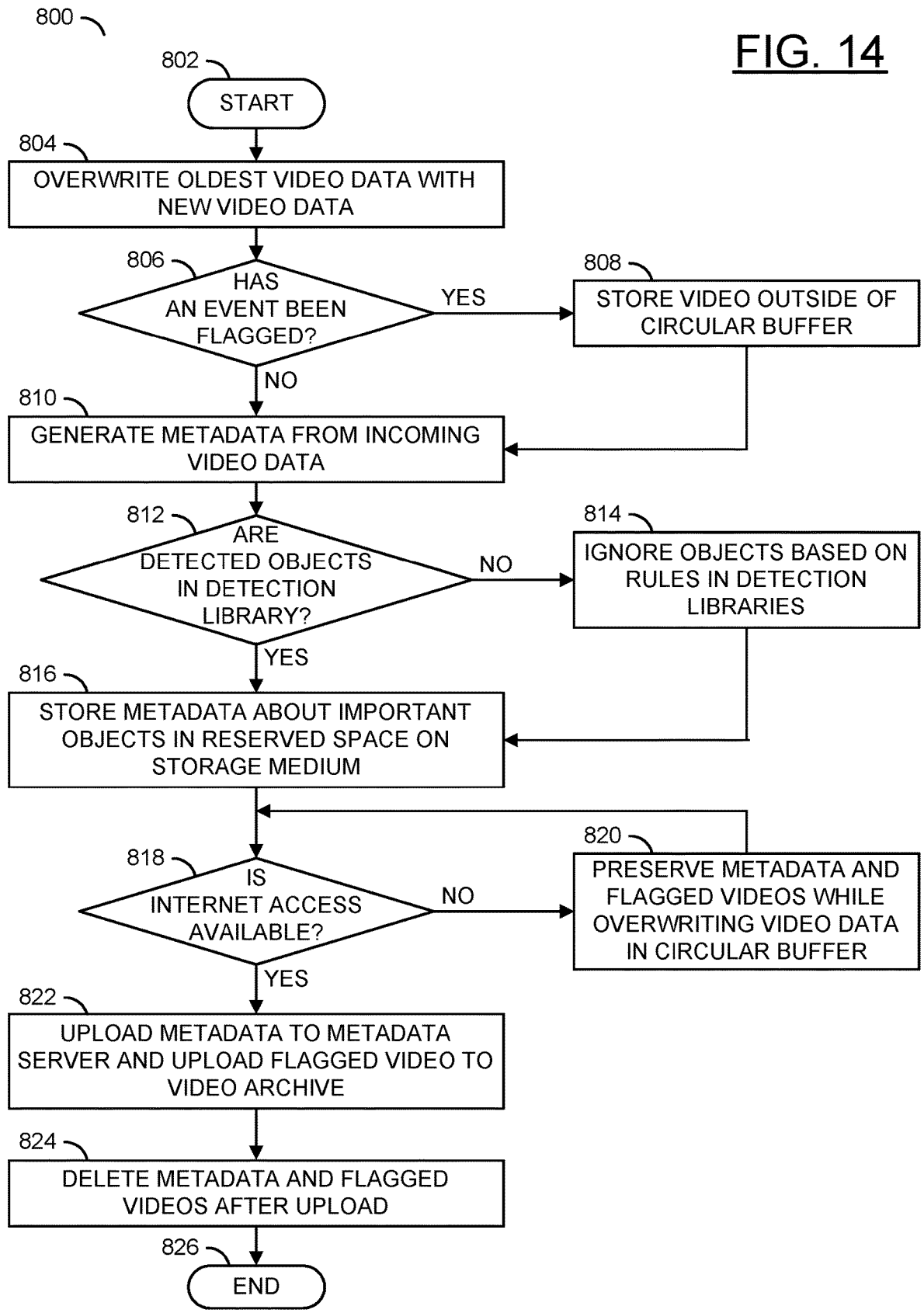
FIG. 14 is a flow diagram illustrating a method for managing data in a storage medium to preserve metadata.

Referring to FIG. 14, a method (or process) 800 is shown. The method 800 may manage data in a storage medium to preserve metadata. The method 800 generally comprises a step (or state) 802, a step (or state) 804, a decision step (or state) 806, a step (or state) 808, a step (or state) 810, a decision step (or state) 812, a step (or state) 814, a step (or state) 816, a decision step (or state) 818, a step (or state) 820, a step (or state) 822, a step (or state) 824, and a step (or state) 826.

The step 802 may start the method 800. In the step 804, the processor 302 may overwrite the oldest data in the circular buffer 602 with the incoming video data 370. Next, the method 800 may move to the decision step 806. In the decision step 806, the processor 302 may determine whether an event has been flagged. If an event has been flagged, then the method 800 may move to the step 808. In the step 808, the processor 302 may store the video data for the flagged events 610a-610n outside of the circular buffer 602 (e.g., in the reserved video events portion 604). Next, the method 800 may move to the step 810. In the decision step 806, if there are no flagged events, then the method 800 may move to the step 810. In the step 810, the video analytics module 330 may generate the metadata 372 for the incoming video data 370. Next, the method 800 may move to the decision step 812.

In the decision step 812, the video analytics module 330 may determine whether there are any objects from the detection library 334, in the video data 370. For example, the video analytics module 330 may compare features detected in the video data 370 to the features in the feature library 334. If the video data 370 does not comprise the objects from the detection library 334, then the method 800 may move to the step 814. In the step 814, the video analytics module 330 may ignore the objects based on the detection rules in the detection library 334. Next, the method 800 may move to the step 816. If the detected object is in the detection library 334, then the method 800 may move to the step 816. In the step 816, the processor 302 may store the object data 380e about the important objects in the reserved metadata portion 606 of the memory 304. Next, the method 800 may move to the decision step 818.

In the decision step 818, the processor 302 may determine whether there is internet access available (or whether the memory 304 has been connected to a backup device). In an example, the video storage module 562 and/or the metadata storage module 572 may determine a connectivity status of the camera systems 100 to the metadata server 120 (or a backup device). If there is no internet access (or backup device) available (e.g., the database 130 is unavailable), then the method 800 may move to the step 820. In the step 820, the data management 600 implemented by the processor 302 may preserve the metadata 372 and the flagged events 610a-610n in the memory 304. Next, the method 800 may return to the decision step 818. In the decision step 818, if there is internet access (or a backup device) available, then the method 800 may move to the step 822.

In the step 822, the communication device 300 may upload the metadata 372 to the metadata server 120 and upload the flagged video events 610a-610n to a backup device (e.g., a device separate from the metadata server 120 that provides a video archive). Next, in the step 824, the processor 302 may delete the metadata 612-616 from the reserved metadata portion 606 and the delete the flagged video events 610a-610n from the reserved video events portion 604 after the data has been successfully uploaded. Next, the method 800 may move to the step 826. The step 826 may end the method 800.

The functions performed by the diagrams of FIGS. 1-14 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. A system comprising:
 a capture device configured to (i) capture video, (ii) perform video analysis on said captured video to (a) identify characteristics about objects in said captured video and (b) determine an absolute location of said objects, (iii) store metadata separate from said captured video in response to said video analysis and (iv) communicate with a wireless communication device; and
 a database configured to (i) communicate with said wireless communication device, (ii) store said metadata received from said wireless communication device, (iii) re-create a scene in response to said characteristics and absolute location of said objects in said metadata and (iv) generate an animation based on said scene using said metadata received over time, wherein
  (a) said metadata is communicated without said captured video,
  (b) said animation provides a visualization similar to said captured video using only said metadata, and
  (c) said metadata is generated and communicated in real-time without encoding or storing said captured video on said capture device.

2. The system according to claim 1, wherein said database is configured to generate said animation that re-creates said scene using a different perspective than a perspective that would be visible in said captured video.

3. The system according to claim 1, wherein said video analysis is configured to distinguish between unimportant visual information and desired visual information when detecting said objects in response to a computer vision model.

4. The system according to claim 1, wherein said objects comprise one or more of vehicles, pedestrians, road signs, and traffic lights.

5. The system according to claim 1, wherein said characteristics about said objects comprise one or more of a vehicle make, a vehicle model, a vehicle license plate, a direction of travel, an identifying marker, a status of lights on said objects and text on said objects.

6. The system according to claim 1, wherein (i) said captured video comprises high definition video and (ii) a file size of said metadata is less than a video file size of said captured video.

7. The system according to claim 1, wherein (i) said wireless communication device is a smartphone and (ii) said capture device is configured to communicate said metadata to said smartphone over a Bluetooth communication protocol.

8. The system according to claim 1, wherein communicating said metadata without said captured video enables (i) a communication of said metadata from said capture device to said database to consume less bandwidth than communicating said captured video and (ii) long term archival storage of said metadata using less storage capacity than storing said captured video.

9. The system according to claim 1, wherein (i) said animation is provided to a spotter and (ii) said spotter provides driving advice to a driver of a vehicle with said capture device based on said animation.

10. The system according to claim 1, wherein said animation generated from said metadata enables said visualization similar to said captured video to be created after said captured video has been deleted.

11. The system according to claim 1, wherein said database is configured to receive said metadata from said capture device and from a plurality of capture devices implemented in a fleet of vehicles.

12. The system according to claim 11, wherein said database is configured to re-create said scene in response to said metadata received from said capture device and metadata received from one or more of said plurality of capture devices.

13. The system according to claim 1, wherein said metadata further comprises audio captured with said captured video, sensor cluster data from a vehicle and vehicle state information.

14. The system according to claim 1, wherein (i) said capture device is further configured to perform data management for a storage medium and (ii) said data management is configured to enable said metadata to be uploaded to said database in response to a connectivity status of said capture device to said database.

15. The system according to claim 14, wherein said data management is configured to (i) store said metadata and flagged events from said captured video on said storage medium when said connectivity status indicates that said database is unavailable and (ii) delete said metadata and said flagged events from said storage medium after said metadata and said flagged events have been archived.

16. The system according to claim 1, wherein (i) said animation comprises 3D rendered geometry of said characteristics about said objects and (ii) said 3D rendered geometry is further generated in response to known information about said objects.

17. A system comprising:
 a capture device configured to (i) capture video, (ii) perform video analysis on said captured video to (a) identify characteristics about objects in said captured video and (b) determine an absolute location of said objects, (iii) store metadata separate from said captured video in response to said video analysis and (iv) communicate with a wireless communication device; and
 a database configured to (i) communicate with said wireless communication device, (ii) store said metadata received from said wireless communication device, (iii) re-create a scene in response to said characteristics and absolute location of said objects in said metadata and (iv) generate an animation based on said scene using said metadata received over time, wherein
  (a) said metadata is communicated without said captured video,
  (b) said animation provides a visualization similar to said captured video using only said metadata,
  (c) said captured video is stored on a storage medium for said capture device,
  (d) a portion of said storage medium is reserved for storing said metadata,
  (e) said captured video is stored in a circular buffer implemented for said storage medium, and
  (f) a portion of said captured video is flagged for deletion from said circular buffer after said metadata is generated for said portion of said captured video.

18. The system according to claim 17, wherein said capture device is configured to determine said absolute location of said objects in response to (a) retrieving location coordinates of said capture device from a location device, (b) determining a distance of said objects from said capture device using said video analysis and (c) calculating said absolute location in response to said distance, said location coordinates and a direction of travel of said objects.

19. The system according to claim 17, wherein said metadata is generated and communicated in real-time without encoding or storing said captured video on said capture device.

20. A system comprising:
- a capture device configured to (i) capture video, (ii) perform video analysis on said captured video to (a) identify characteristics about objects in said captured video and (b) determine an absolute location of said objects, (iii) store metadata separate from said captured video in response to said video analysis and (iv) communicate with a wireless communication device; and
- a database configured to (i) communicate with said wireless communication device, (ii) store said metadata received from said wireless communication device, (iii) re-create a scene in response to said characteristics and absolute location of said objects in said metadata and (iv) generate an animation based on said scene using said metadata received over time, wherein (a) said metadata is communicated without said captured video, (b) said animation provides a visualization similar to said captured video using only said metadata, and (c) said capture device is configured to determine said absolute location of said objects in response to (i) retrieving location coordinates of said capture device from a location device, (ii) determining a distance of said objects from said capture device using said video analysis and (iii) calculating said absolute location in response to said distance, said location coordinates and a direction of travel of said objects.

\* \* \* \* \*